US006092091A

United States Patent [19]
Sumita et al.

[11] Patent Number: 6,092,091
[45] Date of Patent: Jul. 18, 2000

[54] DEVICE AND METHOD FOR FILTERING INFORMATION, DEVICE AND METHOD FOR MONITORING UPDATED DOCUMENT INFORMATION AND INFORMATION STORAGE MEDIUM USED IN SAME DEVICES

[75] Inventors: Kazuo Sumita, Yokohama; Tatsuya Uehara, Tokyo; Nobuhiro Shimogori, Kawasaki; Seiji Miike, Yokohama; Tetsuya Sakai, Tokyo; Masahiro Kajiura, Fujisawa, all of Japan

[73] Assignee: Kabushiki Kaisha Toshiba, Kawasaki, Japan

[21] Appl. No.: 08/929,275

[22] Filed: Sep. 12, 1997

[30] Foreign Application Priority Data

Sep. 13, 1996 [JP] Japan ................................. 8-243295
Sep. 13, 1996 [JP] Japan ................................. 8-243785
Sep. 13, 1996 [JP] Japan ................................. 8-243877

[51] Int. Cl.[7] ............................................. G06F 17/30
[52] U.S. Cl. ......................... 707/530; 707/2; 707/3; 707/6; 707/10
[58] Field of Search .......................... 707/2, 3, 5, 513, 707/8, 104, 102, 6, 10, 4; 709/218, 206, 208; 348/14, 1; 364/963

[56] References Cited

U.S. PATENT DOCUMENTS

| | | |
|---|---|---|
| 5,455,945 | 10/1995 | VanderDrift ................................. 707/2 |
| 5,717,913 | 2/1998 | Driscoll ...................................... 707/5 |
| 5,717,919 | 2/1998 | Kodavalla et al. ......................... 707/8 |
| 5,745,754 | 4/1998 | Lagarde et al. .......................... 707/104 |
| 5,842,206 | 11/1998 | Sotomayor ................................. 707/2 |
| 5,870,549 | 2/1999 | Bobo, II ................................. 709/206 |
| 5,873,081 | 2/1999 | Harel ......................................... 707/3 |
| 5,898,836 | 4/1999 | Freivald et al. ........................ 709/218 |
| 5,907,836 | 5/1999 | Sumita et al. .............................. 707/2 |

*Primary Examiner*—Wayne Amsbury
*Assistant Examiner*—Thu-Thao Havan
*Attorney, Agent, or Firm*—Oblon, Spivak, McClelland, Maier & Neustadt, P.C.

[57] ABSTRACT

The present invention is a device and method for filtering information, the device comprising a document database storing document data to be filtered, a reproduced document information storing unit storing fundamental document data used for detection of documents, newly created or updated, a detecting unit for detecting a document, newly created or updated, among document data stored in the document database based on document data stored in the document database and the fundamental document data stored in the reproduced document information storing unit, a similarity computing unit for computing a similarity between the detected document detected by the detecting unit and a retrieval condition set in advance, and a presenting unit for presenting detected documents detected by the detecting unit according to the similarities computed by the similarity computing unit.

46 Claims, 47 Drawing Sheets

FIG. 4A  WORD;WEIGHT, WORD;WEIGHT, ···

FIG. 4B  COMPUTER;2, DEVELOPMENT;1, NEW PRODUCT;1

FIG. 5A  WORD;WEIGHT, WORD;WEIGHT

FIG. 5B  COMPUTER;0.2, DEVELOPMENT;0.1, CPU;0.1, MEMORY;0.1, SALE;0.2, THIS YEAR;0.1

```html
<html>
<head>
<title>latest information index</title>
</head>
<body>
<ul>
<l1><a href= "http://www.aaaaaa.co.jp/press.html" >○○ shoji, ○○ bussan,
distribution network all over the country-cargo collection and sale through
affiliated wholesale traders</a><br>
○○ shoji, ○○ bussan take part in distribution of ×× for a staple food in
a domestic market through their major affiliated wholesale food traders on a
full scale. They intend to handle every thing from cargo collection through
sale in consideration that a governmental control in ×× market will be
alleviated under enforcement a new food control law in November. In general
merchandise trading companies, ○○ shoji invested in a retail business as an
example, but it is the first time for a general merchandise trading company to
start cargo collection and sale of ×× on all the country scale. The scale of
×× market is estimated to be 4 trillion yen, They seems to seek their sales
on the order of one hundred billion yen combined for the time being. Such an
activity will largely affect strategies of ○○ group such as ○○ kyodokumiai
rengokai (○○) and existing wholesale traders.
<br><hr>

<l1><a href= "http://www.bbbbb.co.jp/index.html" >○○○○ publishing
subsidiary company, an obligatory sale system in ××-restriction on returning
unsold books with a higher margin </a><br>
A publishing subsidiary company of ○○○○○○○, ○○○○ publishing (Tokyo,
Minato, ○○○○ president) introduces [an obligatory sale system] into its
sales activity at a chance when his company starts to publish a life
information magazine. Conventionally, returning of unsold books has been
basically free in circulation of books, but, it the obligatory sale system,
while a margin is increased according to a volume to purchase on the side of a
book store, an upper limit is imposed on a ratio of returned to purchased
books. This is the first trial to general book stores in ×× circulation,
which has a purpose to eliminate unnecessary coats in the circulation stage
and to modify a way of circulation into a more effective one from a view point
of meeting to an actual demand. An intention of (○○ president) <br><hr>

<l1><a href= "http://www.cccccc.co.jp/press.html" >Simple two-way TV,
participate in a program with a feeling of a game machine — ○○·○○ and the
like will start this fall </a><br>
Electric makers such as ○○, a private broadcasting company such as ○○○○·
○○ and ○○○○○○○○○ start a broadcasting business based on a simple
two-way TV. In order to participate in a program, a simple two-way TV is
connected to a telephone line with an exclusive tuner mounted on the small
two-way TV and a simple controller like a TV game machine operated. In a TV
shopping, an article on a screen can be in-situ ordered and a direct answering
to the screen can be also done, while watching a TV screen. This business will
cover a broad scope of social activities such as various opinion researches
and could be an introduction to a full scale multi-media broadcasting.
</ul>
</body>
</html>
```

FIG. 13 latest information index

○○ shoji, ○○ bussan, distribution network all over the country-cargo collection and sale through affiliated wholesale traders

○○ shoji, ○○ bussan take part in distribution of ×× for a staple food in a domestic market through their major affiliated wholesale food traders on a full scale. They intend to handle every thing from cargo collection through sale in consideration that a governmental control in ×× market will be alleviated under enforcement a new food control law in November. In general merchandise trading companies, ○○ shoji invested in a retail business as an example, but it is the first time for a general merchandise trading company to start cargo collection and sale of ×× on all the country scale. The scale of ×× market is estimated to be 4 trillion yen, They seems to seek their sales on the order of one hundred billion yen combined for the time being. Such an activity will largely affect strategies of ○○ group such as ○○ kyodokumiai rengokai (○○) and existing wholesale traders.

○○○○ publishing subsidiary company, an obligatory sale system in ××-restriction on returning unsold books with a higher margin

A publishing subsidiary company of ○○○○○○○, ○○○○ publishing (Tokyo, Minato, ○○○○ president) introduces [an obligatory sale system] into its sales activity at a chance when his company starts to publish a life information magazine. Conventionally, returning of unsold books has been basically free in circulation of books, but, it the obligatory sale system, while a margin is increased according to a volume to purchase on the side of a book store, an upper limit is imposed on a ratio of returned to purchased books. This is the first trial to general book stores in ×× circulation, which has a purpose to eliminate unnecessary coats in the circulation stage and to modify a way of circulation into a more effective one from a view point of meeting to an actual demand. An intention of (○○ president)

Simple two-way TV, participate in a program with a feeling of a game machine — ○○・○○ and the like will start this fall

Electric makers such as ○○, a private broadcasting company such as ○○○○○○ and ○○○○○○○○○○ start a broadcasting business based on a simple two-way TV. In order to participate in a program, a simple two-way TV is connected to a telephone line with an exclusive tuner mounted on the small two-way TV and a simple controller like a TV game machine operated. In a TV shopping, an article on a screen can be in-situ ordered and a direct answering to the screen can be also done, while watching a TV screen. This business will cover a broad scope of social activities such as various opinion researches and could be an introduction to a full scale multi-media broadcasting.

FIG. 14

```
<heading><a href="http://www.aaaaaa.co.jp/press.html" >OO shoji, OO bussan,
distribution network all over the country-cargo collection and sale through
affiliated wholesale traders</a><heading>
<body>
OO shoji, OO bussan take part in distribution of XX for a staple food in a
domestic market through their major affiliated wholesale food traders on a full
scale. They intend to handle every thing from cargo collection through sale in
consideration that a governmental control in XX market will be alleviated
under enforcement a new food control law in November. In general merchandise
trading companies, OO shoji invested in a retail business as an example, but
it is the first time for a general merchandise trading company to start cargo
collection and sale of XX on all the country scale. The scale of XX market
is estimated to be 4 trillion yen, They seems to seek their sales on the order
of one hundred billion yen combined for the time being. Such an activity will
largely affect strategies of OO group such as OO kyodokumiai rengokai (OO)
and existing wholesale traders.
</body>
```

FIG. 15

```
<html>
<head>
<title>filtering result</title>
</head>
<body>
<ul>
<li><a href="http://www.ccccccc.co.jp/press.html.>Simple two-way TV, participate in a program with a feeling of a game machine — ○○·○○ and the like will start this fall </a><br>
Electric makers such as ○○, a private broadcasting company such as ○○○○○○○ and ○○○○○○
○○○○○○ start a broadcasting business based on a simple two-way TV.

<li><a href="http://www.ddd.or.jp/press.html.>Broad cooperation with ○○○, ○○○ </a><br>
○○○ agrees to cooperate with ○○○○○○○○○○ in a broad field on 20th day. On the same day, ○○○○ chairman of ○○○ had a conference and concluded [a cooperative agreement].

</ul>
</body>
</html>
```

FIG. 17

```
<ul>
   <ll><a href= "page21.html" >new information</a>
   <ll><a href= "page22.html" >feedback</a>
   <ll><a href= "page23.html" >outline of page</a>
   <ll><a href= "page24.html" >press release</a>
</ul>
```

| ADDRESS | POSITIONAL NUMBER IN HIERARCHY |
|---------|-------------------------------|
| ADDRESS 1 | 1 |
| ADDRESS 2 | 2 |
| ADDRESS 3 | 3 |
| ) | ) |

FIG. 19

✻Germany ○○○○, ×××× mail-order sale items
increased-cooperation through capital investment (AA news paper,
morning edition, page 2)
A major mail-order sale company of ○○○, ○○○○(○○○○) had a cooperative
relation in capital investment with △△△△△△△△△△△△△△△△△△△△(△△△△
△) which had a ×××× related products wholesale trader under its control. ○○○○
purchases ×××× and its peripheral products at lower prices from △△△ and enriches
the contents on a catalog. In Europe, too, a demand for ○○○○ has been rapidly
increased and ○○○○ prepares for this situation.

The mail-order company retroactively participates in △△△ from-day of-month acquiring
45% of the total capital. ×××× related product wholesale trading company which is a
subsidiary of △△△ had a sales of □□□□□ last year amounting to 1.6 billion marks
(1 mark=about 60 yen), acquired a market share more than 20% and is a major company
having positions the second and fifth in the local and worldwide markets respectively.

According to ○○○○, the company have purchased ×××× related products directly from
various makers and entered into its catalogue list, but considered that it can enjoy a
merit in cooperation, since purchasing conditions from □□□□□, which wholesales
products of various makers, is better than others and besides assortment of products can
be easily improved.

In ○○○, the extent of propagation of ×××× into homes is considerably lower,
compared with USA. ○○○○ sees that a demand to ×××× in homes will rapidly
increase, because of a boom of multimedia, a high-speed increase in personal computer
users and in addition a fast decrease in sales price and a swift improvement on
performance. (Bonn=takasi MIYAO)

✻○○○○ president retired discrepancy in management policy with a parent company
(BB report)

○○○○○○○○○ (Tokyo subsidiary) announced on the 3rd day that ○○○○ president
retired as of June 28. Mr.○○ quitted a vice president of a parent company ○○○○○○
○○○○ of USA, too. The company explained that the reason of his retirement is because
there has been a discrepancy in management policy there between.

Mr.○○○○○○○○○ a senior vice president of ○○○○○○○○○ of USA and a
chairman of a Japanese corporation assumed a Tokyo resident as of the same date and will
control all the business in Japan. He will start to select next president at the same
time.

✻OTV major ○○○○, sales of ×××× (AA news paper, morning edition, page 2)

[Bonn=Takeshi MIYAO] a major TV broadcasting company of ○○○, ○○○○ starts a sale of
×××× for a multimedia from September in corporation with a middle class maker ×××
× in the country. The intention is to acquire home users by appealing a high
performance, simple operability and a lower price. The company has concluded a
cooperative agreement with a chain major ○○○○ and ○○○○○○○○ department store
and has secured 1600 sales positions all over the country.

○○○○ has had a cooperative relation with △△△△△△△△△△△△△△△△△△△△
(△△△△△). ○○○○ sales ×××× which are of a corresponding type and which are
made by ○○○ in a brand of [○○○○·family PC]. In ××××, ××××××, a CPU
(central computing unit) of ○○○○, is loaded, and CD-ROM (exclusive use memory for
read only using a compact disk), a driver, a sound card and a speaker system are
built-in.

Prices will be set at 2400 marks for a beginner class including a monitor, a key board
and a mouse (1 mark=about 61 yen) and at about 3000 marks for a upper class and the
products can be sufficiently compete with those of a largest domestic maker ○○○○○,
which is famous for its low price strategy, said (○○○○○○○○ president).

FIG. 23

```
<html>
<!-file 0->
<head>
<title>filtering result</title>
</head>
<body>
<ul>
```

FIG. 25

```
</ul>
</body>
</html>
```

FIG. 26

```
<html>
<!-file 0->
<head>
<title>filtering result</title>
</head>
<body>
<ul>
<l1>
<a href= "1.html" >
*Germany ○○○○, ×××× mail-order sale items
 increased-cooperation through capital investment
  (AA news paper, morning edition, page 2)</a>
<l1>
<a href= "2.html" >
*○○○○ president retired discrepancy in management policy
with a parent company (BB report)</a>
<l1>
<a href= "3.html" >
*○TV major ○○○○, sales of ×××× (AA news paper,
morning edition, page 2)</a>
</ul>
</body>
</html>
```

FILE 0 (HTML FILE WHICH HAS ONLY LINKS)

FIG. 27

```
<html>
<!-file 1->
<head>
<title>result 1</title>
</head>
<body>
<h1>○○○○, ××××  mail-order sale items
increased-cooperation through capital investment (AA news paper,
morning edition, page 2)</h1>
<p>
A major mail-order sale company of ○○○, ○○○○(○○○○○) had a
cooperative relation in capital investment with △△△△△△△△△△△△
△△△△△△△△(△△△△△) which had a ×××× related products
wholesale trader under its control. ○○○○ purchases ×××× and its
peripheral products at lower prices from △△△ and enriches the contents
on a catalog. In Europe, too, a demand for ○○○○ has been rapidly
increased and ○○○○ prepares for this situation.
<p>
The mail-order company retroactively participates in △△△ from-day
of-month acquiring 45% of the total capital. ×××× related product
wholesale trading company which is a subsidiary of △△△ had a sales of
□□□□□ last year amounting to 1.6 billion marks (1 mark=about 60 yen),
acquired a market share more than 20% and is a major company having
positions the second and fifth in the local and worldwide markets
respectively.
<p>
According to ○○○○, the company have purchased ×××× related
products directly from various makers and entered into its catalogue list,
but considered that it can enjoy a merit in cooperation, since purchasing
conditions from □□□□□, which wholesales products of various makers,
is better than others and besides assortment of products can be easily
improved.
<p>
In ○○○, the extent of propagation of ×××× into homes is
considerably lower, compared with USA. ○○○○ sees that a demand to ××
×× in homes will rapidly increase, because of a boom of multimedia, a
high-speed increase in personal computer users and in addition a fast
decrease in sales price and a swift improvement on performance.
(Bonn=takasi MIYAO)
</body>
</html>
```

FILE 1 (HTML FILE ACCORDING TO FIRST ARTICLE)

FIG. 28

| TOP-NODE REFERENTIAL RELATION |
|---|
| TOP-NODE ADDRESS 1 |
| A NUMBER OF SUB-NODES 1 |
| SUB-NODE ADDRESS 11 |
| SUB-NODE ADDRESS 12 |
| ⟩ |
| TOP-NODE ADDRESS 2 |
| A NUMBER OF CHILD-NODES 2 |
| SUB-NODE ADDRESS 21 |
| SUB-NODE ADDRESS 22 |
| ⟩ |

FIG. 32A

| SUB-NODE REFERENTIAL RELATION |
|---|
| NODE ADDRESS 101 |
| A NUMBER OF CHILD-NODES 101 |
| SUB-NODE ADDRESS 1011 |
| SUB-NODE ADDRESS 1012 |
| ⟩ |
| NODE ADDRESS 201 |
| A NUMBER OF CHILD-NODES 201 |
| SUB-NODE ADDRESS 2011 |
| SUB-NODE ADDRESS 2012 |
| ⟩ |

FIG. 32B

```
eindex.html
xx1/index.html
xx2/index.html
xx3/index.html
http://www.ccc.bbb.aaaaaaa.co.jp/ci1/index.html
http://www.bbb.aaaaaaa.co.jp/index.html
http://www.aaaaaaa.co.jp/S/
http://www.aaaaaaa.co.jp/index.html
http://www.aaaaaaa.co.jp:81/ci1/index_j.html
```

FIG. 35

| TOP ADDRESS 1 | |
|---|---|
| A NUMBER OF SUB-NODES 1 | |
| SUB-NODE ADDRESS 11 | MODIFICATION FLAG 11 |
| SUB-NODE ADDRESS 12 | MODIFICATION FLAG 12 |
| ≀ | ≀ |
| TOP ADDRESS 2 | |
| A NUMBER OF SUB-NODES 2 | |
| SUB-NODE ADDRESS 21 | MODIFICATION FLAG 21 |
|  |  |
| ≀ | ≀ |

FIG. 39

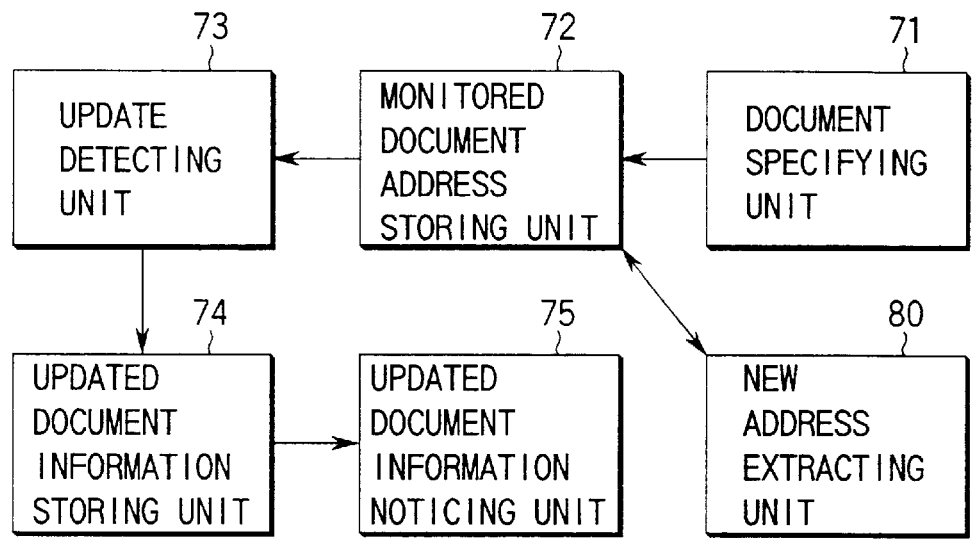
FIG. 51
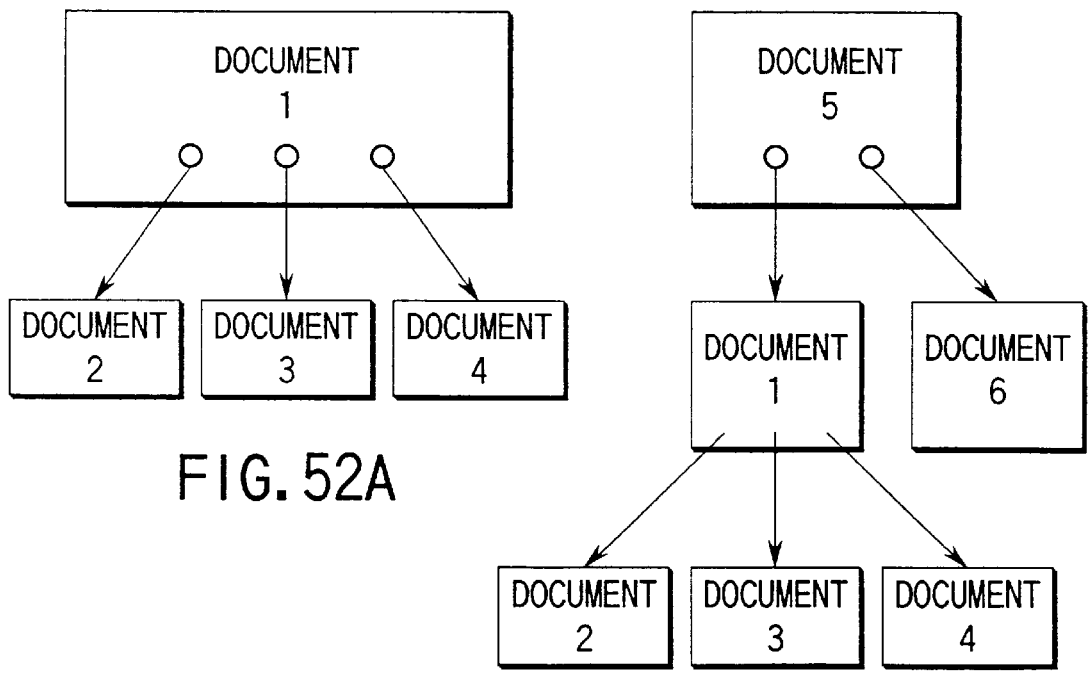
FIG. 52A
FIG. 52B

| REFERRING DOCUMENT ADDRESS | REFERRED DOCUMENT ADDRESS |
|---|---|
| REFERRING DOCUMENT ADDRESS | REFERRED DOCUMENT ADDRESS |
| REFERRING DOCUMENT ADDRESS | REFERRED DOCUMENT ADDRESS |
| REFERRING DOCUMENT ADDRESS | REFERRED DOCUMENT ADDRESS |

```
<html>
<head>
<title>overview of www.ccc.bbb.aaaaaaa.co.jp http server</title>
</head>
<body text= "#ffffff" link= "#00ff00" vlink= "#ffff00" alink= "#9F5F9F" >
<body background= "images/background/gray_rock.gif" >
<!-- img src= "images/sunline.gif" -->
<img src= "images/astronaut.gif" align= "right"
width=300 height=220 hspace=20>
<hr>
<hr>
<h2>○○publicized home page</h2>
Click <s href= "eindex.html" >here </a> to get English version.
<p>
<!--**** link to page of [xx1][xx2][xx3] **** -->
<hr>
<hr>
<h3>
page of each laboratory
</h3>
<menu>
<img src= "images/pin2.gif" align= "top" >
<a href= "XX1/index.html" > [xx1] publicized home page </a> <p>
<img src= "images/pin2.gif" align= "top" >
<a href= "XX2/index.html" > [xx2] publicized home page </a> <p>
<img src= "images/pin2.gif" align= "top" >
<a href= "XX3/index.html" > [xx3] publicized home page </a> <p>
</menu>

<!-- **** link to in-company home page **** -->
<hr>
<h3> in-company home page </h3>
<menu>
<img src="images/pin2.gif" align="top"                          A
    <a href= "http://www.ccc.bbb.aaaaaa.co.jp/ci1/index.html" >
    home page of (○○○) </a> (japanese) <p>
<img src= "images/pin2.gif" align= "top"
    <a href= "http://www.bbb.aaaaaa.co.jp/index.html" >
    home page of (○○○) </a> (japanese) <p>
<img src= "images/pin2.gif" align= "top"
    <a href= "http://www.aaaaaa.co.jp/S/" >
    in-compasny www server list </a> presented by (○○○) (japanese) <p>
<img src= "images/pin2.gif" align= "top"
    <a href= "http://www.aaaaaa.co.jp/index.html" >
    ○○ home page (for use in the company) </a> (japanese) <p>
<img src= "images/pin2.gif" align= "top"
    <a href= "http://www.aaaaaa.co.jp:81/index_j.html" >
    ○○ home page (for use outside the company) </a> (japanese) <p>
</menu>
</body>
</html>
```

FIG. 61

DEVICE AND METHOD FOR FILTERING INFORMATION, DEVICE AND METHOD FOR MONITORING UPDATED DOCUMENT INFORMATION AND INFORMATION STORAGE MEDIUM USED IN SAME DEVICES

CROSS REFERENCE TO RELATED APPLICATIONS

This application claims priority under 35 U.S.C. §119 to Japanese patent applications 8-243295 filed Sep. 13, 1996, 8-243785 filed Sep. 13, 1996, and 8-243877 filed Sep. 13, 1996, the entire contents of which is incorporated herein by reference.

BACKGROUND OF THE INVENTION

The present invention relates to a device and method for filtering information, in which information requested or interested by a user is selected in a great number of documents such as text descriptions and literature and is supplied to the customer at regular intervals.

The present invention relates to a device and method for monitoring updated document information, in which an updated document is detected in at least one document specified by a user in advance and is supplied to the user thereof.

The present invention relates to storage medium used in the information filtering device and the updated document information monitoring unit.

Recently, computerization of documents has been progressing in an accelerated manner, together with the popularization of word processors and electronic computers and the wide spread of electronic mail and electronic news through a computer network such as the Internet.

As a term "electronic publishing" suggests, it is conceivable that information included in a news paper, a magazine and a book will be commonly provided for us by electronic means. With such electronic means in future practical use, it is also foreseeable that text information available at an individual user site in real time will increase more and more to a tremendous volume.

In such circumstances, a demand is increasing for an information filtering system or an information filtering service, in which information requested or interested by a user is selected and supplied to the user.

With consciousness to regard the above mentioned issues as critical, development of information filtering devices have been recently started, which provide each user with only information that meets retrieval condition set in advance for the user.

In these information filtering devices, however, there has conventionally been no need for consideration on revision of a newly produced document, since periodical documents such as descriptions in a news paper and a magazine have been objects for processing.

For example, since a news paper is daily issued, it is only required to process descriptions on events having occurred on the day. In publication in the form of CD-ROM, regularly or irregularly, in which some number of events are collected, the information filtering devices has been only required to process the information included in the CD-ROM.

Such a situation is applicable for filtering documents on which information on a date when a document was created is explicitly described. That is, in this case, documents the creation dates of which fall in a predetermined date interval are only selected to be processed in reference to the date information and such filtering processing can be exercised with ease. In the case where creation dates and revision dates are stored as auxiliary information, too, a similar processing can be exercised.

On the other hand, there are present kinds of documents on which no information on dates of creation or updating is available as description, in files of which even no auxiliary information is stored or moreover in creation of which no rules is decided. For example, documents (called Web pages) publicized in WWW (World Wide Web) are created by individuals under no control.

Such Web pages are created whenever an individual wants to and there is no rule available in which dates of creation or updating should be described on a document. For this reason, it is absolutely difficult to constantly obtain date information with a high reliability on when the document was created or updated on all the documents.

In other words, in a conventional information filtering device, there has been a serious problem that it is difficult to select and provide information interested by an individual among information, created or updated, which is the object of the conventional filtering device.

In such a manner, a conventional information filtering device has difficulty in constantly acquiring date information on when a document was created or updated on all the documents and therefore there has been a problem in the device that it cannot be effected to distinguish between a created document and an updated one.

In recent years, there has been a conspicuous propagation of the Internet and information stored in computers scattered all over the world can be with ease accessed from anywhere, only if a connection with the Internet is in order.

In WWW (World Wide Web), an arrangement is provided that a user can access with ease all the information all over the world by a GUI (Graphical use Interface) base browser under the use of HTTP (Hyper Text Transfer Protocol).

A software called httpd is used a computer in WWW. The software is to transfer a hypertext file which is described in HTML (HyperText Markup Language) stored in a database of the computer according to a request from another computer.

A computer connected to the Internet can read a specified file by addressing a hypertext file in the httpd in which the hypertext file requested for transfer is present.

Since, in a description of HTTP, the address is described as link information, a browser in conformity with the protocol of HTTP can display a hypertext file under a control of the httpd.

Besides, if various data such as a voice, a still image and a dynamic image can be displayed, a hypertext including multi-media data can be also displayed with a browser.

With such an arrangement, a user can be more easily access information on the Internet and many of individuals and enterprises have become to publicize hypertext files called Web page.

In WWW, however, no manager of the database is available and an individual creates and updates Web pages by its own way. Because of greatness of the volume of accumulated Web pages (A total of the web pages already publicized in the world is estimated to have been 40 million at the beginning of the year 1996.), we have been already in a hard situation in which an individual user cannot find a way how to know where a Web page it wants to is (or what should be addressed as a URL address in order to attain a Web page it wants to). Moreover, frequency and time zone of update are not regulated being at its disposal.

Under such circumstances, very recently, there have been appeared a new service in which retrieval is conducted by a specialist instead of a user, since a system in which Web pages accessible are obtained with a content base has been developed.

In a concrete manner, there are available Web retrieval servers such as Yahoo, Lycos and Altavista. With a Web retrieval server, a Web page including a key word can be obtained by addressing a key word. A user obtains a Web page which he or she want to using a Web retrieval server.

In such a manner, while information which is necessary can be with ease obtained on line by using a Web retrieval server, such information can be only obtained when a user actively addresses the necessary information for retrieval, but if the user does not effect addressing when information, in which it is interested, is newly created, it cannot have a chance to access to the information, even though it is important to the user.

Accordingly, a system is necessary in which a user is supplied to a fact that information has been created when it was created.

In a conventional database, such a function is called SDI (Selective Disseminative Information). When the SDI is used, a user has to enter a key word or the like into the system directory library as an individual profile which key word is used for selection of information the user is concerned with or interested in.

The system compares the key word and the like (profile) with data when the data are newly entered into the system and if the data coincides with the key word, the system informs the user of that new information which the user wants to have has been created.

However, since it is free for any one to entry any information into WWW, it is conceivable to enter a plurality of units of information in one Web page.

When such a Web page where a plurality of units of information co-exists is handled as one processing unit and compared with a profile, there is not necessarily a guarantee for a proper filtering.

Therefore, there has been a problem that even a Web page including important information in part, which the user has a concern with and an interest in, cannot be selected for the user, since the Web page is judged as a whole in regard to whether to be taken up or discarded.

In a conventional database, since individual data are in a local environment or managed by a specified manager, it has been easy to distinguish newly created information over existing information, but, in WWW, since an individual can enter a Web page into the system independently and no manager manages all the WWW, there is a great difficulty in discern new information from existing information.

Furthermore, a Web page has a hypertext structure and a plurality of Web pages which are mutually related to express a piece of complete information and thereby there has been a problem that it is not sufficient only to detect creation of new information in monitoring pages.

Still furthermore, there has been a problem that it is hard for a single system to monitor newly created information throughout a very wide scope such as Web pages on WWW.

As seen from the above description, when a conventional information filtering is applied to Web pages on WWW, there have been the following problems:

(1) There are two cases, in one of which one Web page consists of a single piece of information and in the other of which one Web page includes a plurality of information pieces. In the latter case, the information pieces have to be divided into as many pieces and comparison has to be effected between a profile and each divided piece in order to select pieces of necessary information with accuracy.

(2) When a system is not large in scale, the system cannot singly check all the pages in the world. On the other hand, even with a small scaled system, it can offer convenience to a user if a monitoring means to detect update made on a specified page is adopted.

However, a Web page is a hypertext and thereby there is a chance to make a complete piece of information by combination of information pieces of a plurality of Web pages. Therefore, if the monitoring means can specify only one Web page at a time, pages such as children and grand children derived from a parent page with links therefrom are not detected, even if they are updated.

(3) It is impossible to monitor new information sufficiently with a single information filtering device.

Since there is a necessity of a system which can inform a user of creation of information the user wants to have, as described above, a conception on an information monitoring device has come to be proposed that a desired set of pages are selected by a user in advance among a tremendous number of web pages and information in a scope of the selected Web pages is monitored and pieces of new information are detected to be notified to the user.

Even with such an information monitoring device, however, monitoring is only conducted in each page. Web pages have a feature that they are linked between documents to form a hypertext. That is, each of Web pages has a small value of information and they can be a complete piece of information having a significance as a group of documents in respective pages. Therefore, since Web pages have been monitored independently, no effective update detection has not been able to be effected.

In a Web page, as shown in FIG. 61, there is a description in HTML and it is a protocol that references to other documents are effected by setting an address of the document stored, as shown in (a) of the figure.

In a conventional update monitoring for Web pages having such a structure, there are the following problems:

(1) It has been impossible to specify documents to be monitored on whether information is updated or not as a group and also impossible to notifye a user of updated documents as a group.

(2) Updating of a Web page has been effected irregularly. Therefore, if a check is regularly performed, updating can be only detected in a period of checking.

(3) In the present condition, monitoring has to cover Web pages being not updated, which is meaningless.

(4) In the present condition, monitoring has to cover Web paged already deleted, which is also meaningless.

(5) While a storage location of a Web page is changeable, when it is the case, it is necessary to change a monitoring location to a new storage location.

(6) While Web pages are referred to among themselves and such information are important, the information cannot be technically notified to a user.

BRIEF SUMMARY OF THE INVENTION

The present invention has been made in light of the above mentioned circumstances, it is an object of the present invention to provide a device and method for filtering information, in which it is made possible to detect and present only documents created or updated to a user among a plurality of documents without no date information showing the time of creation or updating, which documents have been created or updated irregularly.

It is another object of the present invention to provide a device and method for filtering information, in which it is made possible to select and notify a user of only information concerned with or interested in by the user among pieces of newly created information (fresh information) in such a database as WWW, where individuals create and update independently.

It is a further object of the present invention to provide a unit and method for monitoring update in documents, in which it is made possible to efficiently detect and notify a use of updates in documents having a hypertext structure, which documents are updated irregularly like a Web page.

It is a still further object of the present invention to provide a storage medium used in the devices for filtering information and for monitoring updated documents.

A first aspect of the present invention is directed to a device for filtering information, comprising:

first storage means for storing document data to be filtered;

second storage means for storing fundamental document data for detection of documents newly created or updated;

detection means for detecting the documents newly created or updated among the document data stored in the first storage means based on the document data stored in the first storage means and the fundamental document data stored in the second storage means;

similarity computing means for computing a similarity between the detected documents by detected the detection means and a retrieval condition set in advance; and presenting means for present the detected documents detected by the detecting means according to a similarity computed by the similarity computing means.

A second aspect of the present invention is directed to a device for filtering information according to the first aspect, wherein presentation of documents by the presenting means is conducted according to the descending order of the similarities computed by the similarity computing means.

A third aspect of the present invention is directed to a device for filtering information according to the first aspect, wherein presentation of documents by the presenting means is conducted on documents of similarities equal to or more than a predetermined value computed by the similarity computing means.

A fourth aspect of the present invention is directed to a device for filtering information according to the first aspect, wherein the unit for filtering information further comprises means for compressing the documents detected by the detecting means and storing the compressed documents in the second storage means.

A fifth aspect of the present invention is directed to a method for filtering information, comprising the steps of:

detecting documents, newly created or updated, among document data based on document data and fundamental document data;

computing a similarity between a detected document and a retrieval condition specified by a user in advance; and presenting the detected documents according to the similarities computed.

A sixth aspect of the present invention is directed to a method for filtering information according to the fifth aspect, wherein presentation of the documents is conducted in the descending order of the similarities computed.

A seventh aspect of the present invention is directed to a method for filtering information according to the fifth aspect, wherein presentation of the documents is conducted on documents of similarities computed equal to or more than a predetermined value.

An eighth aspect of the present invention is directed to a method for filtering information according to the fifth aspect, wherein the method for filtering information further comprises the step of compressing the detected documents and adding the compressed documents to the fundamental document data after the detection step.

A ninth aspect of the present invention is directed to a unit for filtering information, comprising:

detecting means for detecting documents, newly created or updated, among document data by comparison between document data being an object for filtering and fundamental document data which is used for detecting the documents, newly created or updated;

deciding means for deciding on whether or not the detected document data by detecting means include a plurality of information units;

splitting means for splitting the detected document data into the information units, when the detected document data has been decided to include a plurality of information units by the decision means;

similarity computing means for computing a similarity between each information unit after the splitting and a retrieval condition set in advance; and presenting means for presenting the split information pieces by the splitting means according to the similarities computed by the similarity computing means.

A tenth aspect of the present invention is directed to a device for filtering information according to the ninth aspect, wherein presentation of the documents by the presentation means is conducted in the descending order of the similarities computed by the similarity computing means.

An eleventh aspect of the present invention is directed to a device for filtering information according to the ninth aspect, wherein presentation by the presentation means is conducted on documents of similarities computed by the similarity computing means equal to or more than a predetermined value.

A twelfth aspect of the present invention is directed to a device for filtering information according to the ninth aspect, wherein the presenting means comprises:

selecting means for selecting the slit documents by the splitting means according to the similarities computed by the similarity computing means;

creating means for creating an abstract of each of the selected documents by the selecting means; and presenting means for presenting the abstracts created by the creating means.

A thirteenth aspect of the present invention is directed to a device for filtering information, comprising:

detecting means for detecting a hypertext, newly created or updated, among hypertexts of from an hypertext with an address specified in advance being an object for filtering up to a hypertext in a position specified in advance in a hierarchy by comparison between the hypertext being an object for filtering and a fundamental hypertext which is used for detecting a hypertext, newly created or updated;

similarity computing means for computing a similarity between a detected hypertext by the detection means and a retrieval condition set in advance; and presenting means for presenting the detected hypertexts by the detecting means according to the similarities computed by the similarity computing means.

A fourteenth aspect of the present invention is directed to a device for filtering information according to the thirteenth aspect, wherein detection of a hypertext by the detection means is terminated when a first hypertext is detected by the detecting means.

A fifteenth aspect of the present invention is directed to a device for filtering information according to the thirteenth aspect, wherein presentation of hypertexts are conducted in the descending order of the similarities computed by the similarity computing means.

A sixteenth aspect of the present invention is directed to a device for filtering information according to the thirteenth aspect, wherein presentation of the hypertexts by the presenting means is conducted on hypertexts of similarities computed by the similarity computing means equal to or more than a predetermined value.

A seventeenth aspect of the present invention is directed to a device for filtering information according to the thirteenth aspect, wherein the presenting means comprises:

compression means for compressing the detected hypertexts by the detection means; and presenting means for presenting the compressed hypertexts by the compressing means according to the similarities computed by the similarity computing means.

An eighteenth aspect of the present invention is directed to a device for filtering information according to the thirteenth aspect, wherein the similarity computing means comprises:

deciding means for deciding on whether or not a detected hypertext by the detecting means includes a plurality of information units;

splitting means for splitting the detected hypertext by the detecting means into respective information units, when the detected hypertext is decided by the deciding means to include a plurality of information units; and a means for computing a similarity between each split information unit and a retrieval condition set in advance.

A nineteenth aspect of the present invention is directed to a device for filtering information which selects a predetermined document among a plurality of documents, comprising:

incorporating means for incorporating a filtering result output from another unit for filtering information; and filtering means for executing filtering incorporated documents incorporated by the incorporating means together with documents to be filtered, while including the former documents in the latter documents.

A twentieth aspect of the present invention is directed to a method for filtering information, comprising the steps of:

detecting documents, newly created or updated, among documents by comparison between document data of an object for filtering and fundamental document data, which are used for detecting the documents, newly created or updated;

deciding on whether or not the detected document data include a plurality of information units;

splitting the detected documents into information units, when detected documents are decided to include a plurality of information units;

computing a similarity between each split information unit and a retrieval condition set in advance; and presenting the split documents according to the similarities computed.

A twenty-first aspect of the present invention is directed to a method for filtering information according to the twentieth aspect, wherein presentation of the documents is conducted in the descending order of the similarities computed.

A twenty-second aspect of the present invention is directed to a method for filtering information according to the twentieth aspect, wherein presentation of the documents is conducted on documents of similarities computed equal to or more than a predetermined value.

A twenty-third aspect of the present invention is directed to a method for filtering information according to the twentieth aspect, wherein the presenting step for the split documents comprises the steps of:

selecting the split documents according to similarities computed;

creating an abstract of a selected document; and presenting abstracts created.

A twenty-fourth aspect of the present invention is directed to a method for filtering information, comprising the steps of:

detecting a hypertext, newly created or updated, among hypertexts of from an hypertext with an address specified in advance being an object for filtering up to a hypertext in a position designated in advance in a hierarchy by comparison between the hypertext being an object for filtering and a fundamental hypertext which is used for detecting a hypertext, newly created or updated;

computing a similarity between a detected hypertext by the detecting means and a retrieval condition set in advance; and presenting the detected hypertexts by the detection means according to the similarities computed by the similarity computing means.

A twenty-fifth aspect of the present invention is directed to a method for filtering information according to the twenty-fourth aspect, wherein detection of a hypertext by the detecting means is terminated when a first hypertext is detected by the detecting means.

A twenty-sixth aspect of the present invention is directed to a method for filtering information according to the twenty-fourth aspect, wherein the hypertext presenting step is conducted according to the descending order of the similarities computed by the similarity computing means.

A twenty-seventh aspect of the present invention is directed to a method for filtering information according to the twenty-fourth aspect, wherein the hypertext presenting step is conducted on hypertext of similarities computed equal to or more than a predetermined value.

A twenty-eighth aspect of the present invention is directed to a method for filtering information according to the twenty-fourth aspect, wherein the hypertext presenting step comprises:

compressing the detected hypertexts; and presenting the compressed documents according to similarities computed.

A twenty-ninth aspect of the present invention is directed to a method for filtering information according to the twenty-fourth aspect, wherein the similarity computing step comprises:

deciding on whether or not the detected hypertext includes a plurality of information units;

splitting the detected hypertext into information units, when the detected hypertext has been decided to include a plurality of information unites; and computing a similarity between each split information unit and a retrieval condition set in advance.

A thirtieth aspect of the present invention is directed to a method for filtering information among a plurality of documents, comprising the steps of:

incorporating a filtering result output from another unit for filtering information; and filtering results together with a plurality of documents while including the former documents in the latter documents.

A thirty-first aspect of the present invention is directed to a device for monitoring updated document information, comprising:

document specifying means for specifying an address showing a storage location for a document of a monitoring object and specifying documents in a hierarchical structure with the document being a starting position thereof as a group;

update detecting means for detecting an updated document among the specified documents by the document specifying means; and noticing means for noticing the detected documents by the update detecting means with information on their respective positions in the hierarchical structure including the detected documents therein.

A thirty-second aspect of the present invention is directed to a device for monitoring update in document information according to the thirty-first aspect, wherein the noticing means comprises means for presenting the detected document by the update detecting means with information on their respective position in the hierarchical structure including the document therein.

A thirty-third aspect of the present invention is directed to a device for monitoring update in document information according to the thirty-first aspect, wherein the update detecting means comprises:

update time predicting means for predicting an update time of each document specified by the specifying means;

selecting means for selecting a document among the specified documents by the document specifying means based on an predicted update time by the update time predicting means; and detecting means for detecting updated documents among the selected documents by the selecting means.

A thirty-fourth aspect of the present invention is directed to a device for monitoring update in document information according to the thirty-first aspect, wherein the device for monitoring updated document information further comprises:

latest-update-time storing means for storing the latest update time of each of the specified documents by the document specifying means; and specification deleting means for deleting the addresses showing storage locations of documents from the specifications specified by the document specifying means elapsed time of which documents exceeds a threshold holding time set in advance when counting from the latest update time stored in the latest update time storing means.

A thirty-fifth aspect of the present invention is directed to a device for monitoring update in document information according to the thirty-first aspect, wherein the unit for monitoring update in document information further comprises: detecting means for detecting the documents, which have been deleted, among the specified documents by specified by the document specifying means; and specification deleting means for deleting addresses showing the storage locations of deleted documents when the deleted documents have been detected by the detecting means.

A thirty-sixth aspect of the present invention is directed to a device for monitoring update in document information according to the thirty-first aspect, wherein the device for monitoring update in document information further comprises:

address detecting means for detecting an address of a new location when a stored location of a document specified by the document specifying means has been modified to the new location; and address modifying means for modifying the old address of the document whose storage location specified by the document specifying means to the new address detected by the address detecting means when the new address of a document is detected to which address the old address of the document is modified.

A thirty-seventh aspect of the present invention is directed to a device for monitoring updated document information, comprising:

referential relation collecting means for collecting referential relations between documents;

document specifying means for specifying an address showing a storage location of a document of an object for monitoring;

detecting means for detecting a document, which refers to the specified document specified by the document specifying means, based on a referential relation collected by the referential relation collecting means; and message means for giving a message to an user in regard to the document detected by the detecting means.

A thirty-eighth aspect of the present invention is directed to a method for monitoring update in document information, comprising the steps of:

specifying an address showing a storage location for a document of a monitoring object and documents having a hierarchical structure with a document as a starting point as a group;

detecting an updated document among the specified documents by the document specifying means; and noticing the detected documents detected by the update detecting means with information on their respective positions in the hierarchical structure of documents including the detected documents therein.

A thirty-ninth aspect of the present invention is directed to a method for monitoring updated document information, comprising the steps of:

collecting referential relations between documents;

specifying an address showing a storage location of a document of an object for monitoring;

detecting that a new document, which refers to the specified document specified by the document specifying means, is created, based on a referential relation collected by the referential relation collecting means; and noticing to an user the new document detected by the detecting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention;

FIG. 4A is a representation showing a format of an individual profile stored in a profile storage area of the present invention;

FIG. 4B is a depiction showing an example of an individual profile stored in a profile storage area of the present invention;

FIG. 5A is a depiction showing a format of a internal representation on the document side according to the present invention;

FIG. 5B is a depiction showing an example of a internal representation on the document side according to the present invention;

FIG. 13 is a depiction of an example of a description in HTML of a page composed of a plurality of information units of the fourth embodiment;

FIG. 14 is a depiction of an image of display of a description in HTML showing in FIG. 13;

FIG. 15 is a depiction showing a result split by a information splitting unit of the fourth embodiment;

FIG. 17 is a depiction showing an example of a result arranged by the result arranging unit of the fourth embodiment;

FIG. 19 is a depiction showing a monitoring page list of an information filtering device of a fifth embodiment of the present invention;

FIG. 23 is a depiction showing data transmitted by a filtering device of the sixth embodiment;

FIG. 25 is a depiction showing a description of the sixth embodiment written in a HTML file;

FIG. 26 is a depiction showing a description of the sixth embodiment written in a HTML file;

FIG. 27 is a depiction showing a result of conversion into HTML of the transmitted data shown in FIG. 23;

FIG. 28 is a depiction showing a result of conversion into HTML of the transmitted data shown in FIG. 23;

FIG. 32A is a depiction showing a format of an address storing unit for a monitored document in the seventh embodiment;

FIG. 32B is a depiction showing a format of an address storing unit for a monitored document in the seventh embodiment;

FIG. 35 is a depiction showing a sub-node stored in a top-node referential relation table of the seventh embodiment;

FIG. 39 is a depiction showing a data format of an updated document information storing unit of the seventh embodiment;

FIG. 51 is a functional block diagram of an updated document information monitoring system of an eleventh embodiment of the present invention;

FIG. 52A is a block diagram illustrating movement of an address of a Web page;

FIG. 52B is a block diagram illustrating movement of an address of a Web page;

FIG. 61 is a depiction showing a description based on HTML of a Web page.

DETAILED DESCRIPTION OF THE INVENTION

Embodiments of the present invention will be below described referring to the attached drawings.

The First Embodiment

Figure 1:
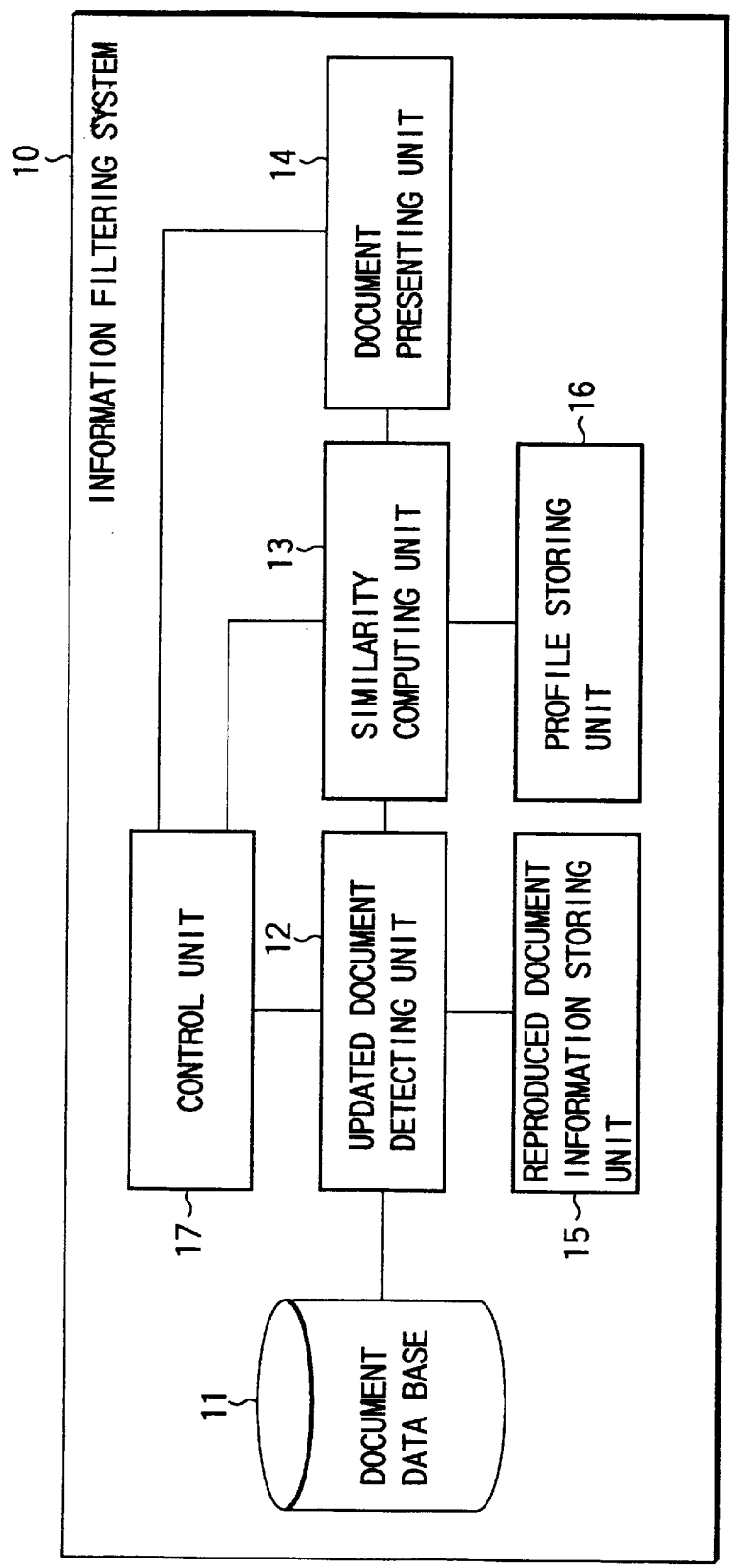
FIG. 1 is a block diagram showing an information filtering system relating to a first embodiment of the present invention.

All the constitution of an information filtering system according to the first embodiment of the present invention in reference to FIG. 1.

As shown in FIG. 1, the information filtering system 10 of the present invention comprises a document database 11, a reproduced document information storing unit 15, an updated document detecting unit 12, a profile storing unit 16, a similarity computing unit 13, a document presenting unit 14 and a control unit 17.

The document database stores document data.

The reproduced document information storing unit 15 stores reproduction information of a document.

The updated document detecting unit 12 obtains a difference between a stored document in the document database 11 and a stored document in the reproduced document information storing unit 15 and then detects only an updated document among all the documents stored in the document database 11.

The profile storing unit 16 stores a profile in which a retrieval condition for retrieving a document that a user is interested in is described.

The similarity computing unit 13 computes a similarity between a profile of a user and a document.

The document presenting unit 14 outputs to present a group of documents according similarities computed in the similarity computing unit 13.

The control unit 17 controls all the information filtering system 10.

Now, a flow of processing among the updated document detecting unit 12, the similarity computing unit 13, the document presenting unit 14 and the control unit 17 is described in reference to a flow chart.

Figure 2:
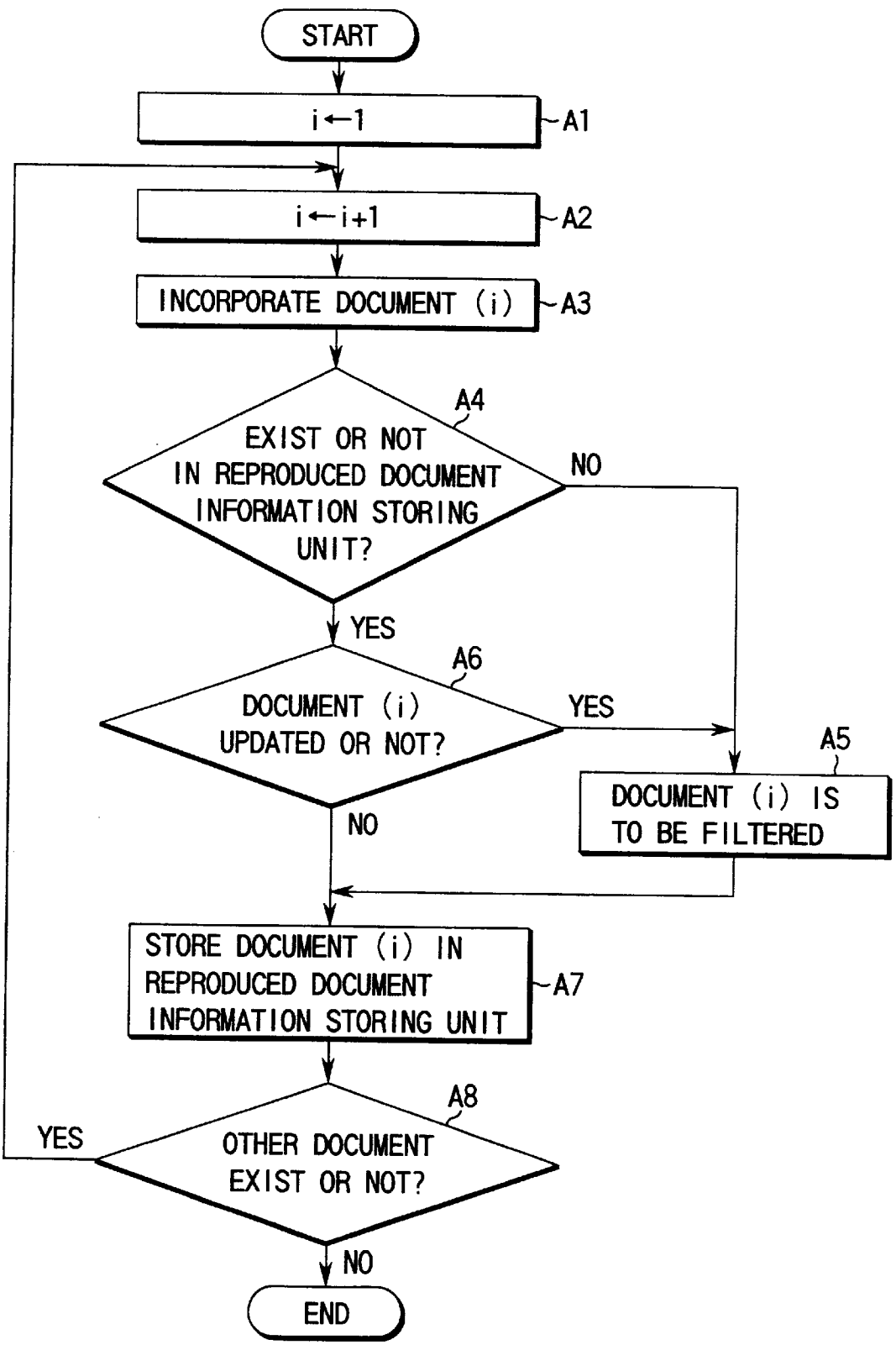
FIG. 2 is a flow chart showing a flow of processing in an updated-document detecting unit of the present invention.

In FIG. 2, a flow of processing in the updated document detecting unit 12 is shown. The updated document detecting unit 12 is regularly started by the control unit 10.

In the updated document detecting unit 12, all the documents in the document database 11 are taken in one at a time (step A1 to step A3) to decide on whether or not it is newly created (step A4).

In the case of an existing document, it is decided whether or not the document is updated (step A6) and if one of the conditions is satisfied (N of step A4 or Y of step 6), the document becomes an object on which a computation of similarity is conducted in the similarity computing unit 13 (step A5).

The all document taken out for a decision is again stored in the reproduced document storing unit 15 (step A7). In such a way, all the documents in the document database 11 are processed and newly created documents and updated documents are detected so as to be objects for filtering.

Figure 3:
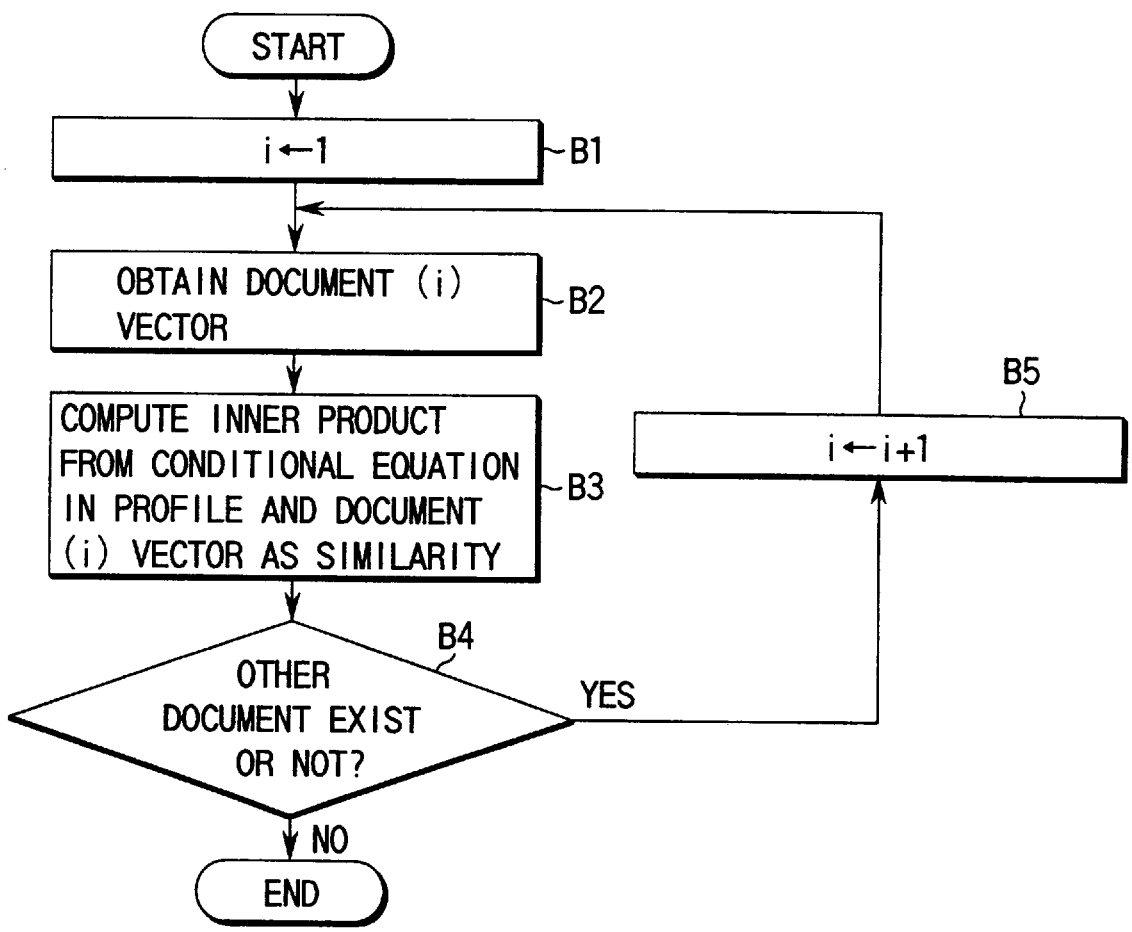
FIG. 3 is a flow chart showing a flow of processing in a similarity computing unit of the present invention.

In FIG. 3, a flow in the similarity computing unit 13 is shown. This similarity computing unit 13 computes similarities between all the documents detected in the updated document detecting unit 12 and retrieval conditions in a profile.

There have been disclosed various methods for computation of a similarity between a document and a retrieval condition. As to a method of similarity computation, there is no limitation to a method used by the present invention, but various methods can be also employed in execution of the present invention.

A method will be described, in which a retrieval condition and a document are respectively expressed as vectors of word frequency and a similarity is obtained by computing an inner product between vectors.

The similarity computing unit 13 computes a document vector of a document detected by the updated document detecting unit 12 (step B2) and further computes a similarity by taking an inner product between the computed document vector and a profile vector stored in the profile storage unit 16 (step B3).

Then it is decided whether or not another document exists (step B4) and if it is decided yes, processing is returned to step B2 in a condition that i←i+1 (step B5).

On the other hand, if it is decided that another document does not exist in step B4, then the similarity computing process is terminated.

FIG. 4A shows a format of an individual's profile to be stored in the profile storing unit 16 and FIG. 4B shows an example of the individual's profile to be stored in the profile storing unit 16.

A profile comprises a list of pairs of words and weights. In example of FIG. 4B, words such as [computer], [development] and [new product] have respectively set at weights of 2, 1 and 1.

FIG. 5A shows a format of an inner representation on the document side and FIG. 5B shows an example of an inner representation on the document side.

The inner representation on the document side comprises a list of pairs of terms and weights. The list can be obtained by conducting a morphological analysis on a document to extract a word and adopting frequency of use of the word in a document as weight.

In order to avoid an influence of the length of a document, normalization is made on the frequency of usage by dividing an actual usage frequency of the word in the document with the number of all the words employed in the document.

When a vector which has the weight of a word as an element which word is included in any of a profile or a document is considered, in the case of the example of FIG. 4B, a vector q on the side of the profile is expressed with the following expression:

| computer | development | new product | CPU | memory | sale | this year | |
|---|---|---|---|---|---|---|---|
| [ 2 | 1 | 1 | 0 | 0 | 0 | 0 ] | ... (1) |

In the case of the example of FIG. 5B, a vector on the side of a document di is expressed in the following expression:

| computer | development | new product | CPU | memory | sale | this year | |
|---|---|---|---|---|---|---|---|
| [ 0.2 | 0.1 | 0 | 0.1 | 0.1 | 0.2 | 0.1 ] | ... (2) | if an inner product between a document and a profile is taken as similarity computation, the similarity Si of a document i with a profile is given in the following expression:

$$Si = q \cdot di \quad (3)$$

where [·] means an inner product and, in the cases of the examples of FIGS. 4B and 5B, Si=0.5.

In the document presenting unit 14, documents are presented to a user in the descending order of the similarities computed for each document. When the present invention is executed in a closed system of one computer, documents are directly presented on a display in the order of sorting.

On the other hand, when a system in which documents are transmitted to a user through a network is considered, a group of documents are transmitted in a form of a file transfer in the order of being sorted according to a decreasing magnitude of similarity. In this case, objects for sorting may be limited to documents beyond a predetermined threshold value of similarity.

The control unit 17 starts the updated document detecting unit 12 in a predetermined interval. When a newly created or updated document is detected by the updated document detecting unit 12, the control unit 17 starts the similarity computing unit 13.

A similarity with a profile is computed in the similarity computing unit 13. When similarities are computed on more than one documents, the control unit 13 starts the document presenting unit 14. The document presenting unit 14 presents documents to a user while sorting them in the order of decreasing similarity.

According to this information filtering system, a document, newly created or updated irregularly, can be detected by an updated document detecting unit 12 and only this detected document can be presented to user while computing a similarity with a profile on the detected document only.

The Second Embodiment

The second embodiment of the present invention will be described.

Reproduced document information to be stored in the updated document detecting unit 12 can be in the form of an original document, but, in that case, the storage area is occupied by the same area as that of the original document in terms of capacity, which is not unfavorable from a view point of a source management.

Decrease in storage capacity can be avoided by compressing the information of an original document as reproduced document information and storing it.

Figure 6:
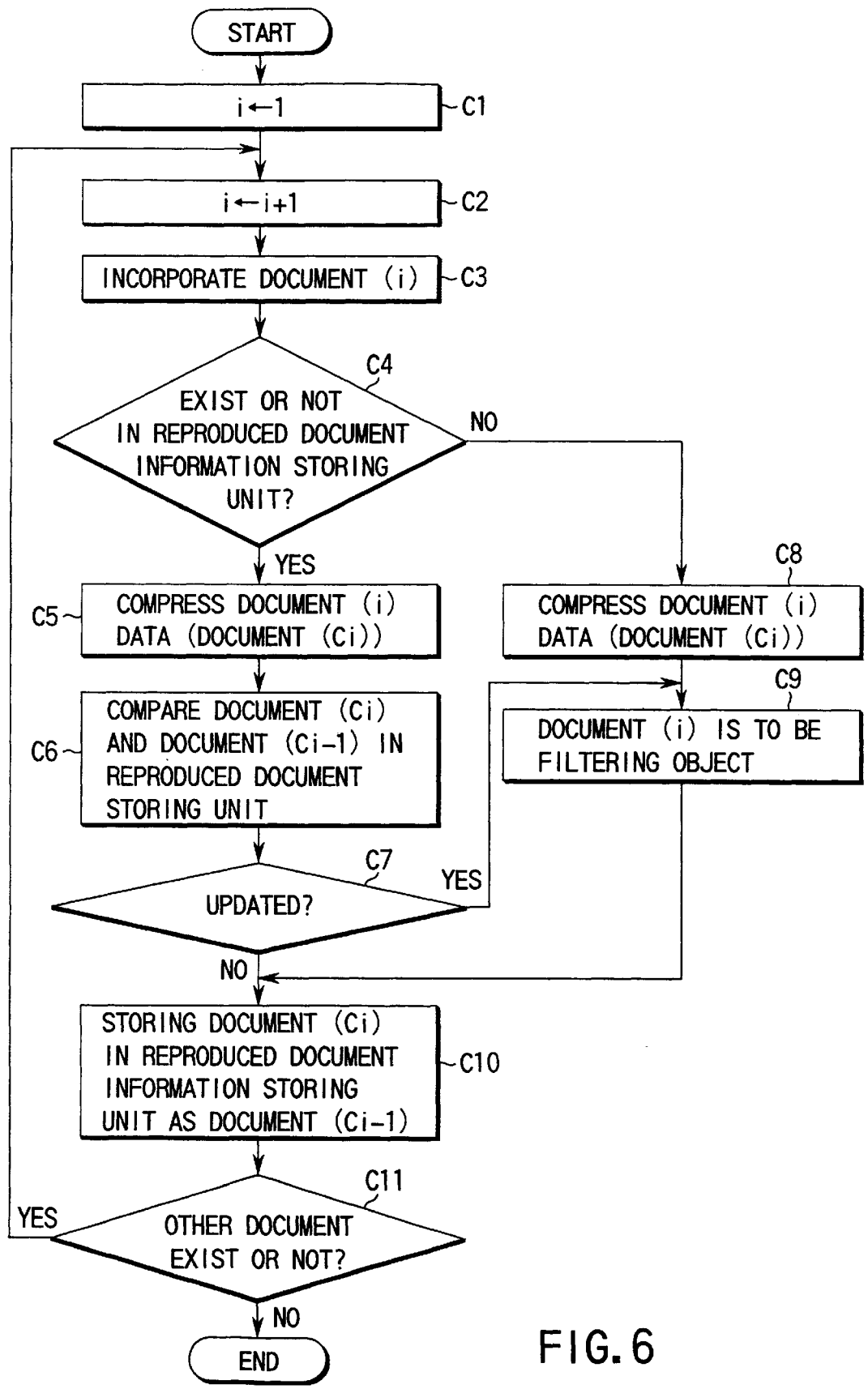
FIG. 6 is a flow chart showing a flow of processing in an updated-document detecting unit according to a second embodiment of the present invention.

In FIG. 6, a flow of processing in the updated document detecting unit 12 according to the embodiment is shown. There is a difference from the processing in the updated document detecting unit 12 shown in FIG. 2 in that an obtain document information is subjected data compression (step C5, step C8).

As an approach for compressing data, various approaches already disclosed can be adopted. For example, in a compress command existing as UNIX command, an adaptive lempel-ziv-coding scheme is adopted. This approach for compressing data is outside the scope of the present invention and every approach therefor can be used without departing the scope of the present invention.

In the case of the present invention, data reproduction guaranteed in an ordinary data compression is not necessarily required, wherein data reproduction means to return compressed data to the original form. The reason why is that it is only required to decide on whether or not there is a difference by comparison on the same document in content between when it was incorporated in a previous time and this time.

For example, data compression can be effected in the following approach:

for (i=0, a=0; b u f [i] !=NULL; i++) a ^=b u f [i];

This example is an example in C language and, when a document i is stored in an array b u f, an exclusive disjunction is computed for each of all the characters in the b u f. According to this approach, any lengthy documents can be compressed in one bite.

The Third Embodiment

The third embodiment of the present invention will be described.

Figure 7:
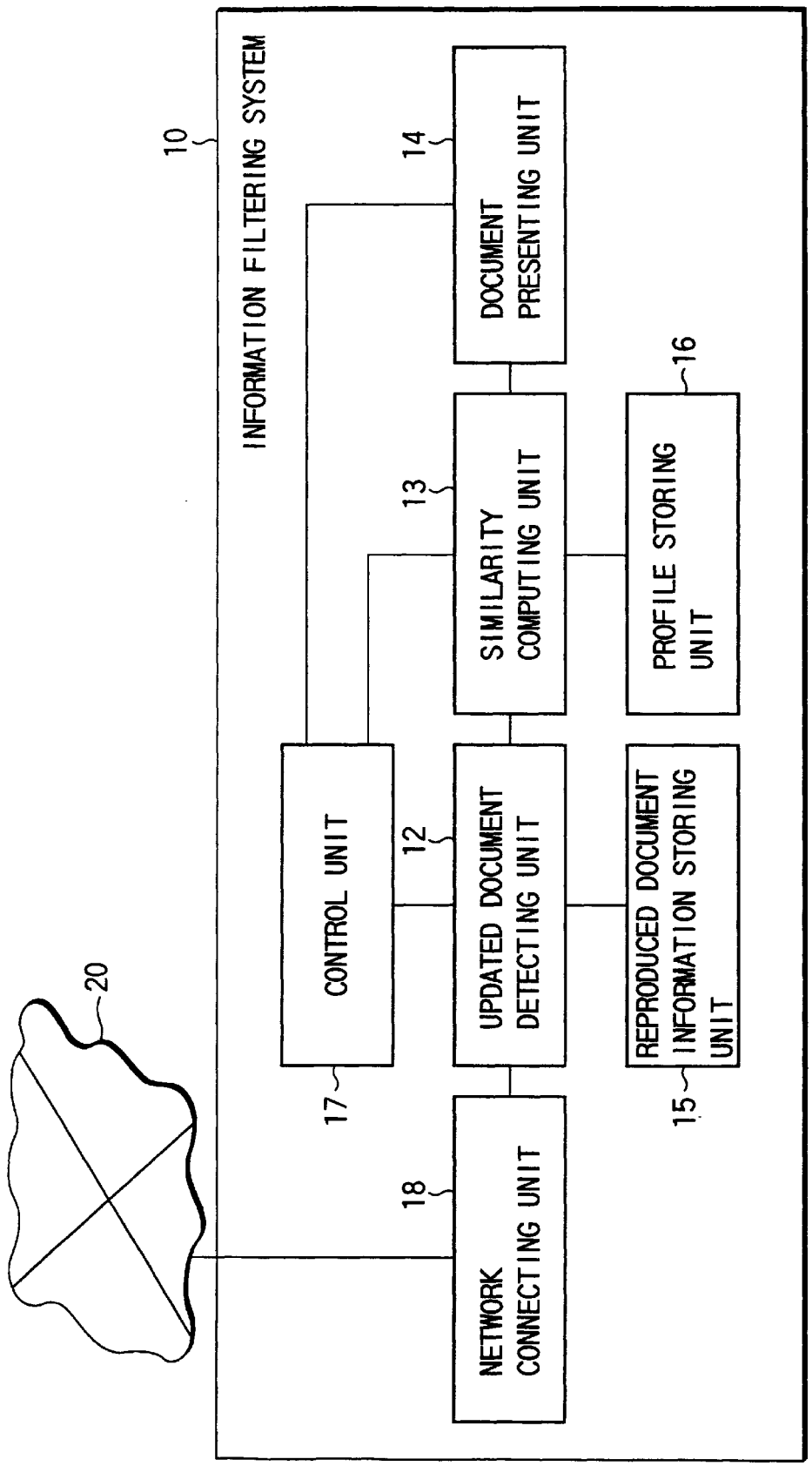
FIG. 7 is a block diagram showing an information filtering system when a document is accessed through a network according to a third embodiment of the present invention.

In FIG. 7, a constitution of an information filtering system when a document is accessed through a network. A difference from the system of FIG. 1 is in that a document data base 11 is not in the system and the document is accessed through the network 20.

In the embodiment, a Web page is accessed by HTTP (Hypertext Transfer Protocol). A Web page is created or updated irregularly by an owner.

All the processing flow is the same as described above in the system of FIG. 1 and there is a difference only in whether a document is accessed through connection with the network 20 or the system is connected locally a document database 11.

In the above description, there are shown application to the case where documents have no information on dates. However, in a document database wherein date information in which a date of creation or updating is stored with a high reliability in a corresponding manner together with the document and the date information can be obtained, it may be decided that a document is a document to be created or updated only when the creation or updating is conducted after a previous filtering process is performed even though reproduced document information is not stored in the reproduced document information storing unit 15. In this case, the updated document detecting unit 12 can decide on creation and updating of documents only be conducting comparison on dates.

As has been in detail described above, according to the present invention, even a kind of document, which is created or updated, and which has no information on date showing a time of creation or updating, is regularly incorporated and a compressed data of the document is stored as reproduced information.

Since a document, newly created or updated, is detected among a plurality of documents by comparison between incorporated document and a reproduced information, the document, newly created or updated, can be only transmitted to a user.

In the present invention, even a kind of document, created or updated irregularly, is obtain regularly, the document is stored in the form of a compressed data as reproduced information and detection of a document, newly created or updated, is only carried out among a plurality of documents by comparison of the reproduced information with an obtain document.

Then only new information can be presented to a user if a document, newly created or updated, is subjected to information filtering.

The Fourth Embodiment

Figure 8:
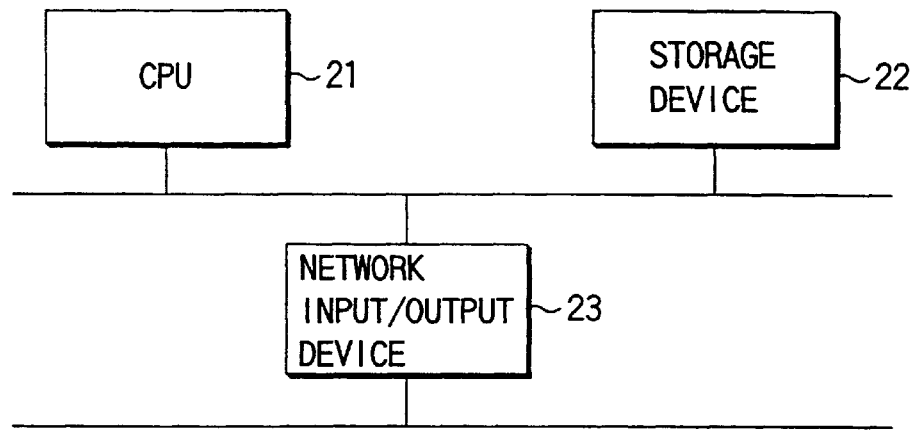
FIG. 8 is a diagram showing a device configuration of an information filtering system of a fourth embodiment of the present invention.

The fourth embodiment of the present invention will be described. In FIG. 8, the device configuration of an information filtering system of the embodiment is shown.

As shown in FIG. 8, the information filtering system of the embodiment comprises an operating system, a CPU controlling execution of various application programs including utility (, in which various programs dedicated to a filtering process are included,) a storing unit 22 which stores application programs and various kinds of data and a network input-output unit 23.

The present invention can be executed in the form of a software and it is possible for information to be provided in the form stored in a floppy disk or a CD-ROM or in the form to be obtained through a network from a magnetic disk and the like in which the information is already stored.

Figure 9:
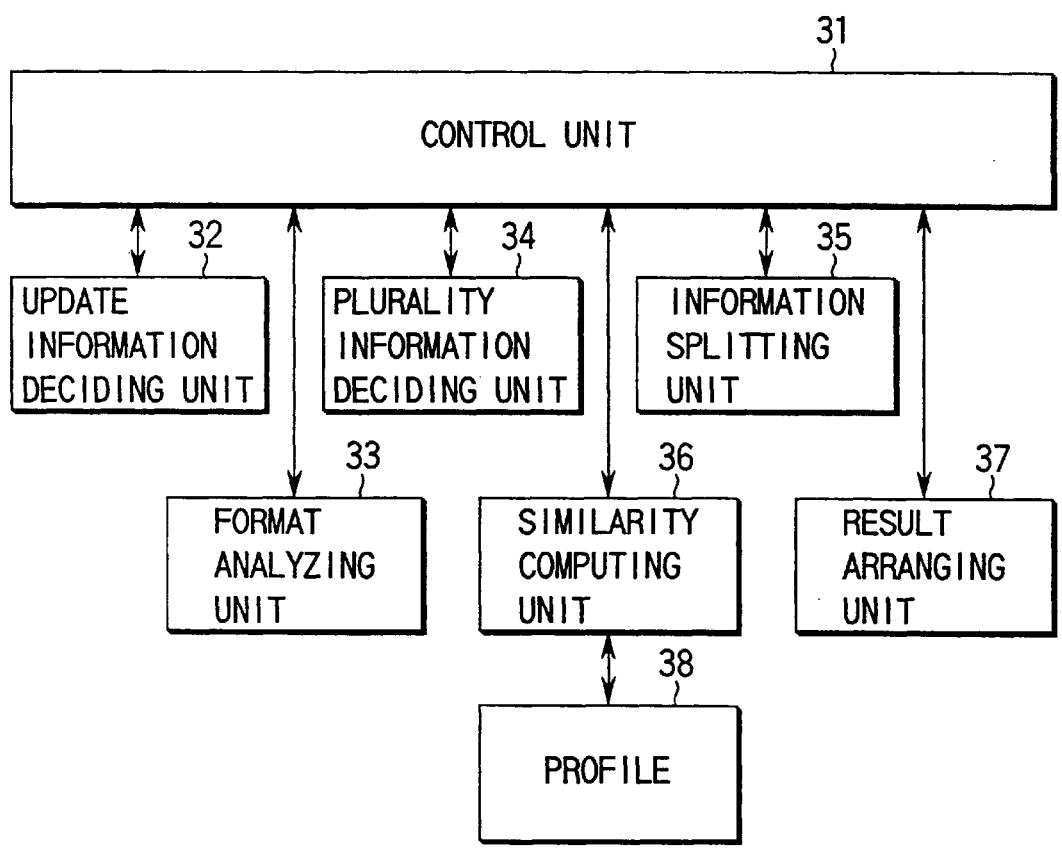
FIG. 9 is a functional block diagram showing an information filtering system of the fourth embodiment.

FIG. 9 shows a functional block diagram of information filtering system of the embodiment.

As shown in FIG. 9, the information filtering system comprises processing units such as a control unit 31, updated information deciding unit 32, a format analyzing unit 33, information plurality deciding unit 34, a information splitting unit 35, a similarity computing unit 36 and a result arranging unit 37. These processing units are constructed as application programs, execution of which is controlled by the CPU 21.

The control unit 31 controls operations of all the system. The update information deciding unit 32 decide on whether or not data of an object for processing is newly created. The format analyzing unit 33 analyzes a logical structure of the data (HTML). The information plurality deciding unit 34 decides on whether or not the obtained data has a plural contents.

The information splitting unit 35 splits data into pieces by contents, if the data has a plurality of contents. The similarity computing unit 36 computes a similarity in comparison between the data of an object for computation and a profile 38. The result arranging unit 15 corrects the form in order by arranging in the descending order of similarity.

Figure 10:
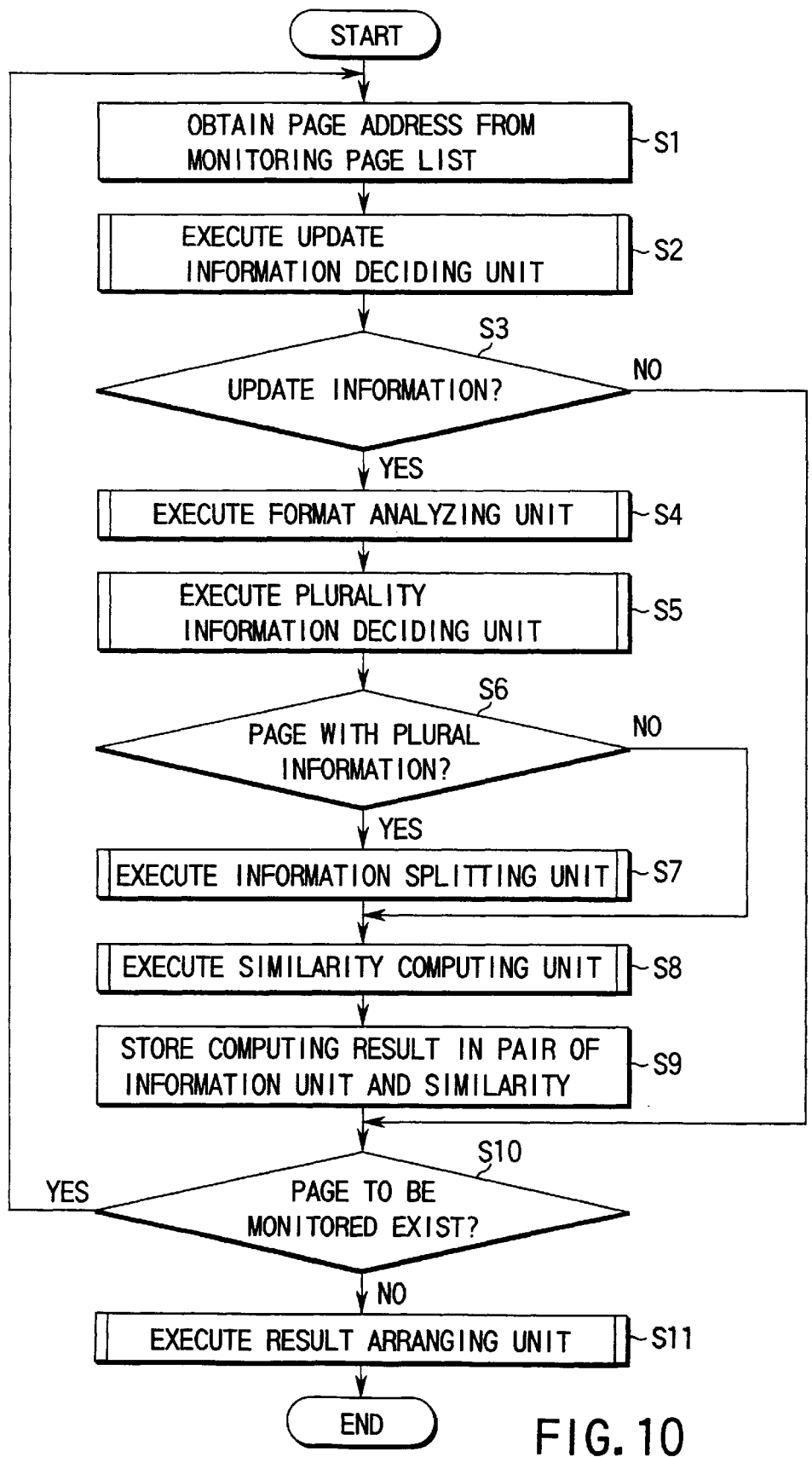
FIG. 10 is a flow chart showing a flow of processing in a control unit in the fourth embodiment.

A flow of processing in the control unit 31 is described in reference to FIG. 10. The control unit 31 processes all the pages already entered into a monitoring page list.

The monitoring page list is a list of addresses to be monitored by the system. The user enters a page address, which the user wants to monitor with, into the monitoring page list.

First of all, the control unit 31 obtains the address of a Web page from the monitoring page list (step S1).

Then, the control unit 31 executes the updated information deciding unit 32 (step S2) based on the obtained address and decide on whether or not the page of the address is a new information (step S2).

If the page is a new information (Y of step S3), the control unit 31 executes the format analyzing unit 33 (step S4) to incorporate a page of an object to be processed and analyze a logical structure of the page.

The control unit 31 then executes the information plurality deciding unit 34 (step S5) and decides on whether or not a page of an object for processing comprises a plurality of information units (step S6). If the page is a page comprising a plurality of information units (Y of step S6), the control unit 31 executes the information splitting unit 35 (step S7) to split contents of the page into the information units.

In the similarity computing unit 36, if the page of an object is split in the information splitting unit 35, a similarity of each information unit is computed and if the page is not split, a similarity between the page of an object and an entered profile 38 with respect to the whole page of an object (step S8).

On the other hand, if the page is decided not to be composed of a plurality of information units in step S6, a process of step S8 is executed.

The control unit 31 stores a similarity thus computed together with information units of the object for computation (step S9).

If a page address to be processed is remained in the monitoring page list (Y of step S10), the control unit 31 returns to the first processing to process the remained page address, but if there is no page left unprocessed (N of step S10), the control unit 31 excutes the result arranging unit 37 (step S11).

The result arranging unit 37 refers to a result of stored similarity computation and conducts sorting the information units in the descending order of similarity to produce an information filtering result to be presented to an user.

Figure 11:
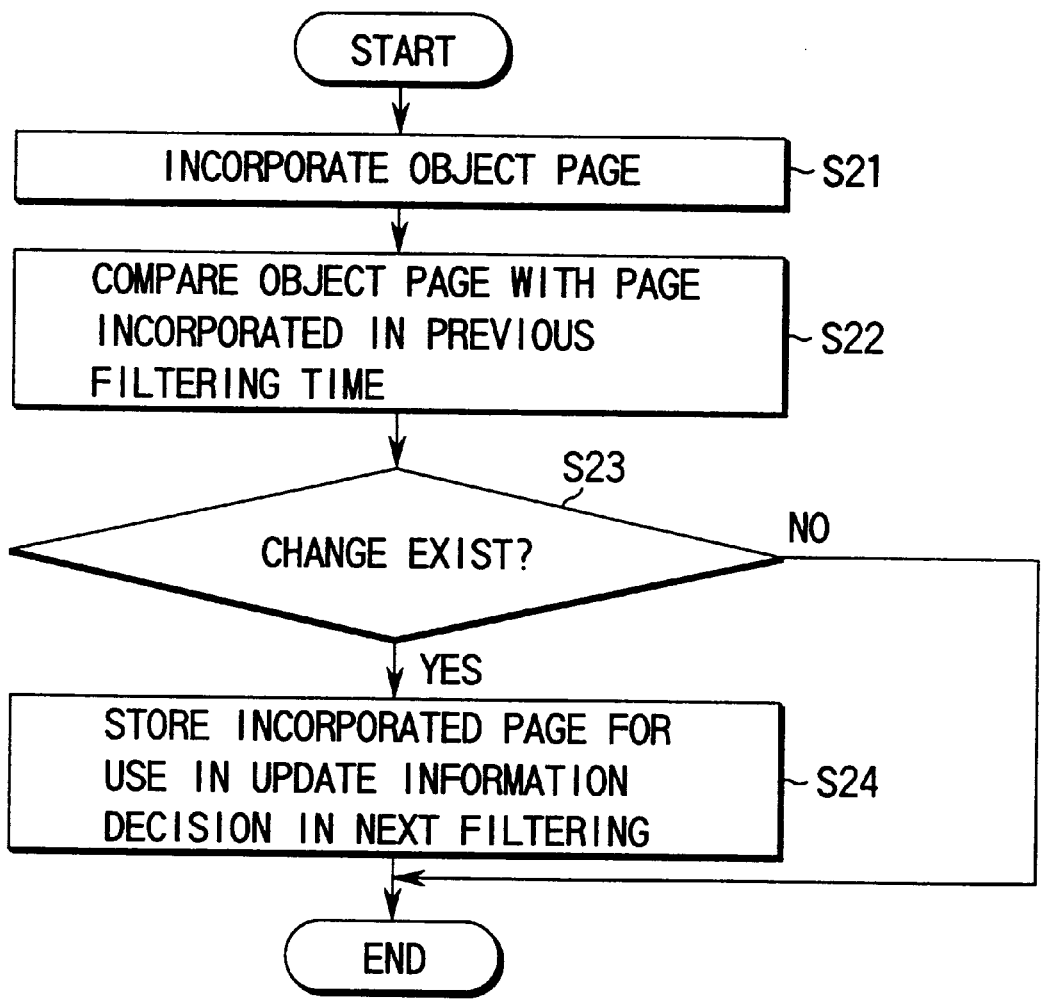
FIG. 11 is a flow chart showing a flow of processing in an update information deciding unit of the fourth embodiment.

A flow of processing in the update information deciding unit 32 will be described in reference to FIG. 11.

In the embodiment, an incorporated page during the filtering this time (step S21) is compared with a page incorporated during the filtering at a previous time (step S22) to decide on whether or not the incorporated page is updated (step S23).

If a change is found (Y of step S23), the incorporated page is so stored as to be utilized in next filtering (step S24) and the processing is terminated.

On the other hand, if no change occurs in step S23, the update information deciding process is finished.

When a date of creation or updating can be obtained, it is needless to say that such an information may be naturally used. In the fifth embodiment, processing in decision on updated information corresponding to a hierarchical relation of a Web page will be described.

In a format analyzing unit 33, information of a Web page is modified to a inner structure based on tags attached to data in a HTML format. HTML is a sub-set of SGML and a logical structure is defined based of a starting tag and an ending tag.

For example, a title is defined a portion lying between a start tag <TITLE> and an ending tag </TITLE> and an itemization is defined a portion lying between a start tag <UL> and an ending tag </UL>.

Besides, there are cases where tags are used with omission of an ending tag, such as <P> which is used for definition of the end of a paragraph and <LI> which is used to represent each item. In the use of these tags, when the same start tag appears again, it is regarded that an ending tag already exists.

In a format analysis, a first tag of HTML is detected by scanning a sequence of characters in an input data. All information corresponding to the start and ending tags is obtained when the ending tags is detected.

Figure 12:
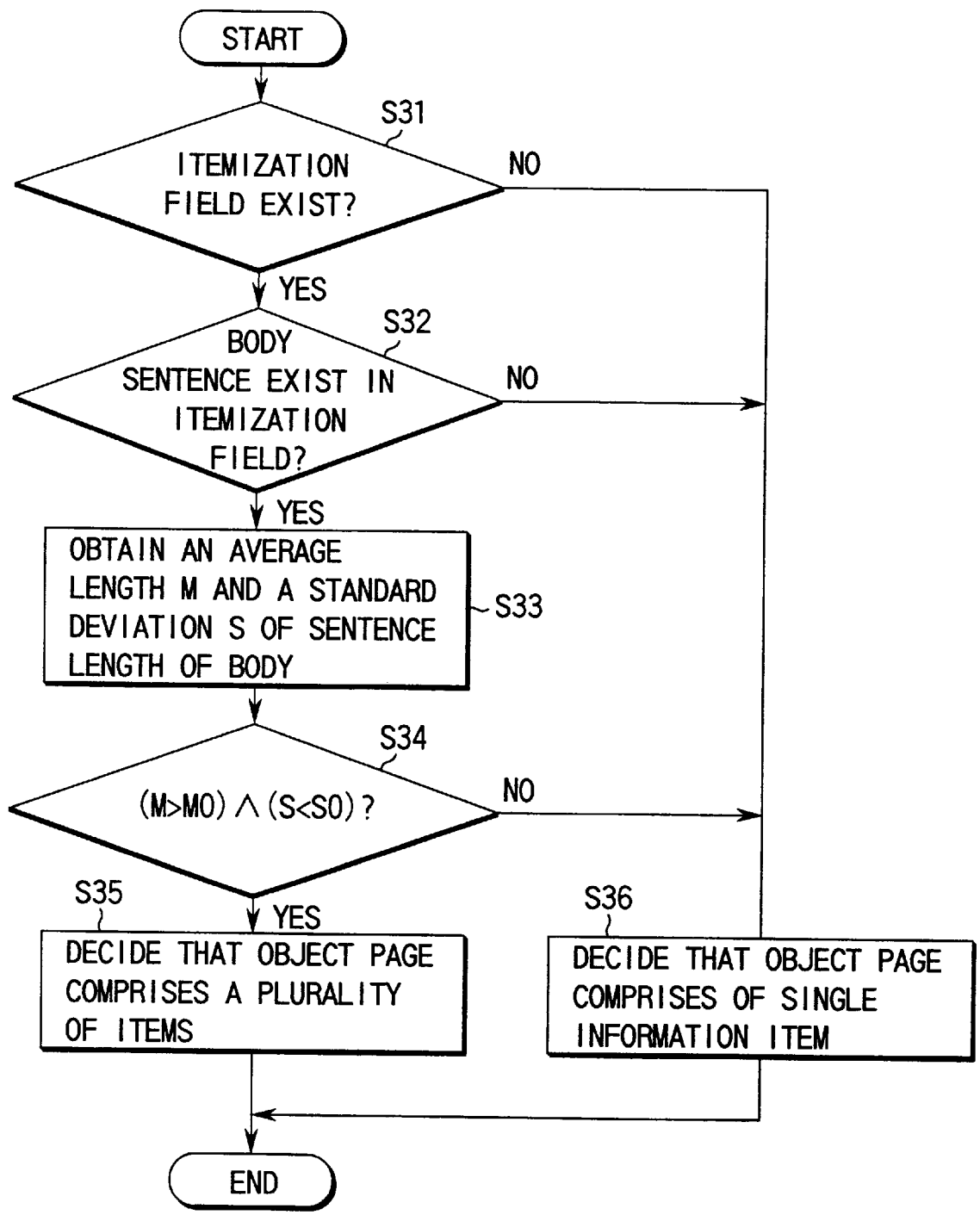
FIG. 12 is a flow chart showing a flow of processing in an information plurality deciding unit of the fourth embodiment.

A flow of processing in the information plurality deciding unit 34 will be described in reference to FIG. 12. When a field for an itemization exists (Y of step S32) and body sentences exist in each item of the field for the itemization (Y of step S31), the information plurality deciding unit 34 works to attain an average length (M) and a standard deviation (S) of a sequence of characters in the body of each item (step S33).

If the average length(M) is longer than a predetermined length (M0) and the standard deviation (S) is smaller than a predetermined value (S0) (Y of step S34), the page of an object for decision is decided to be composed of a plurality of information units (step S35).

On the other hand, if it is decided that a field for an itemization does not exist in step S31, that body sentences do not exist in each item of the field for an article in step S 32 or it is not decided that an average length (M) is larger than a predetermined length (M0) and the standard deviation (S) is less than a predetermined value (S0), a page of an object is decided to be only one information unit (step S36).

In FIG. 13, an example of description of HTML composed of a plurality of information units and in FIG. 14, a display image of the page are shown.

Headlines in items written in an itemized manner are sequences of characters lying between a tag <LI> and a paragraph starting tag <BR>. On the other hand, sentences in a body is those from the <BR> where the headlines are finished to next <LI>. When the length of a sentence is measured, computation is effected excluding tags.

In HTML, there is a tag <DL> which defines a field of itemization. In this case, a <DT> and <DD> respectively express headlines of each item and the body of each description unit, wherein computation of a length of a sentence is conducted in the scope from <DD> to <DT> as a body of the description.

Means for memorizing information of each page on whether or not a page of an object for processing is composed of a plurality of information units is provided and plurality information may be detected with the help of the means.

In the information splitting unit 35, a field of itemization is output in the form of separate items. In a concrete manner, the description of a page is split into itemized units of information (headlines and a body of sentences) as detected in the information plurality deciding unit 34. The split result is, as shown in FIG. 15, modified into data composed of a headline (a portion lying between <HEADING> and </HEADING>) and sentences in the body (a portion lying between <BODY> and </BODY>).

Processing in the similarity computing unit 36 is only required to be conducted according to the computing method already described, wherein, for example, a retrieval condition stored in a profile 38 and each information unit of an object to be processed are expressed as vectors of a word and a frequency and an inner product between the vectors is obtained in order to obtain a similarity.

Figure 16:
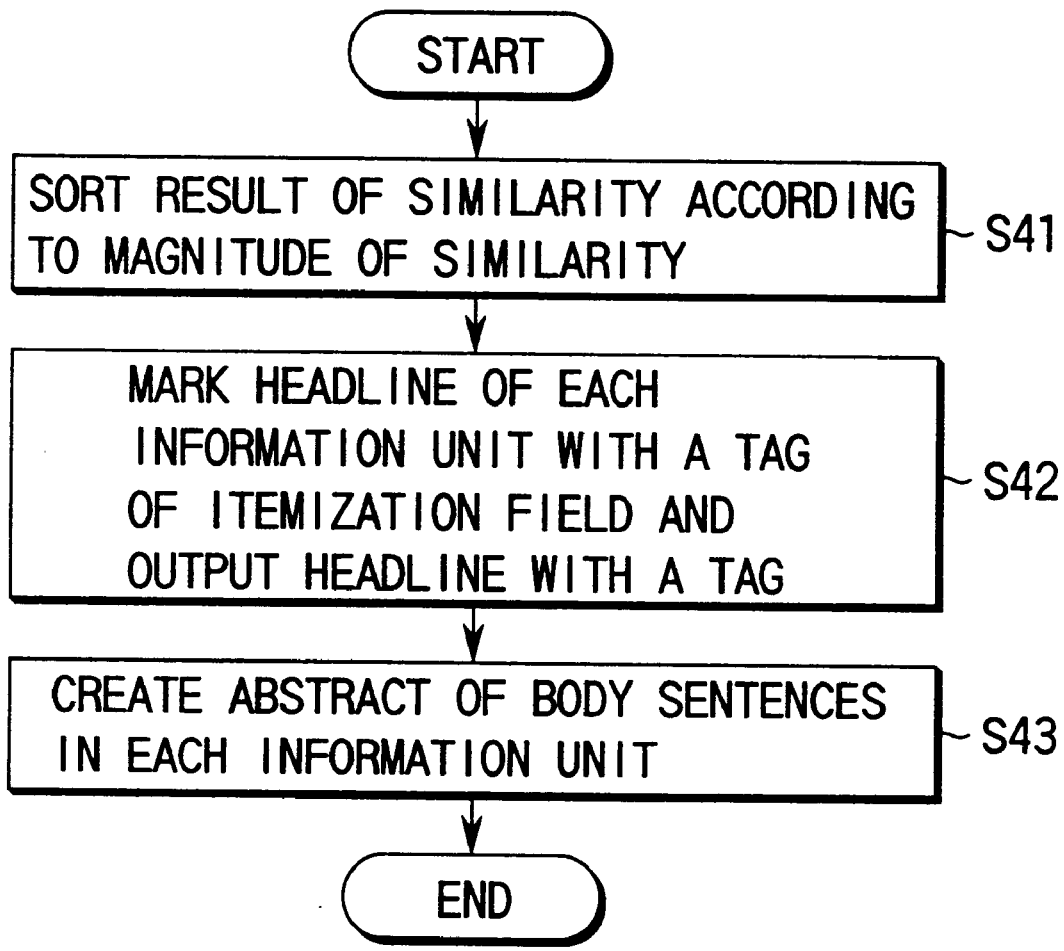
FIG. 16 is a flow chart showing a flow of processing in a result arranging unit of the fourth embodiment.

A flow of processing in the result arranging unit 37 will be described in reference to FIG. 16.

The result arranging unit 37 sorts each information unit computed in the similarity computing unit 36 based on the magnitude of a similarity (step S41).

The result arranging unit 37 arranges headlines of information units as items of itemization (step S42) and presents an abstract produced from sentences in a body in the order of sorting results to output (step S43).

As a production of an abstract, for example, it may be a simple processing wherein several sentences are obtained from a first portion of a page. In FIG. 17, a result of arrangement by the result arranging unit 37 is exemplified, wherein two units of information are extracted.

In the embodiment, since it is conceived that an output is displayed by Web browser such as Mosaic, a result of arrangement is output in an HTML format. The reason why is because, when an original document of a selected document as a result of filtering is accessed, unification between document formats has been sought. Therefore, modification to any format which can be incorporated by a special browser is very easy without restricting to an output in a HTML format.

As described above, according to the information filtering system of the embodiment, Web pages some of which each comprise a single content and the other of which each comprise a plurality of contents can be objects for filtering at the same time and filtering with a high precision can be executed.

The Fifth Embodiment

The fifth embodiment will be described. A form in which pages to be monitored are all registered in advance has been described in the fourth embodiment. However, a Web page can forms a hierarchical structure by the use of hypertext and therefore a problem has a chance to occur in a form wherein a single page is only registered.

Figures 18A, 18B:
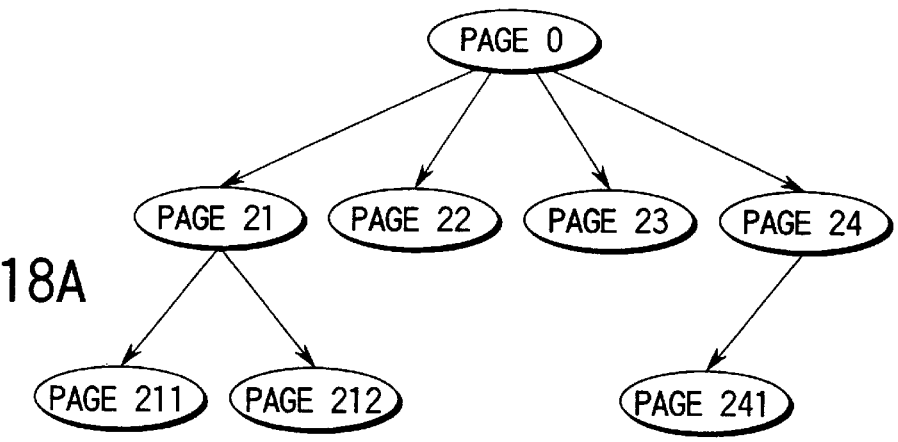
FIG. 18A is an illustration of Web pages constructing a hierarchical structure in hypertext. format adjusting.
FIG. 18B is a depiction illustrating one of Web pages constructing a hierarchical structure in hypertext.

For example, as shown in FIG. 18A, a case is considered where other pages which are referred to by a page 0 co-exist in a layered relation and the page 0 is only constituted of pieces of link information with respective pages as shown in FIG. 18B.

In this case, new information is to be stored in a page 21 into which new arrival information is entered or in a page 24 into which press releases are entered and therefore it is clear that a content of the page 0 is almost no way updated any more.

Accordingly, as shown in the fourth embodiment, even if the page 0 has been registered as a monitoring page in advance, it is impossible to detect updating of new arrival information on the page 21, when the updating is conducted.

In the embodiment, there is provided a monitored information specifying means in order to specify monitoring information. A user sets, in advance, a scope of positions of a hierarchical structure in which monitoring is effected in regard to creation of new information. On the other hand, in the update information deciding unit 32, decision on whether or not information is new is conducted tracing in the specified scope of hierarchical positions.

In the monitored information specifying means, a format shown in FIG. 19 is used as a format of a monitoring page list and a user specifies a monitored page address and the step number of links connected end to end from the specified page. Alternately, a user can also specifies all the pages as monitored pages and the same step number of links connected end to end from each of the pages.

Figures 20A, 20B:
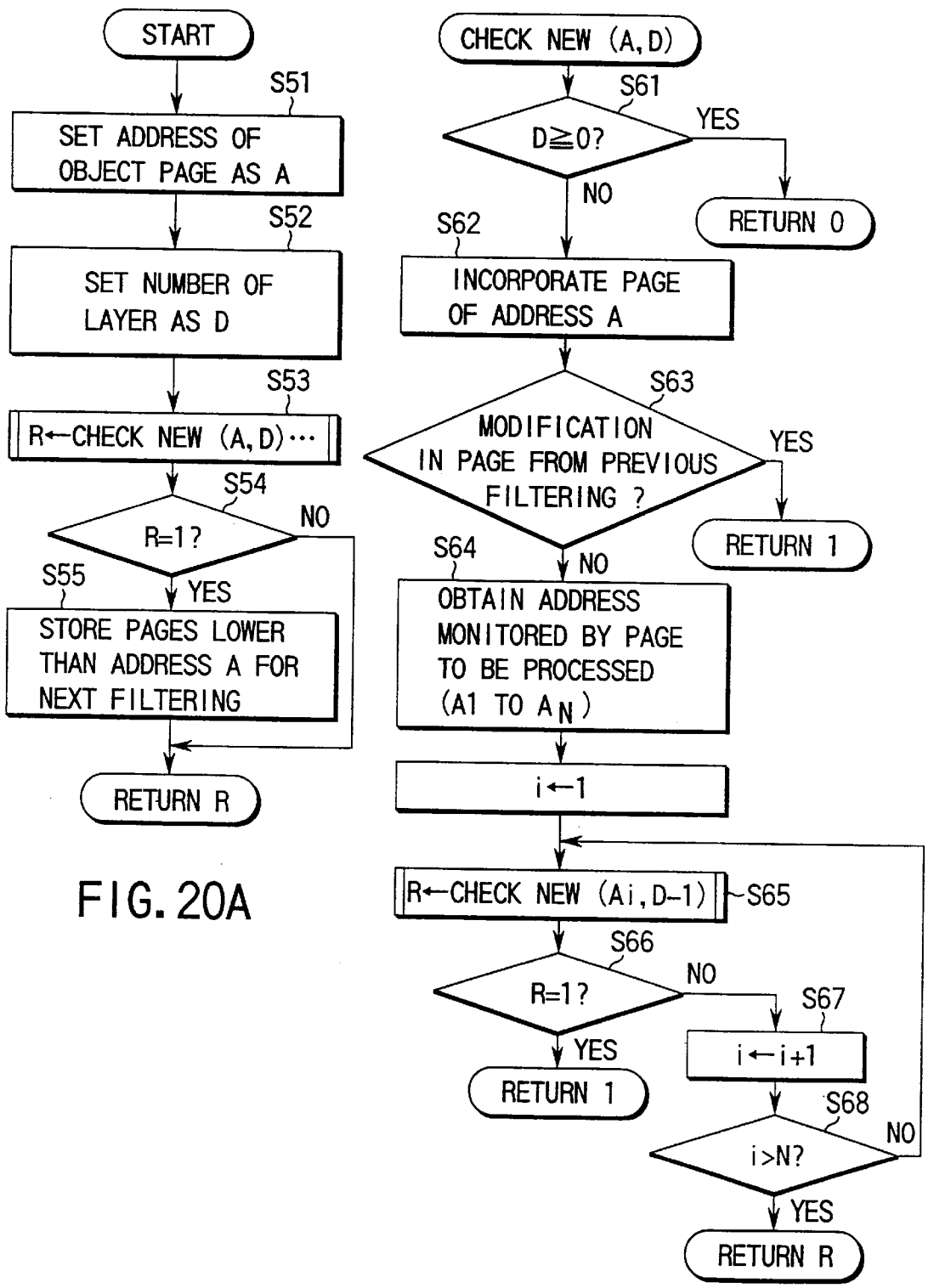
FIG. 20A is a flow chart showing a flow of processing in a new information deciding unit of the fifth embodiment.
FIG. 20B is a flow chart showing a flow of processing in a new information deciding unit of the fifth embodiment.

A flow of processing in the updated information deciding unit 14 of the embodiment is shown in FIGS. 20A and 20B. A subroutine check New (FIG. 20B) recursively checks on whether or not a page located in a lower position than a specified page includes.

Detection on whether or not there happens an updating in a page after a previous filtering time can be realized by comparison between an incorporated content of the page at the previous filtering and the present content thereof in similar manner to the fourth embodiment.

A flow chart of FIGS. 20A and 20B will be described.

A page address of an object to be checked for an update check is indicated at A, a number of positions in a hierarchical structure is indicated as D and a subroutine check New which recursively executes processing for an updating check is called.

A return value of check New means whether updated or not updated. That is, [1] indicates that updating is present in pages which can be accessed by tracing through the D hierarchical positions from a page of address A, wherein the page of address A is inclusive in the positions and [0] means that no updating is present.

If it is decided that R=1 in step S54, that is, if updating is detected, the contents of all the pages are stored which can be traced through D hierarchical positions from a page of an address A in order to make the contents to be an object for comparison at next filtering in Step S55. The stored contents are to be used at the next time in step S63 in FIG. 20B.

A subroutine check New is a recursive subroutine which is called in a condition that addresses of pages to be checked on updating and the number of D hierarchical positions, through which the pages are traced, are input as arguments. If D is less than 0 in step S61, it means that all the hierarchical positions have been traced, [0] is returned as a return value and the processing is terminated.

On the other hand, if D≧[0], it means that a recursive processing is not yet finished, A page corresponding to an address A is read and the content is compared with a page having been stored at a previous filtering time in step 55 of FIG. 20A to check whether or not updating, that is a change, has been made in step S63.

If updating is detected, [1] is returned as a return value and the processing is terminated. If updating is not found, the address of a page which is referred to in the page at the address A is obtained in step S64, wherein the obtained addresses are respectively indicated at A1 to AN.

Steps S65 to S68 execute processing for checking on updating of the obtained N pages marked with A1 to AN, while calling the subroutine check New in a repeated manner.

In the series of processings, it is decided on whether or not updating exists in the pages which can be traced in the scope between a page at the hierarchical position of D−1 in number counted from the page at an address Ai, while check New is called in a condition that the number D−1 of hierarchical positions is an argument at an address Ai in step S65. If updating exists, the processing is terminated at a return value [1], but if updating does not exist, the processing is continued for further checking with successive increases in number of [i].

The information splitting unit 35 executes splitting information units for each page during the tracing through positions in the hierarchical structure. Such processing can be realized by executing the processing in the fourth embodiment in a recursive manner, the procedure of which processing, therefore, is not explained.

In the updated information deciding unit 32 of the embodiment, at a time when a page whose content is modified is detected, it is regarded that there have been a change in a hierarchical structure lower than a page which is set as a monitoring page and tracing to pages in the lower positions in the hierarchical structure is stopped.

In this case, there is a need to executing processing on all the pages lower in hierarchical position than the monitoring page in the information splitting unit 35. In the update information deciding unit 32, checking may be executed on whether or not modification has been effected in the pages in the lower hierarchical positions than a page in which the content is modified is detected. In this case, the information splitting unit 35 is only required to execute information splitting processing on pages in which content have been modified.

The embodiment is to describe an embodiment in which a user itself enter an address of a page to be monitored by the system into a list of monitoring pages, wherein the system is considered to be rather small in scale.

On the other hand, in the case of a large scaled system, there is difficulty in registering all the pages to be monitored in advance. Therefore, it is conceivable to trace in succession addresses described in incorporated pages. In the case of execution as a large scaled system, a scope in which pages are monitored can be enlarged by employing such a successive manner.

There is a case where links are extended to pages outside a Web site. In such a case, links outside the Web site can be neglected as a modified case.

According to the information filtering system of the embodiment, as described above, it is possible to monitor Web pages having a hierarchical structure and to detect created or updated information in the specified scope without fail, when creation or updating of information has occurred.

The Sixth Embodiment

The sixth embodiment will be described. In this embodiment, a system which has a merging function with a result output by another information filtering device.

In the fourth and fifth embodiments, it is a precondition that pages to be monitored can be incorporated according to a HTTP procedure. However, there are information among those wanted by a user which is not publicized as a Web page.

Figure 21:
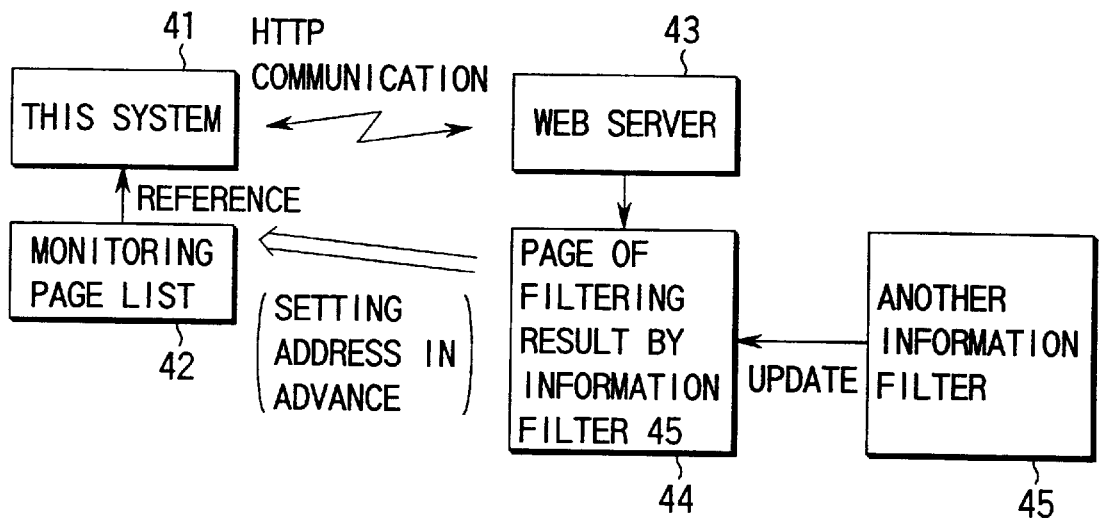
FIG. 21 is a block diagram showing an operating principle incorporating a result of filtering in another filtering unit of a sixth embodiment of the present invention.
Figure 22:
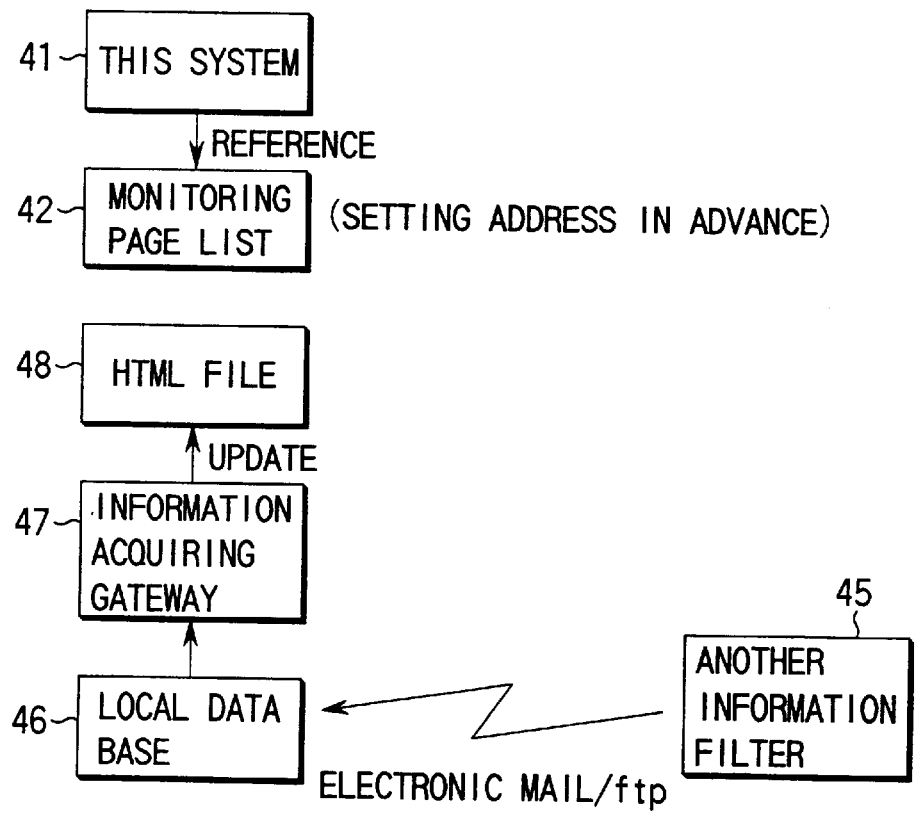
FIG. 22 is a block diagram showing an operating principle incorporating a result of filtering in another filtering unit of a sixth embodiment of the present invention.

In FIGS. 21 and 22, an operating principle in which a filtering result in another filtering device is incorporated.

FIG. 21 is to show a processing where a Web server 43 is set and a filtering result is written in a Web page 44 in the Web server 43 by another information filter 45.

Filtering can be effected in a similar way to other web pages by entering the Web page 44 into the monitoring page list 42 of the present invention.

On the other hand, a case where information is stored in a local network as an accessible file by electronic mail or in accordance with ftp procedure is shown in FIG. 22. In this case, filtering can be effected in a similar way to other Web pages by providing an information incorporating gateway 47 in conformity with a file format already incorporated.

In the case where another information filter 45 outputs a filtering result in accordance to ftp procedure, a filtering result of the information filter 45 is written in a file given a predetermined name (in a local database 46).

This file is output by the predetermined name into the information incorporation gateway 47, wherein the file is modified into a HTML format. Filtering can be effected in a similar way to other Web pages by entering an address of this HTML file into the monitoring page list 42.

When information is sent by electronic mail, the electronic mail (called mail box) is stored in a specific file. In order to distinguish over other general electronic mails, A sequence of characters which is determined in advance is written in a Subject field of an electronic mail and the electronic mail is transmitted through another information filter 45. The information incorporating gateway 47 is only required that it converts a mail in which the predetermined sequence of characters set in the Subject field into a HTML format and updates a HTML file.

Figure 24:
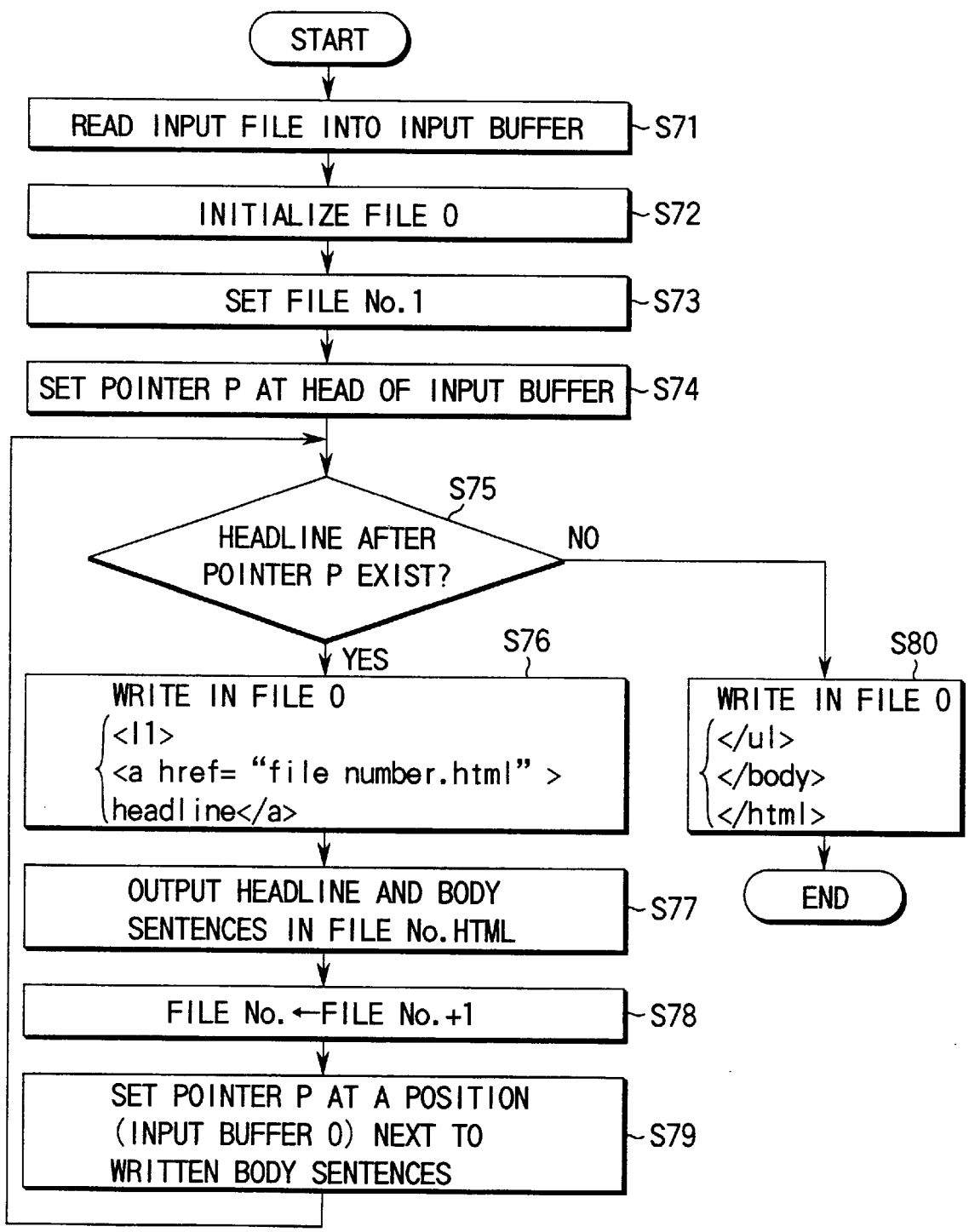
FIG. 24 is a flow chart showing a procedure converting the transmitted data from the sixth embodiment into HTML.

A flow of processing of the information incorporating gateway 47 is dependent on a file output by a format of another information filter 45 or an electronic mail. For example, in the case where data shown in FIG. 23 is transmitted, information can be converted to in HTML in accordance to a procedure shown in FIG. 24.

That is, after a input file is read into a input buffer (step S71), an HTML file (file 0) which consisting of link data is initialized (after created, a sequence of characters shown in FIG. 25 is written) (step S72).

Next, a file number is set at 1 (step S73), processing is started at the first portion of the input buffer (step S74), it is checked on whether or not a headline is present after a pointer P (step S75). In an input file to be processed, a line whose first portion has [*] is a headline and the information on the headline and the name of a file corresponding the number of the file (when a file number is 1, a file name is "1. h t m 1") is output to the file 0, after the information on the headline is obtained (step S76). Then, the headline and sentences in a body following the headline in an input buffer are written in the file name in an input buffer (step S77), the number of a file is advanced by 1 (step S78) and, thereafter, the above mentioned processing is repeated.

When headlines to be processed are not detected in the input buffer (N of step S75), a sequence of characters shown in FIG. 26 is output in the file 0 and the processing is terminated. In FIGS. 27 and 28, modified results of data shown in FIG. 23 are shown.

In the embodiment, in order to increase modularity of processing, an embodiment in which information is once modified to a HTLM file has been describe. If modularity is neglected, it is easy to modify so that a file of a result of filtering which is output by another information filer is directly handle as an input for an device of the present invention.

As described above, according to the information filtering system of the embodiment, a broader scope of information than the information filtering device can singly monitor can be monitored by reading a result of filtering output by another filtering device.

According to the present invention, Web pages having a plurality of formats and other document information are processed in a unific manner and can be presented to an user in a form familiar to the user.

Moreover, through specification of the number of hierarchical positions to be filtered, Web pages expressing one information can be effectively monitored in regard to updating and non-restrictive tracing through hierarchical positions can be excluded, so that a processing time can be reduced.

A result of information filtering of another information filtering device can be output in a similar manner to other documents and thereby results a user is easy to understand can be presented.

In the information filtering device of the present invention, a control unit decides on whether each document is data of a single content or of a plurality of contents. If data is decided to be data composed of a plurality of contents by the deciding unit, the splitting unit works to split the document into information units in order to effect filtering processing on each content.

The similarity computing unit computes a similarity with a retrieval condition on each split information unit. Thereby, in the information filtering device of the present invention, filtering with a high precision proper to contents can be effected on a mixture of Web pages composed of a single content and a plurality of information units.

In the information filtering device of the present invention, a first setting unit sets a document to be monitored, a second setting unit sets the number of hierarchical positions starting at the document set in the first setting unit.

The control unit effects processing data in the scope set in the first and second units. Thereby, monitoring on Web pages in a hierarchical structure can be effected and even when newly created or updated information is detected in the specified scope the information can be detected without fail.

According to the information filtering device of the present invention, information in the broader scope than the information filtering device can singly monitor can be monitored by incorporating a result of filtering output by another information filtering device.

The Seventh Embodiment

The seventh embodiment will be described.

Figure 29:
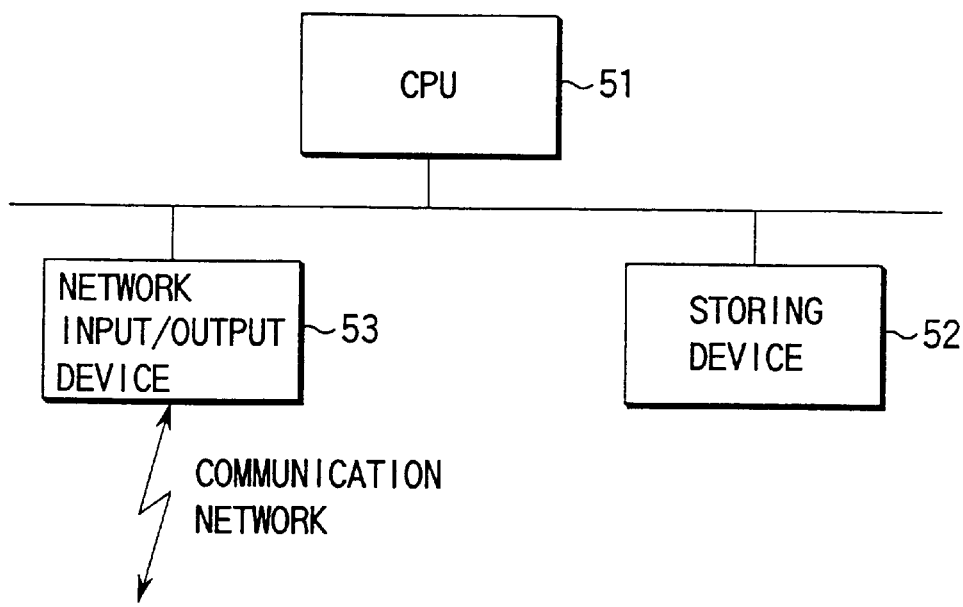
FIG. 29 is a diagram showing a device configuration of an updated document monitoring system of a seventh embodiment of the present invention.

FIG. 29 shows a device configuration of an updated document information monitoring system of the embodiment.

As shown in FIG. 29, the updated document information system comprises a CPU 51 controlling execution of an operating system and various kinds of application programs and utility (including programs effecting update management of document information), a storing unit 52 storing the application programs and data and a line input/output device 53 to access information stored in a storage area managed by another computer through a communication network.

Figure 30:
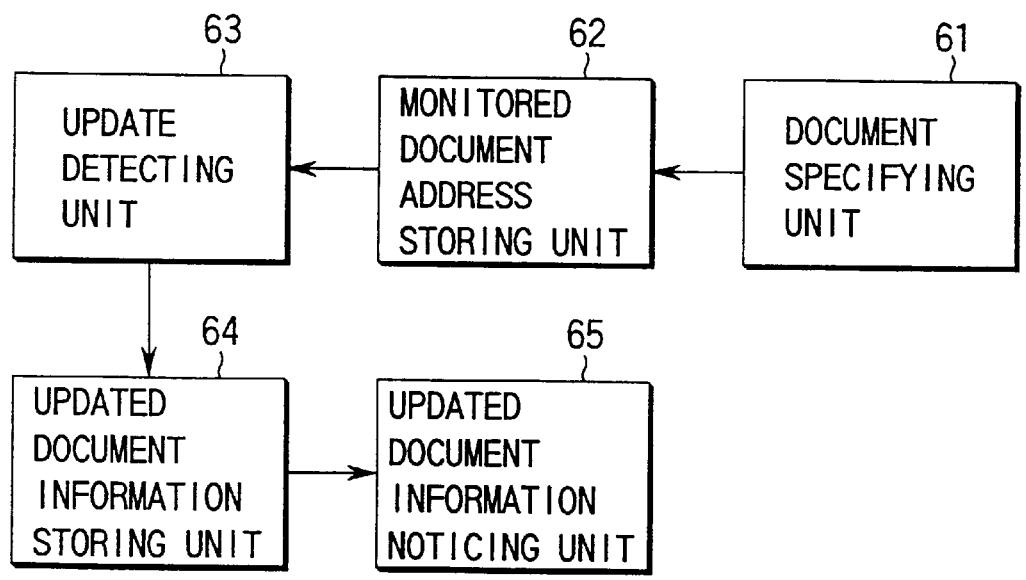
FIG. 30 is a functional block diagram showing an updated document monitoring system of the seventh embodiment.

FIG. 30 shows a functional block diagram of the updated document monitoring system of the embodiment.

As shown in FIG. 30, the updated document information monitoring system comprises a document specifying unit 61, a monitored document address storing unit 62, an update detecting unit 63, an updated document information storing unit 64 and a updated document information noticing unit 65.

The document specifying unit 61 specifies an address at which a document to be monitored on updating is stored. The monitored document address storing unit 62 stores an address of the specified document at the document specifying unit 61.

The updating detecting unit 63 decides on whether or not a document stored in the monitored document address storing unit 62 is updated. The updated document information storing unit 64 stores an address of the document whose updating is detected. The updated document information noticing unit 65 notifies the updated document.

Figure 31:
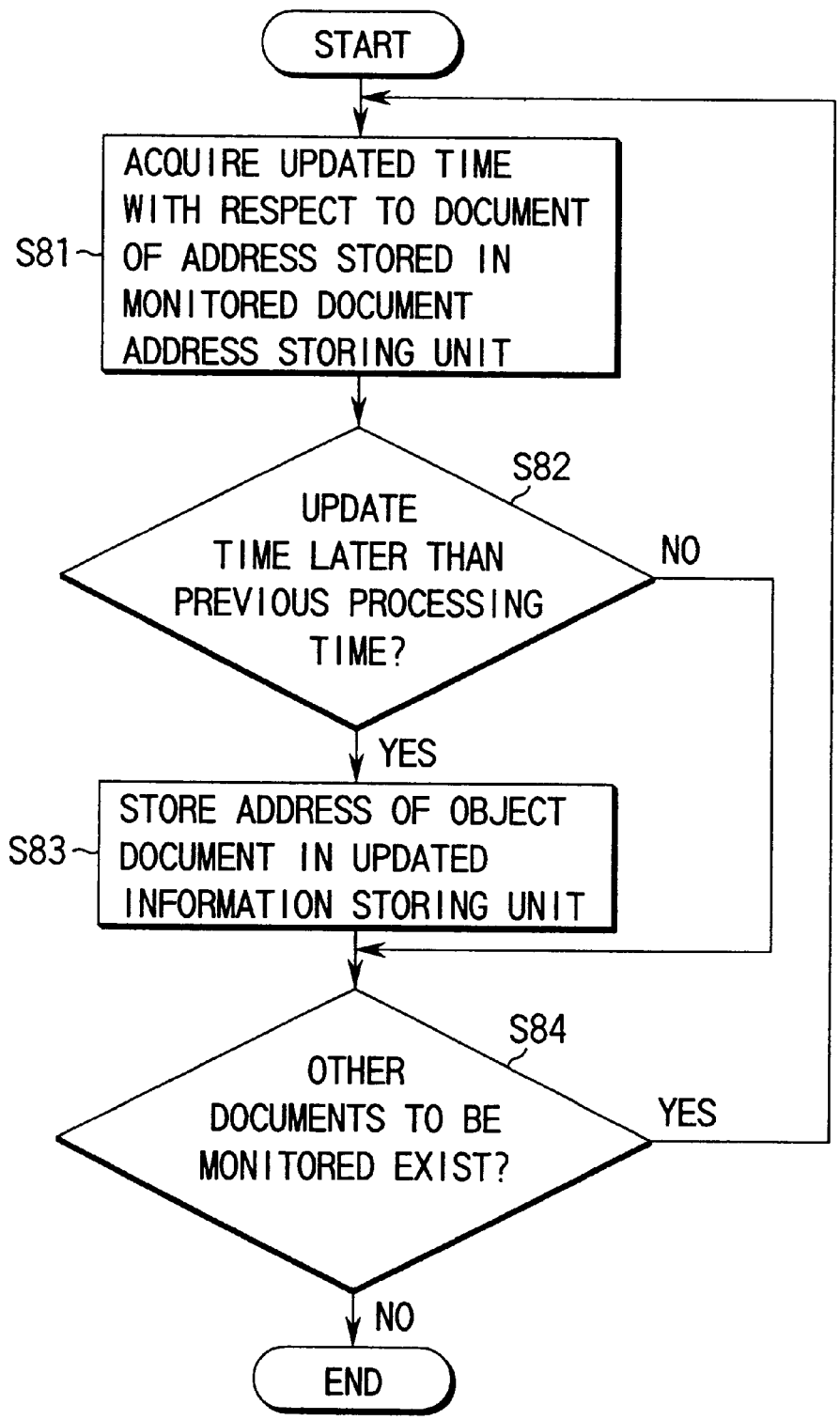
FIG. 31 is a flow chart illustrating a flow of processing in an update detecting unit of the seventh embodiment.

A flow of processing of the updating detecting unit 63 is described in reference to FIG. 31. The update detecting unit 63 receives an update time for each address stored in the monitored document address storing unit 62 (step S81) and if the updating time is later than a previous time of update detection (Y of step S82), the address of the document is stored in the updated document information storing unit 64.

The document specifying unit 61 stores an address input by a user in the monitored document address storing unit 62. The updated document information noticing unit 65 produces a document list corresponding to addresses stored in the updated document information storing unit 64.

Formats of the monitored document address storing unit 62 are shown in FIGS. 32A and 32B.

As shown in FIGS. 32A and 32B, the monitored document address storing unit 62 is composed of a top node referential relation table (FIG. 32A) setting the highest address among documents to be monitored in regard to updating and addresses of a first group of documents which is referred to by the document at the highest address and a sub-node referential relation table (FIG. 32B) setting addresses of a second group of documents lower than the above documents and a third group of documents which are referred to by the second group of documents.

A format of the monitored document address storing unit 65 is not limited to the disclosed format and, to sum up, it is needless to say that any format can be used as far as a format can store documents to be monitored in regard to updating by groups including their hierarchical relations. Hereafter, in descriptions the monitored document address storing unit 65 is described as a unit to store monitored document address.

Figure 33:
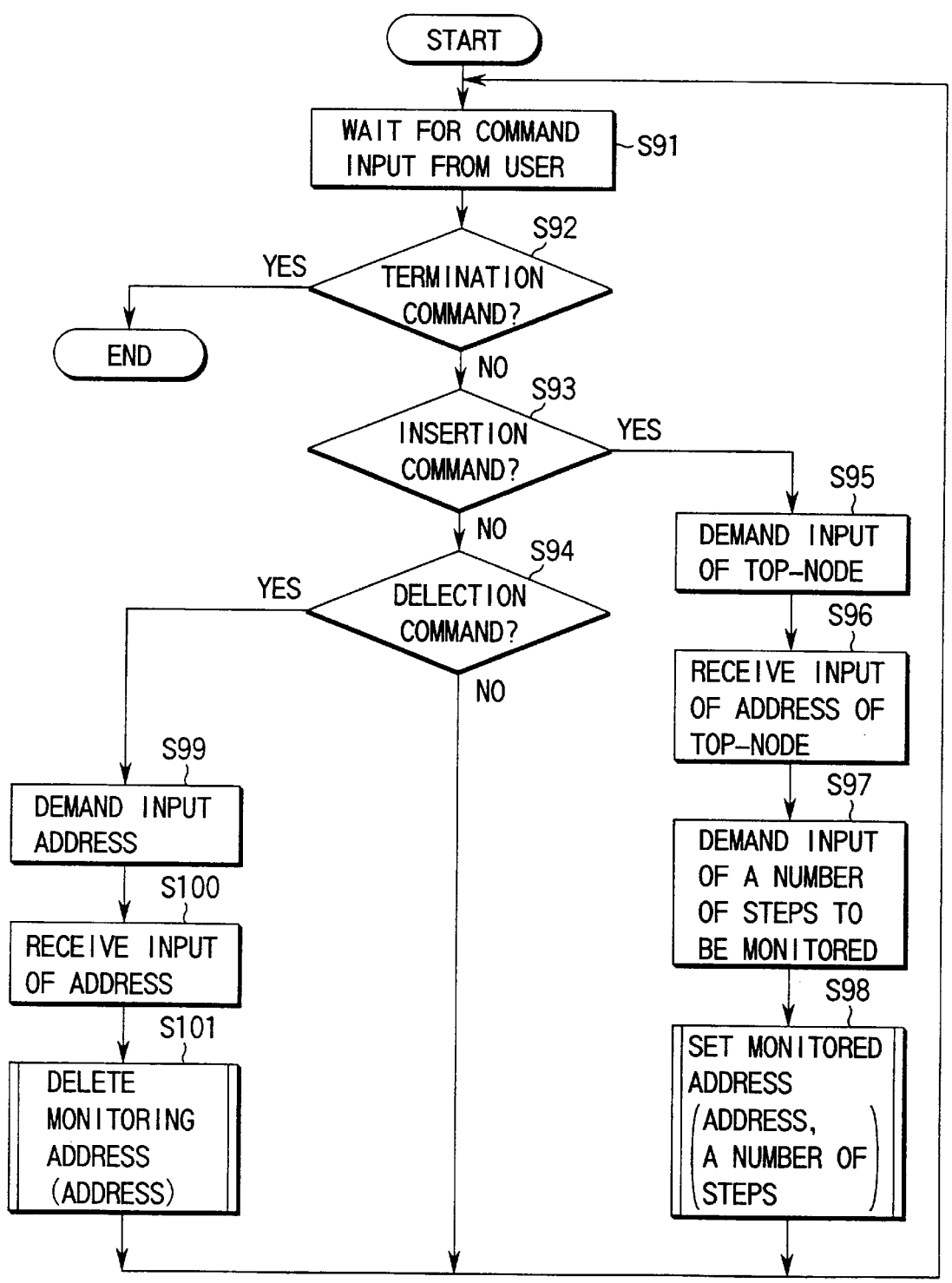
FIG. 33 is a flow chart showing a flow of processing in a document specifying unit of the seventh embodiment.

A flow of processing of the document specifying unit 11 is shown in FIG. 33. In the document specifying unit 61, an command input from a user is received (step S91), if the command is not a terminating command (N of Step S92) but an inserting command (Y of step S93), the user is asked to input addresses of documents of top-node (steps 95 to S96) and to input the step number of links in different hierarchical positions to be traced (step S97).

The document specifying unit 61 sets a monitoring address by making an address and the number of hierarchical positions as arguments (step S98). When an address of a monitored document is input, a user is not necessarily required to input directly. For example, in the case where the document displaying unit is active together, input of an address of a monitored document can be effected by specifying a displayed document.

Figure 34:
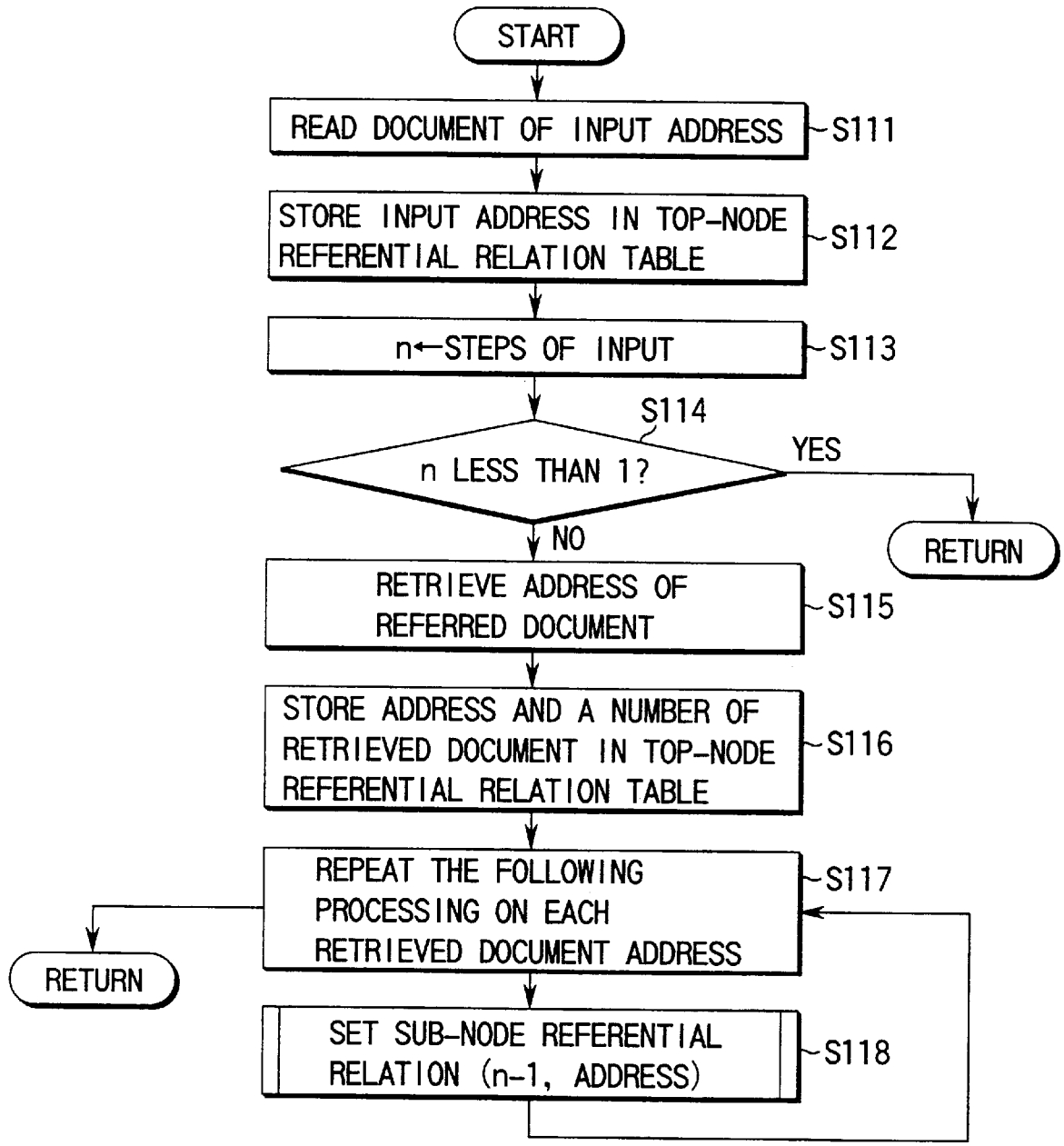
FIG. 34 is a flow chart showing a flow of processing of setting a monitoring address in the seventh embodiment.

An address of a document to be monitored is set in the monitored document address storing unit 62 according to a top-node address being input at the document specifying unit 61 and a hierarchical position of input. A flow of processing in setting of a monitored address which effects the processing is shown in FIG. 34.

In setting of a monitored address, a processing is effected by making a top-node and a hierarchical position as input. After a document stored at an input address is read (step S111), the address is stored in the top-node referential relation table shown in FIG. 32A (step S 112).

When setting is effected for the first time, a monitored address is stored at a top-node address 1, and for the second time a monitoring address is stored at a top-node address 2. Thereafter, monitoring addresses are successively stored at the following addresses with numbers in the ascending order. For example, if an input address is [http://www.ccc.bbb.aaaaaa.co.jp/index.html] and it is stored for the first time, [http://www.ccc.bbb.aaaaaaa.co.jp/index.html] is stored in a top-node address 1.

If the number of steps is more than 1 (N of step S114), a monitored address is obtain by tracing hierarchical positions from a top-node to a sub-node. First of all, all the addresses of documents which are referred to by a read document are extracted (step S115), the extracted addresses and the number thereof is stored in the top-node referential relation table (step S116).

A setting subroutine of a sub-node referential relation is repeated in the same number of times as the number of the extracted addresses in regard to the addresses of the extracted documents (steps S117 to S118). Arguments at this time are the remainder when the number of steps is subtracted by 1 and the address of a document.

For example, if a document shown in FIG. 61 is a document corresponding to a top-node address being input, an address shown in FIG. 35 corresponds to a sub-node to be stored in a top-node referential relation table. Accordingly, in this case, a number of a sub-node is 1, eindex. html stored in a sub-node address 11, xx1/index.html stored in a sub-node address 12, xx2/index.html stored in a sub-node address 13, xx3/index.html stored in a sub-node address 14, http://www.ccc.bbb.aaaaaaa.co.jp/cil/index.html is stored in a sub-node address 15, http://www.bbb.aaaaaa.co.jp/index.html is stored in a sub-node address 16, http://www.aaaaaaa.co.jp/s/ is stored in a sub-node address 17, http://www.aaaaaaa.co.jp/index.html is stored in a sub-node address 18, http://www.aaaaaaa.co.jp:81/index_j.html is stored in a sub-node address 19.

Figure 36:
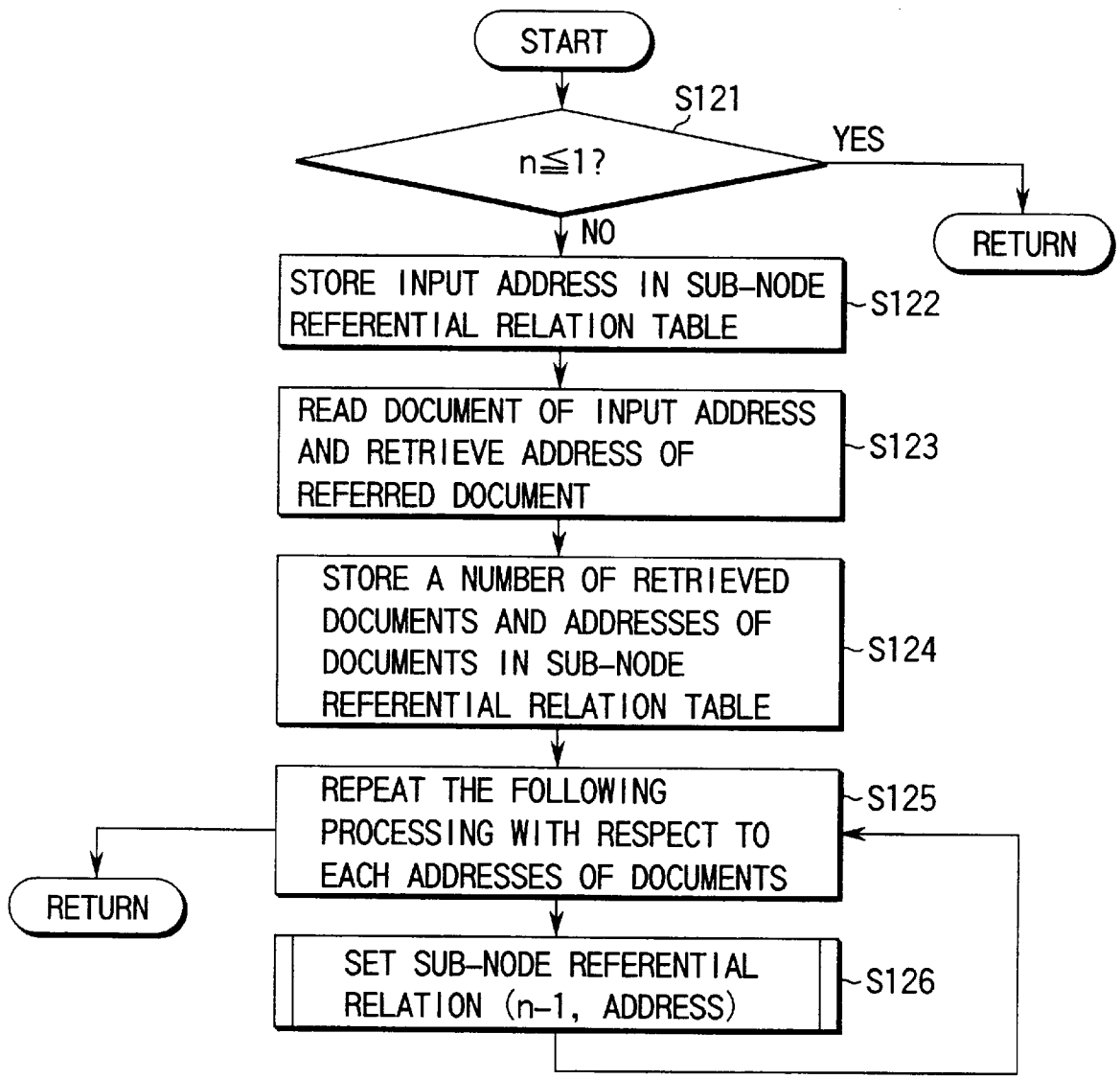
FIG. 36 is a flow chart showing a flow of setting in a sub-node referential relation table of the seventh embodiment.

Recursive addresses are successively stored in all the respective sub-node addresses of the sub-node referential relation table. A setting subroutine of the sub-node referential relation which executes the above processing is a recursive processing and addresses of the documents referred to by a document of an object are obtained and successively stored in the sub-node referential relation table in a similar manner to the monitoring address setting processing described in FIG. 34, which flow of processing is shown in FIG. 36.

In a setting subroutine of a sub-node referential relation, if the input step number is less than 1 (Y of step S121), it means that processing already goes beyond the scope of hierarchical positions of documents to be monitored and therefore processing is terminated without anything further to be processed. If the step number is more than 1 (N of step 121), input addresses of documents are stored in the sub-node referential relation table shown in FIG. 32B.

The addresses of input documents are read and addresses of documents which are referred to by the input documents are extracted (step S123). The number of the extracted addresses and the addresses themselves are in the sub-node referential relation table (step S124).

A subroutine for setting a sub-node referential relation is repeatedly executed on the addresses of the extracted documents in the same number of times as the number of the extracted addresses (steps S125 to S126). Arguments in this case are the remainder when the step number is subtracted by 1 and the addresses of the documents.

For the purpose to make a description in the embodiment, checking is not effected on whether or not a loop exists in the hierarchical structure, wherein a loop means a referential relation in which referred sub-nodes are successively traced back to the original document.

For this reason, in the illustrated processing, there may arise a loss that monitored addresses are registered in double. However, it is easy to change processing so as not to register in double, for example, referring to the already set monitored addresses.

While deletion of monitored addresses are not depicted in the figure, the deletion is to delete the monitored addresses together with all the sub-nodes which can be traced from the specified address.

Figure 37:
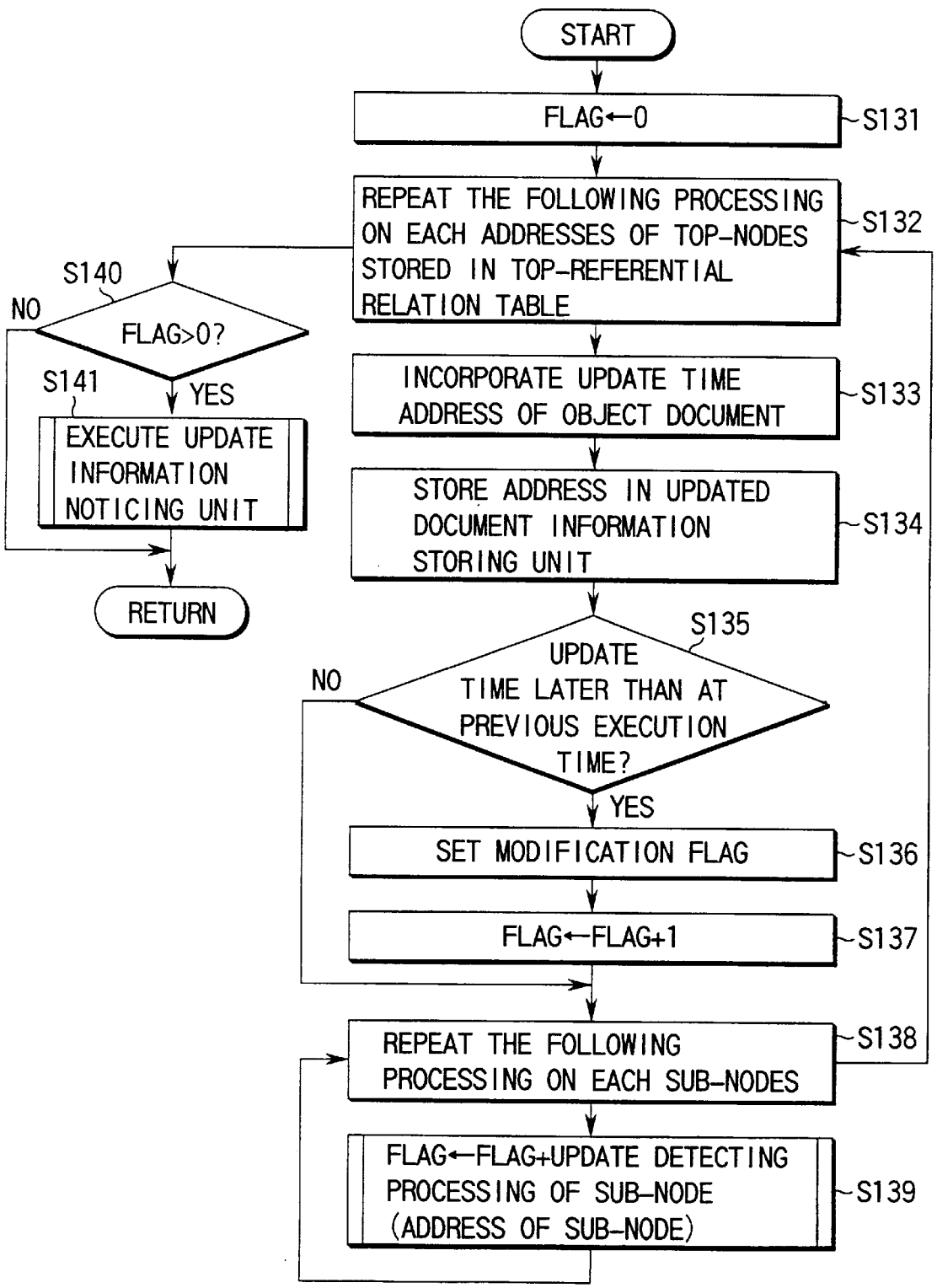
FIG. 37 is a flow chart showing a flow of processing in an update detecting unit of the seventh embodiment.
Figure 38:
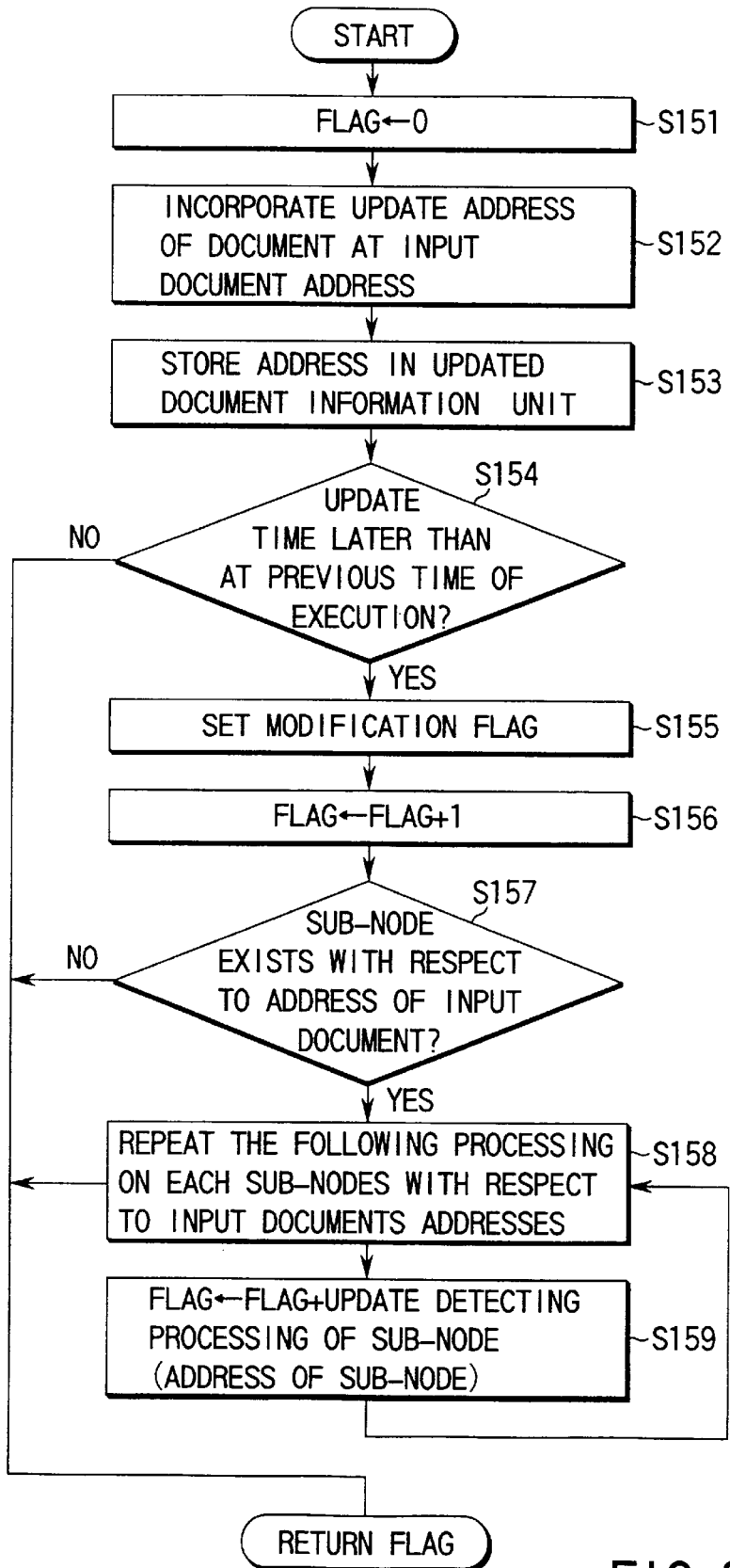
FIG. 38 is a flow chart showing a flow of processing in an update detecting unit of the seventh embodiment.

A flow of processing of the updating detecting unit 63 is shown in FIGS. 37 and 38. In the update detecting unit 63, the following processing is repeated for each address of documents in respective top-nodes stored in the top-node referential relation table which is stored in the monitored document address storing unit 62 (step S132).

First of all, an updated time of the document which has a document address to be processed is obtained (step S132) and a document address in an top-node is stored in the updated document information storing unit 64 (step S134).

If the update time is later than a previous time of execution of update detecting (Y of step 135), a modification flag is set (step S136), whereas if the update time is earlier (N of step S135) the modification flag is not set.

Then, a processing of sub-node update detecting is repeated on sub-nodes stored in the monitored document address storing unit 62 which correspond to the respective top-nodes (steps S138 to S139). In this case, arguments are addresses of sub-nodes.

In the sub-node update detecting processing shown in FIG. 38, an update time of a document at a document address being input is obtained (step S152) and then the address is stored in the updated document information storing unit 64 (step S153).

According to whether or not the update time is later than a previous time of execution (step S154), the information on whether or not the document of the address is modified is set with a modification flag.

While a previous time of update detection is not shown in the figure, the previous time is to be stored in the updated document information storing unit 64. Only when a sub-node is present which corresponds to a document address stored in the monitored document address storing unit 62, a processing for a sub-node updating detection is called for each sub-routine in a recursive manner, whereby the status of document updating is checked in a recursive manner and a result is set with a modification flag corresponding to a document address.

Information which is used to trace through hierarchical positions of a referential relation for documents is stored in the updated document address storing unit 62. It is because it is not necessary to obtain the content of a document in order to achieve only an update time thereof and the update time can be efficiently checked.

If an efficiency of processing is neglected, it is possible to store top-nodes and the step numbers to be monitored in the monitored document address storing unit 62 and to modify so as to trace through hierarchical positions while actually obtaining documents, when update is checked.

A format of data of the updated document information storing unit 64 is shown in FIG. 39. As shown in FIG. 39, data in the updated document information storing unit 64 comprises hierarchical relations among the documents and modification flags which sets a value to an updated document.

Figure 40:
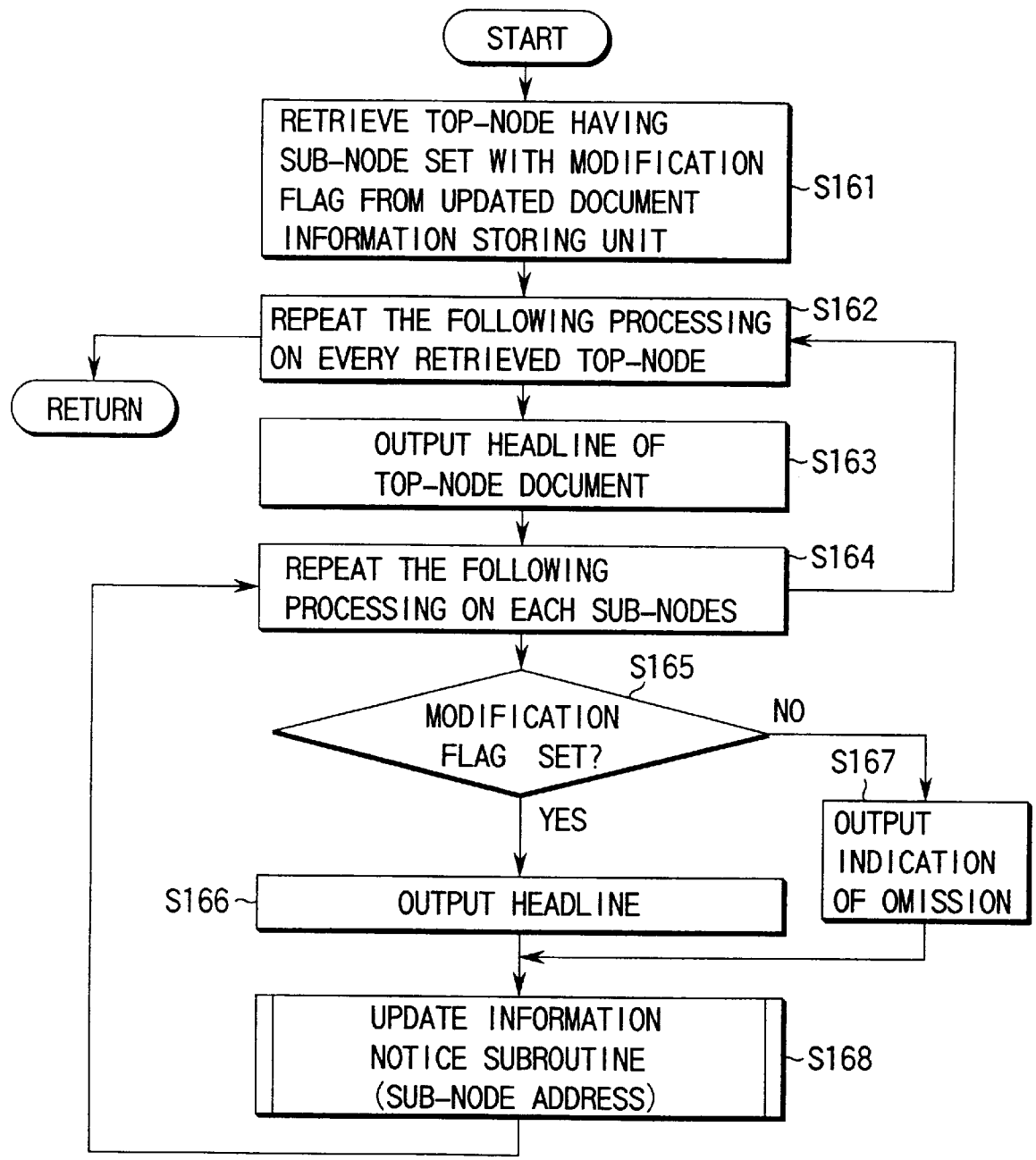
FIG. 40 is a flow chart showing a flow of processing in an update information noticing unit of the seventh embodiment.
Figure 41:
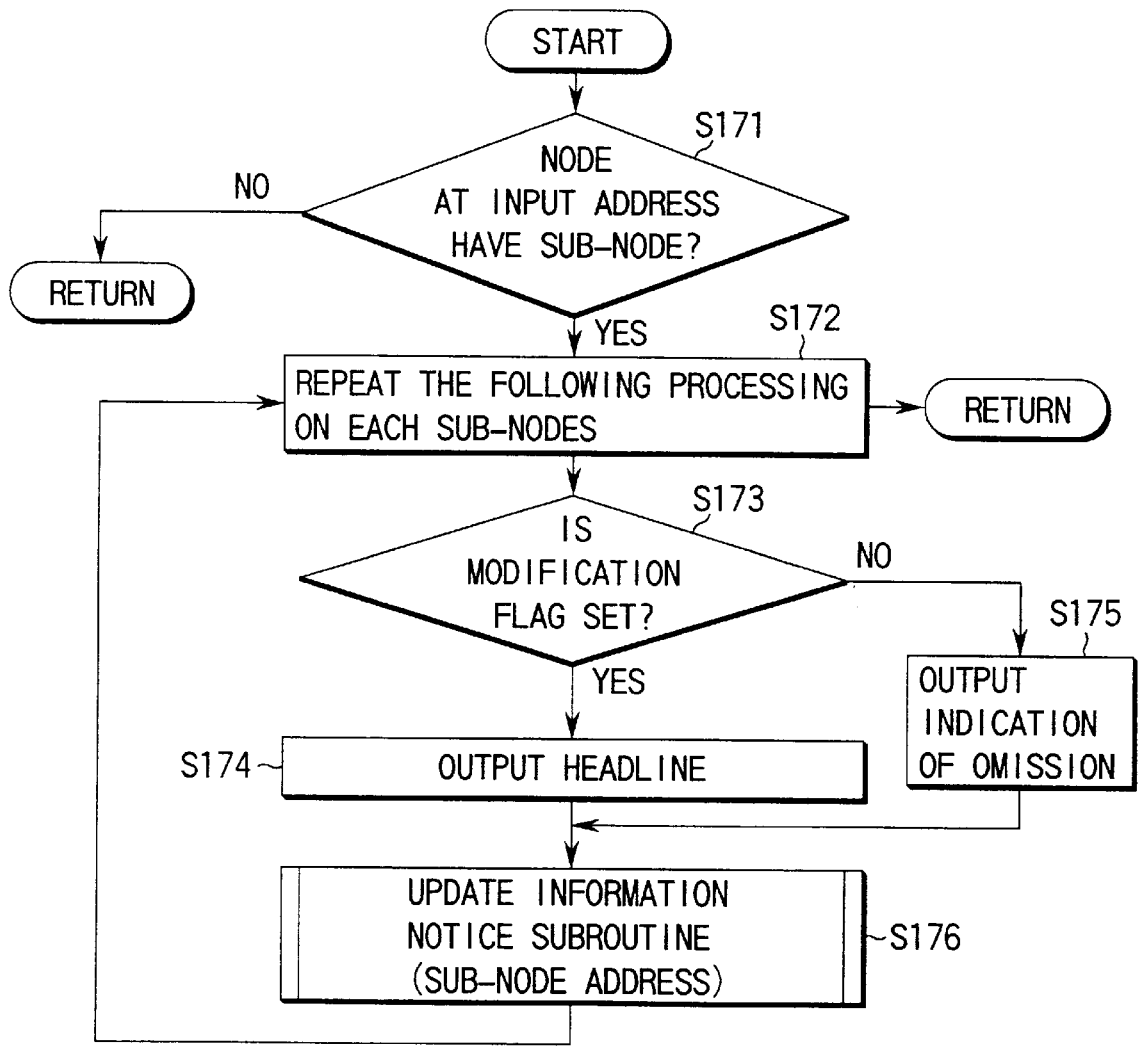
FIG. 41 is a flow chart showing a flow of processing in an update information noticing unit of the seventh embodiment.

A flow of processing of the updated document information noticing unit 65 is shown in FIGS. 40 and 41. In the updated document information noticing unit 65, the updated documents are notifiedd for each hierarchical position. The headline of a document which is set with a modification flag in the updated document storing unit 64 is displayed and an abbreviation mark is displayed for each of other documents.

Figures 42, 43:
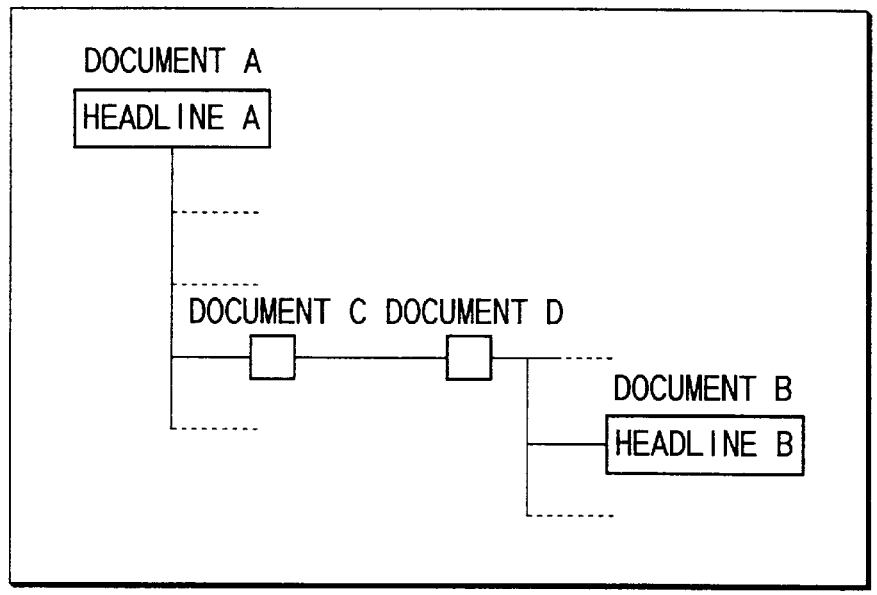
FIG. 42 is a depiction showing a display example by the update information noticing unit of the seventh embodiment.
FIG. 43 is a depiction showing a display example by the update information noticing unit of the seventh embodiment.

As a result, as shown in FIGS. 42 and 43, an updated document can be obtained in a corresponding manner with its structure. In the example of FIG. 42, [document A] is a top-node and [headline A] is the headline of [document A].

In this example, it is assumed that [document A] of the top-node refers to [document C], [document C] refers to [document D] and [document D] refers to [document B] and besides that [document B] is a document whose update is detected (which is a document corresponding to an address set with a modification flag).

[Headline B] is a headline of [document B]. A headline of the top-node ([document A]) and a headline of a document whose update has already detected are displayed and an abbreviation mark (□) is displayed for [document C] and [document D] (a document whose update is not detected) of the other documents, wherein the mark (□) is used for showing a hierarchical relation.

The other documents than those which [document A] refers to are displayed with an abbreviation mark ( . . . ), which means that update is not detected in the document.

On the other hand, in an example shown in FIG. 43, a referred document (whose headline is [Individual Report on Business Trip] at the third place traced from a top-node document (whose headline is [Overview of WWW.ccc.bbb.aaaaaaa.co.jp]) is modified with addition of a headline [Report on National Meeting (May 1, 1995)] with two documents lying between the top-node document and the referred document.

The Eighth Embodiment

The eighth embodiment will be described.

Figure 44:
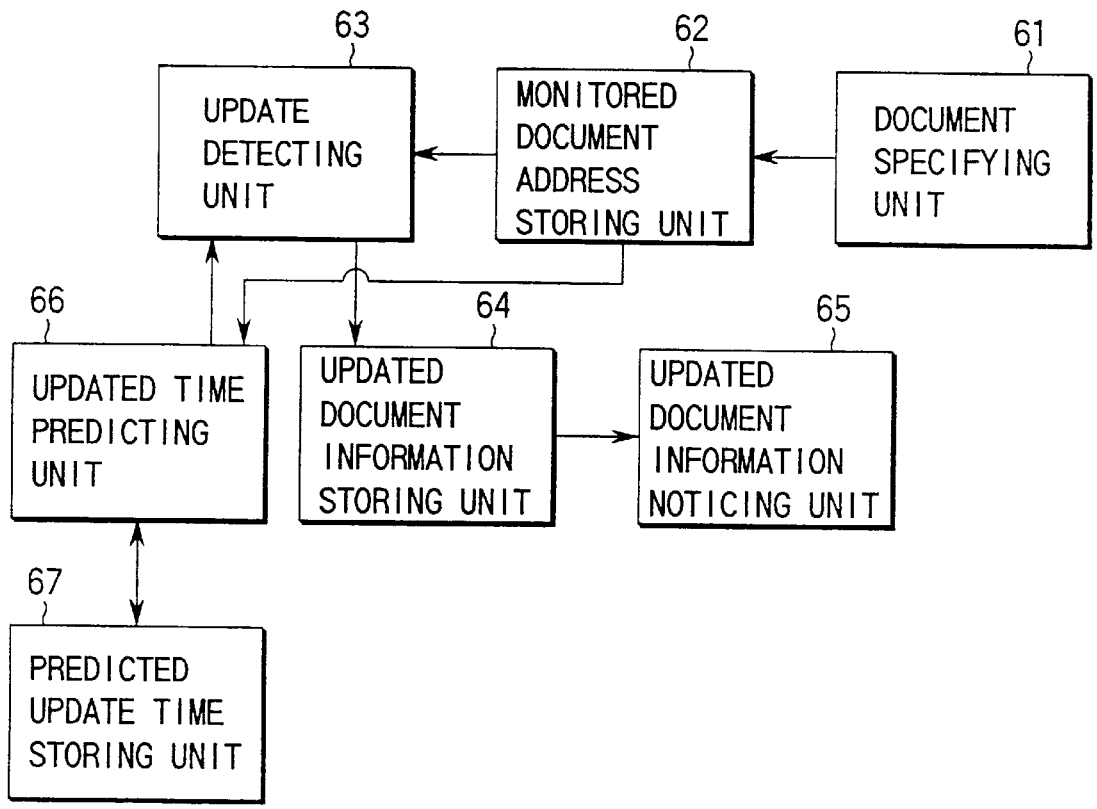
FIG. 44 is a functional block diagram showing a updated document information monitoring system on an eighth embodiment.

FIG. 44 shows a functional block diagram of an updated document information monitoring unit of the embodiment.

A difference from the functional block shown in FIG. 30 is in that a update time predicting unit 66 is added to the system. In the updated document information storing unit 64, update times of documents are stored in its expanded capacity.

In the update time predicting unit 66, update times of documents having document addresses set at the document specifying unit 61 are obtained and prediction on when next updating is conducted in each document is estimated based on a history of updated times.

Figure 45:
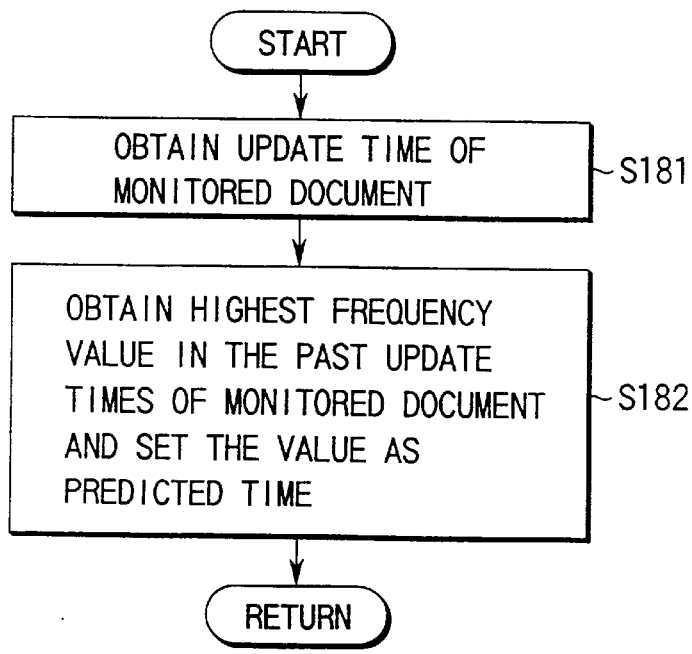
FIG. 45 is a flow chart showing a flow of processing in an update time predicting unit of the eighth embodiment.

In order to facilitate understanding of a description in FIG. 45, the processing is shown in a simplified manner. That is, an updated time of a monitored document is obtained (step 181) and a time with the highest frequency is assumed an updated predicted time based on the updated time obtained and historical update time data which have been accumulated (not shown) (step 182).

Figure 46A:
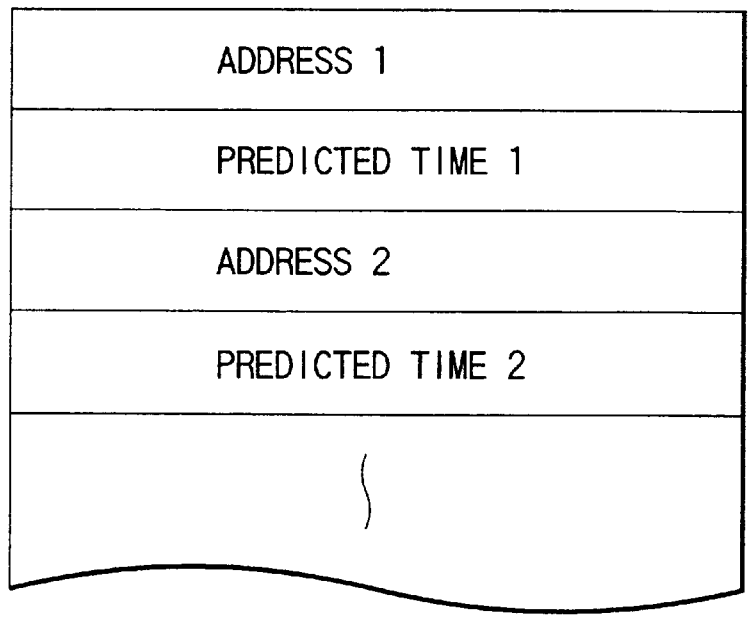
FIG. 46A is a depiction showing a storage format of a predicted update time storing unit of the eighth embodiment.
Figure 46B:
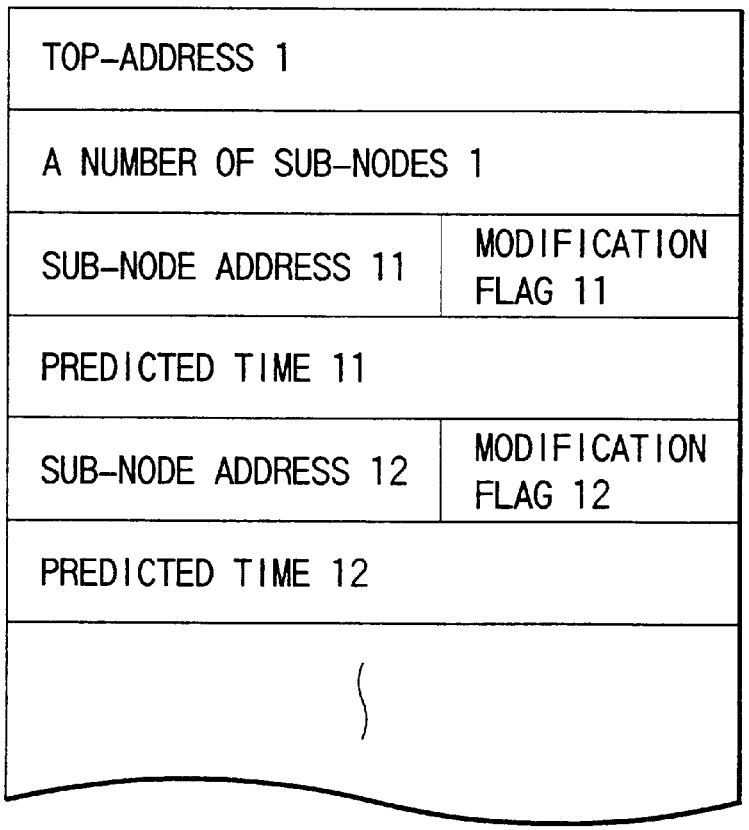
FIG. 46B is a depiction showing a storage format of an updated document information storing unit of the eighth embodiment.

An obtained update time of a monitored document may be stored in a corresponding place of the updated document information storing unit 64, as shown in FIG. 46B, when updated times of respective documents are incorporated in processing of the update detecting unit 63 shown in FIGS. 37 and 38. FIG. 46A shows a storage format of a predicted update time storing unit 67.

When a predicted time with the highest frequency is selected, it is necessary to set a time interval in which a count is taken. For example, in the case where a frequency of each update time is counted in a unit of hour, smaller units such as minute and second and week day are neglected and as a result a hourly zone with the highest frequency is a predicted time, When a frequency of each update time is counted in a unit of week day, units such as hour, minute and second are neglected in counting and, as a result, a week day with the highest frequency is a predicted value. In such a manner, an update time is predicted for each monitored document address.

From the predicted update time of each document address, an update time of the whole documents is predicted. In this regard, the update time for all the documents to be monitored is predicted, for example, by taking the overall average of respective update times predicted individually.

In FIG. 45, processing is depicted in a simplified manner in order to help a description to be understood with ease, monitored documents are in a hierarchical structure and therefore update times are respectively obtained from all the documents in the hierarchical structure and a value with the highest frequency is sought from the update times thereof.

Thus obtained predicted update time is stored in the predicted update time storing unit 67. The predicted update time storing unit 67 has, as shown in FIG. 46A, a format in which a pair of an address of the top-node and a predicted time is stored for each group of documents to be monitored.

In the update time predicting unit 66, an update detecting processing is started for a group of documents after a given time interval is passed from a predicted time of updating for the group to be monitored which is stored in the predicted update time storing unit 67, whereby a probability to obtain the latest status of updating becomes larger.

In the embodiment, the update time predicting unit 66 is, as an example, constituted of a different module from the update detecting unit 63. However, a greater part of the processing of the update time predicting unit 66 is to obtain update times of documents set in the monitored documents address storing unit 62 and effects almost the same processing as the update detecting unit 63.

Accordingly, in the course of the processing of the update detecting unit 63, the processing can be modified so as to predict an update time at the same time with ease.

The Ninth Embodiment

The ninth embodiment will be described.

Figure 47:
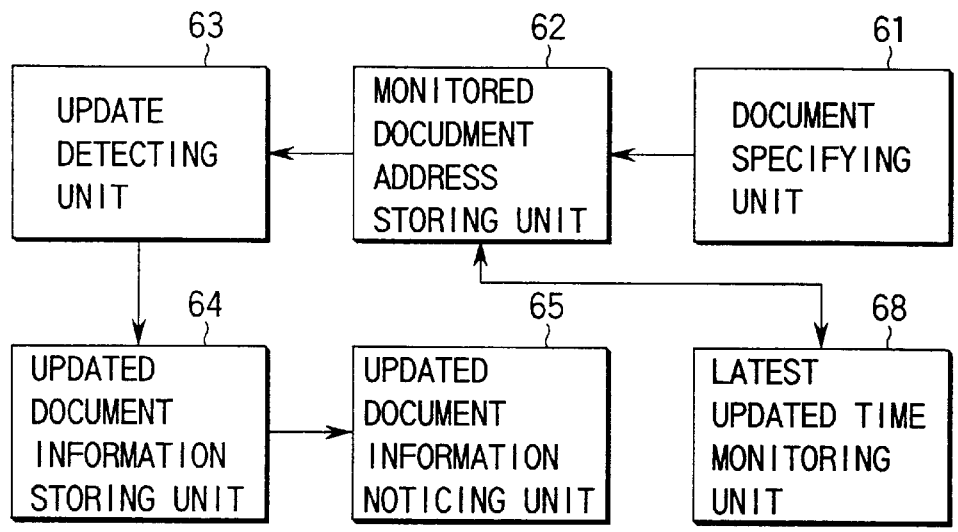
FIG. 47 is a functional block diagram showing an updated document information monitoring system of a ninth embodiment of the present invention.

FIG. 47 shows a functional block diagram of an updated document information monitoring unit of the embodiment. A difference from the functional block shown in FIG. 30 is in that a latest update time monitoring unit 68 is added to the system.

Figure 48:
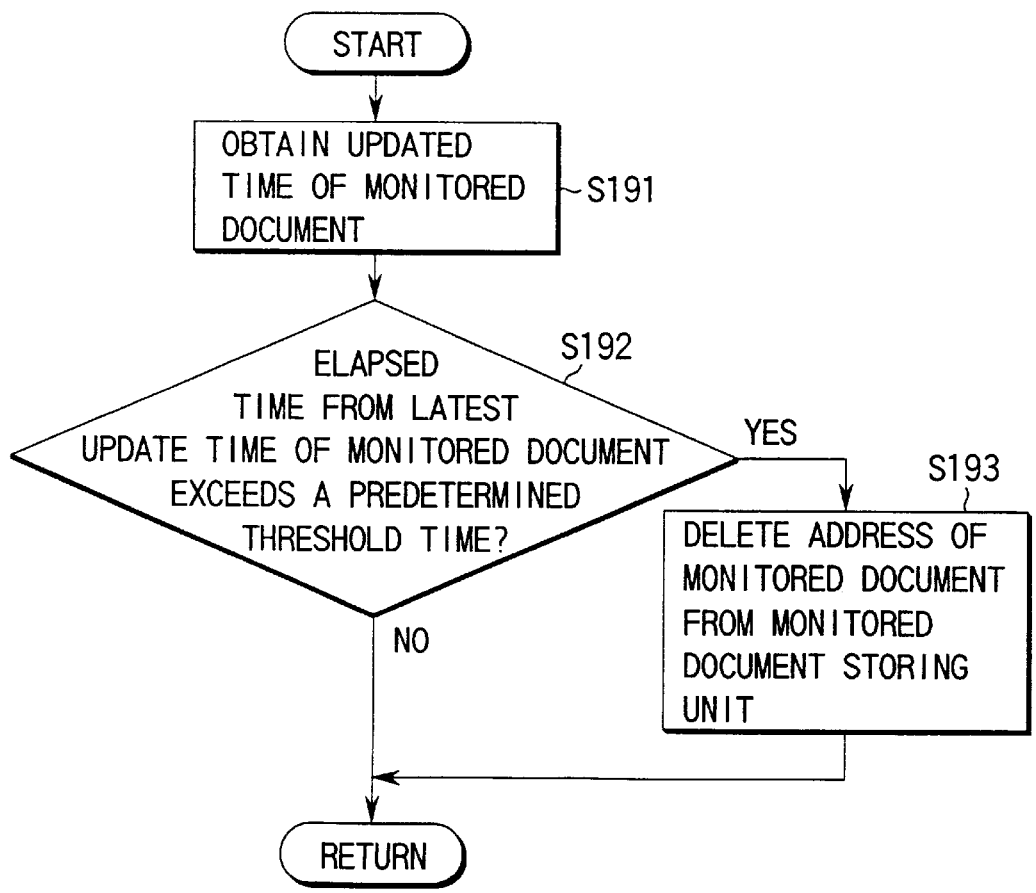
FIG. 48 is a flow chart showing a flow of processing in a latest update time monitoring unit of the ninth embodiment.

The processing is conducted in the following manner that the latest update time monitoring unit 68 obtains an update time of a monitored document, as shown in FIG. 48, (step S191), it is checked whether or not a predetermined time interval is passed from the latest update time of a obtained monitored document (step S192) and if a predetermined time interval is passed(Y of step S192), the address of the document is deleted from the monitored document address storing unit 62 (step S193).

In FIG. 48, in order to help a description to be understood with ease, the processing is depicted in a simplified manner, but, since monitored documents constitute a hierarchical structure, update times are obtained from each of all the document constituting the hierarchical structure and latest update times are checked based on the obtained update times.

In the embodiment, the latest update time monitoring unit 68 is constituted of a different module from the update detecting unit 63 as an example. However, a greater part of the processing of the latest update time monitoring unit 68 is to obtain update times of documents set in the monitored document address storing unit 12 and almost the same processing as the update detecting unit 63 is effected.

Therefore, in the course of the processing of the update detecting unit 63, modification of the processing can be made with ease so that checking of a latest update time is conducted.

When addresses of documents which are not so often updated are deleted from the updated document address storing unit 62, a warning mat be issued to a user to the effect that such documents are to be deleted and the documents can be deleted only based of a consent of the user.

The Tenth Embodiment

Figure 49:
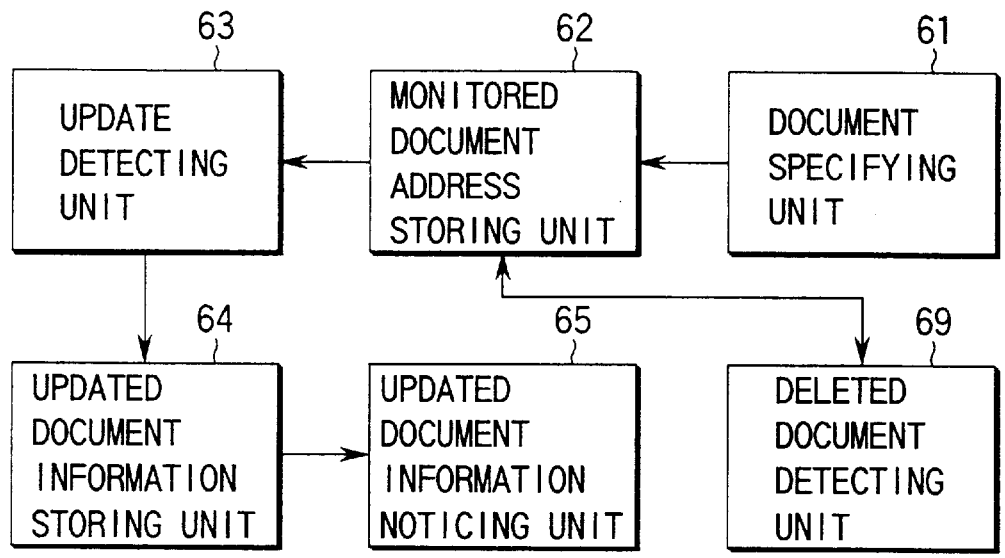
FIG. 49 is a functional block diagram of a latest update time monitoring system of a tenth embodiment of the present invention.

The tenth embodiment will be described. FIG. 49 shows a functional block diagram of an updated document information monitoring system. A difference from the functional block diagram shown in FIG. 30 is in that a deleted document detecting unit 69 is added to the system.

In a Web page, it is conducted for a creator of the Web page to delete or modify its location of storage as an everyday happening. When deletion is conducted in such a manner, it is a useless job to monitor the Web page many times.

Figure 50:
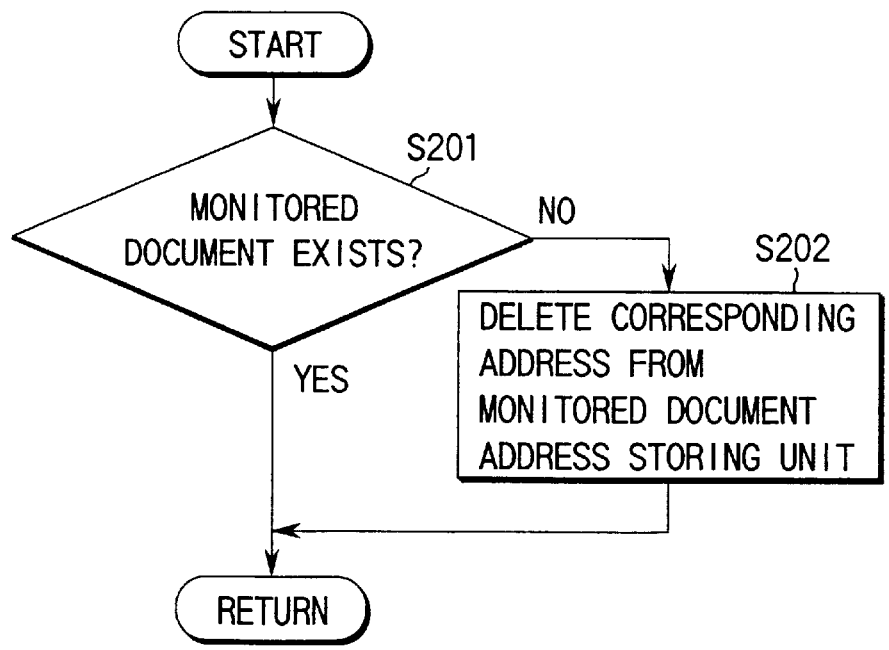
FIG. 50 is a flow chart showing a flow of processing in a deleted document detecting unit of the tenth embodiment.

In the deleted document detecting unit 69 of the embodiment 69, as shown in FIG. 50, when a monitored document is deleted from a location in which the monitored document is originally stored (N of step S201), the corresponding document address is deleted from the monitored document address stored unit 62 (step S202).

In the embodiment, the deleted document detecting unit 69 is constituted of a different module from the update detecting unit 63. However, in the deleted document detecting unit 69, a document set in the monitored document address storing unit 62 is only accessed to be checked whether or not the document is deleted. Accordingly, in the course of processing of the update detecting unit 63, modification of the processing can be easily made so as to perform both processings at the same time.

When a document address is deleted from the monitored document address storing unit 62, a warning is issued to a user and the address can be deleted only with the user's consent.

The Eleventh Embodiment

The eleventh embodiment will be described. FIG. 51 shows a functional block diagram of an updated document information monitoring system of the embodiment. A difference from the functional block diagram shown in FIG. 30 is in that a new address extracting unit 80 is added.

A Web document is managed individually. Therefore, the body of a Web page is frequently moved from a location where the Web page has been stored to a different address for management or arrangement. Such a situation is shown in FIGS. 52A and 52B.

For example, as shown in FIG. 52A, such a situation corresponds to a situation that at first a document 1 is set in a location of so-called home page, after that a manager of the home page categorizes documents as the volume of the documents is increased and a document only consisting of links is created (document 5 of FIG. 52B) and a link information of the Web page is incorporated into the document 5.

The new address extracting unit 80 detects a new address of a document whose address where the document is stored is modified and replaces a corresponding address in the monitored document address storing unit 72 with a new address.

Figure 53:
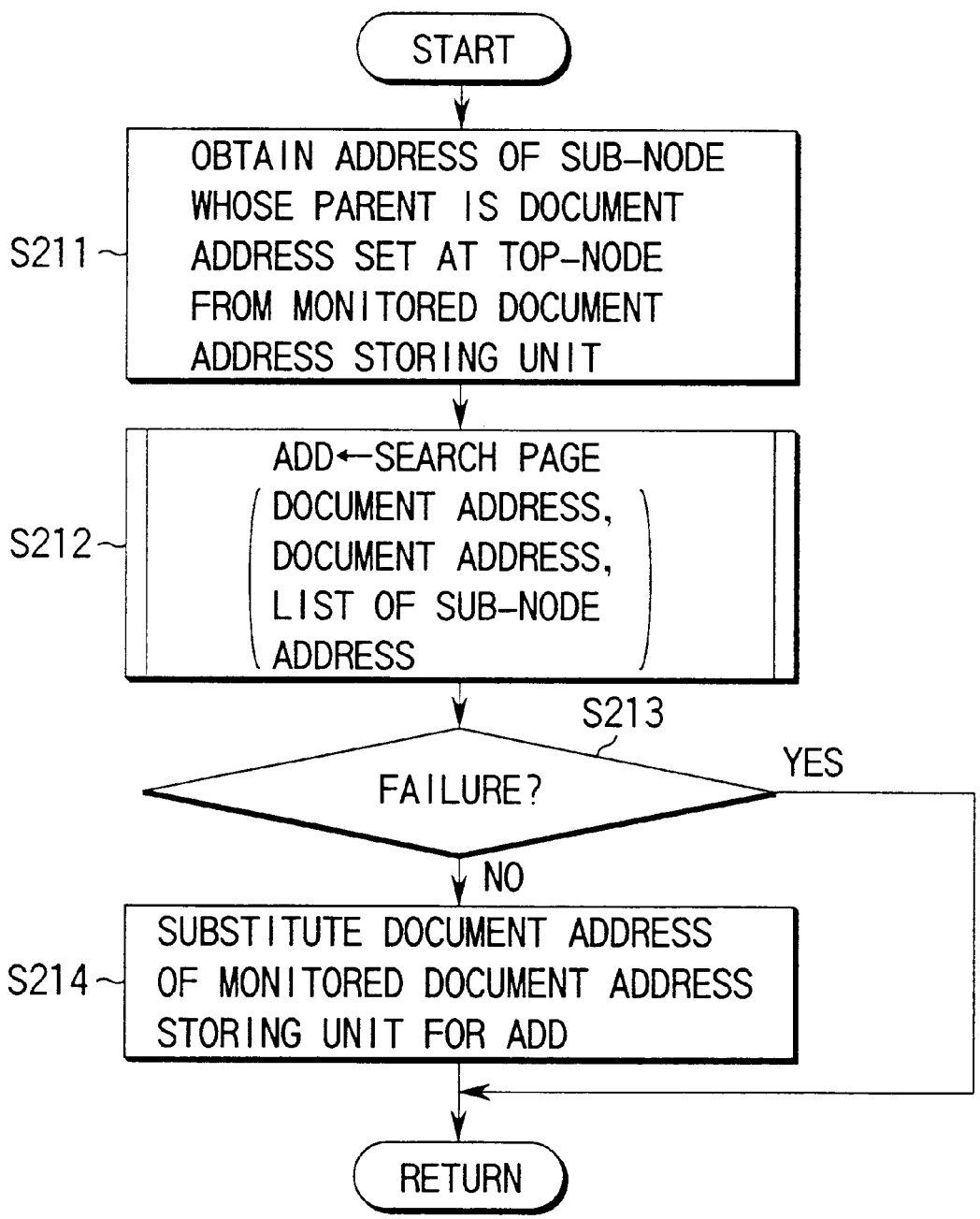
FIG. 53 is a flow chart showing a flow of processing in a new address extracting unit of the eleventh embodiment.
Figure 54:
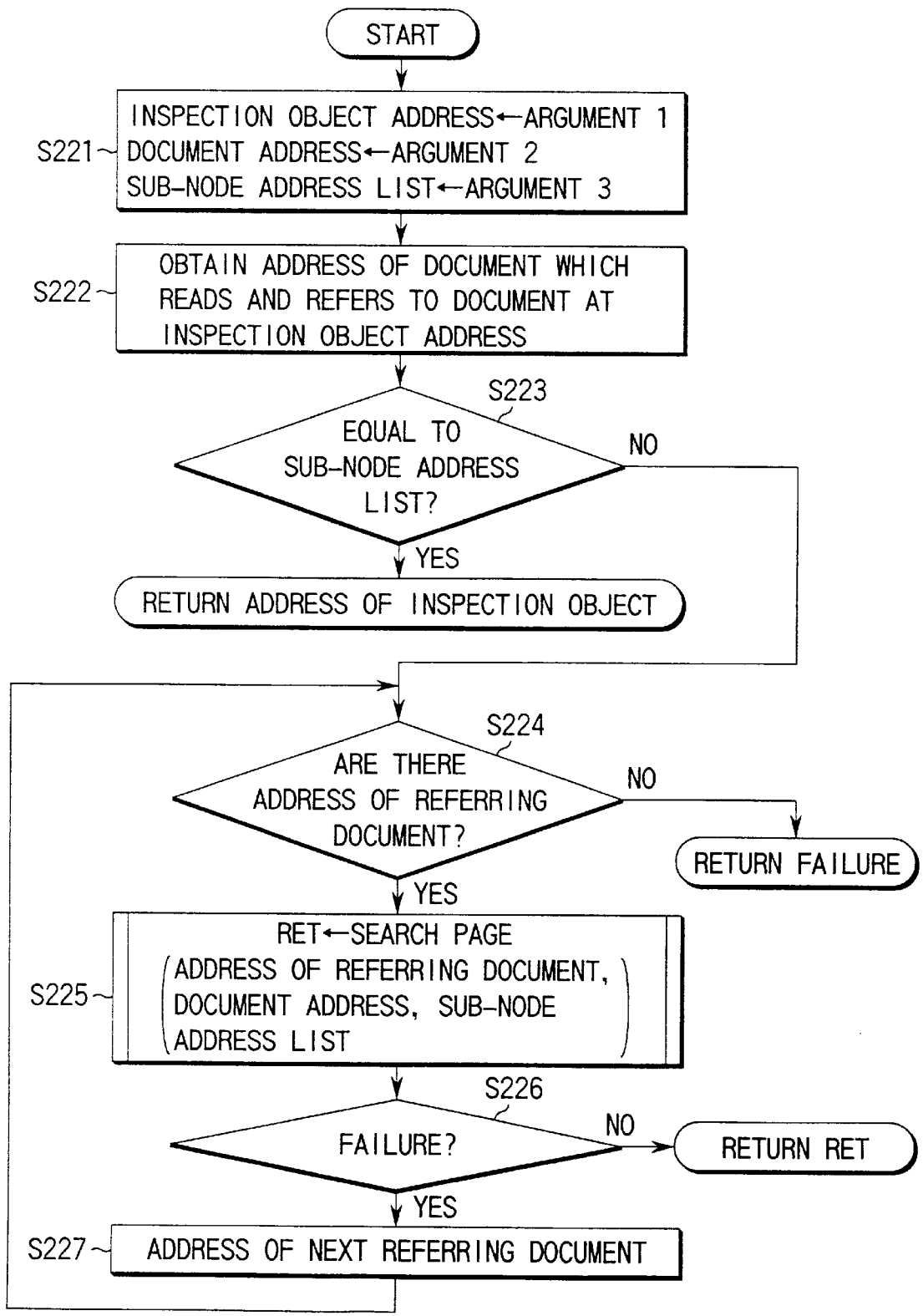
FIG. 54 is a flow chart showing a flow of processing in a new address extracting unit of the eleventh embodiment.

In FIGS. 53 and 54, a processing is conducted in which a new address is sought using corresponding relations among documents stored in the monitored document address storing unit 62. As shown in FIGS. 32A and 32B, in the monitored document address storing unit 62, the number(the number of sub-nodes) of pages (sub-nodes) which are referred to by pages of top-nodes to be monitored are stored in a corresponding manner together with the addresses of the pages (sub-node addresses).

First of all, in step S211, one pair of an address of a top-node stored in the monitored document address storing unit 62 and an address of sub-node corresponding to the top-node are obtained.

Then, in step S212, a subroutine search page is called and the address of a newly inserted page is sought from the page of a corresponding top-node and the page of a corresponding sub-node.

When the new address is detected, since the address is stored in a variable add, in step S214, the add is reloaded in a document address of the monitored document address storing unit 62.

That is, when an address where the content of a related document shown in FIG. 52A is stored without no change of the content is modified into a structure of FIG. 52B, the address of document 1 of FIG. 52A corresponds to document 5 of FIG. 52B.

In this case, since the address of document 1 in the structure of FIG. 52B is obtained in step S212, the address is used as a new address instead of the existing address and stored in the monitored document address storing unit 72.

Search page shown in FIG. 54 uses three arguments as input, wherein argument 1 is an argument to transfer the address of a page to be inspected and arguments 2 and 3 are arguments to successively transfer a corresponding relation between documents obtained in step S211 of FIG. 53.

In step S222, pages whose address to be inspected are incorporated and addresses of the pages which the pages to be inspected refer to are obtained. In step S223, it is inspected whether or not the addresses (plural) obtained coincide with a sub-node address list transferred with argument 3.

If coincidence occurs, since it means that the inspected address is a page having been present thus far in the document address transferred by argument 2, the address is returned back to terminate the processing.

On the other hand, if a comparison in step S223 fails, a new address is obtained by calling search page in step S225 in connection with the addresses of all the pages which the pages to be inspected obtained in step S222 refer to (steps S224 to step S227).

In the processing shown in the figure, since an document which a top-node has included as a sub-node is stored in the monitored document address storing unit 62, a document which can be traced in recursive manner from a new document is incorporated (step S211) and a document which has a document list coinciding with the address of a sub-node is obtained (step S212 (steps S221 to S227)).

An address where thus obtained document is stored is a new address. While it is checked whether or not an address which is referred to in step S223 of FIG. 54 is absolutely the same, since there is a possibility that the referential relation of a document is modified more or less, it is possible to change so as to make it a condition that more than a predetermined proportion of addresses of documents are the same.

The Twelfth Embodiment

Figure 55:
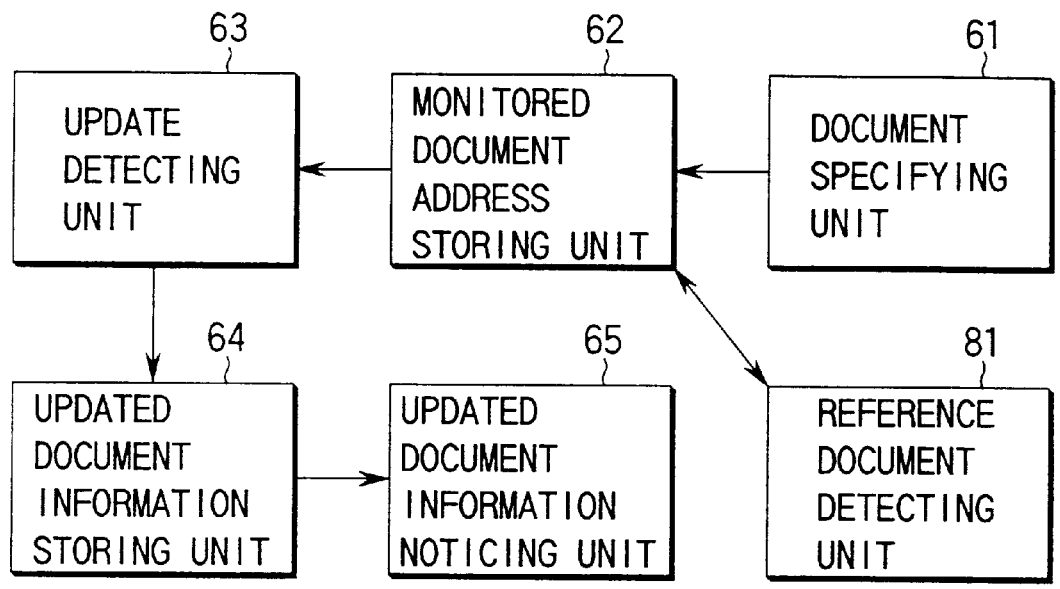
FIG. 55 is a functional block diagram of an updated document information monitoring system of a twelfth embodiment.

The twelfth embodiment will be described. FIG. 55 shows a functional block diagram of a document information monitoring system. A difference from the functional block diagram of FIG. 30 is in that a reference document detecting unit 81 is added to the system.

The reference document detecting unit 81 detects documents which refer to top-nodes set in the monitored document address stored unit 62. When documents which refer to a specified document are obtained, all the documents stored in database are obtained and documents which each of obtained document refers to are obtained, so that the referring document can be obtained.

In other words, in the reference document detecting unit 81, when a link in [document B] is extended to [document A], a processing to seek a reverse path in which [document B] refers to [document A] is executed.

Referring document Object document
document B→document A

In a Web retrieval server such as Altavista, realization of a high speed retrieval is required. Therefore, an indexing system of a Web retrieval server, web documents are obtained locally in the course of patrolling through accessible sites on WWW and indexes of characters and words contained in the obtained documents are produced.

According to the indexes, a Web document under an input retrieval condition is retrieval. A system in which Web documents are incorporated in the course of patrolling through sites is generally called a network robot and the network robot is actually used in producing indexes in a Web retrieval server. A flow of processing in which the network robot is used is shown in FIG. 56.

Figure 56:
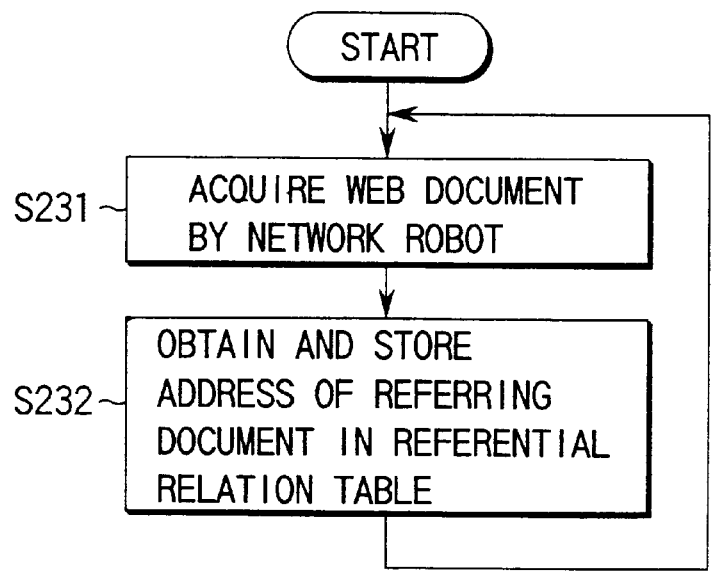
FIG. 56 is a flow chart showing a flow of processing in a reference document detecting unit of the twelfth embodiment.

The processing shown in FIG. 56 is a part of processing to obtain referential relations of a document. Web documents are obtained one by one, the address referred to in a document is extracted (step S231) and the address is stored in the format of referring document to referred document in the referential relation table as shown in FIG. 57 (step S232).

The referential relation table has a format in which the address of a first document (referring document) and the address of a second document which the first document refers to (referred document address) are stored in a pair.

Figures 57, 58:
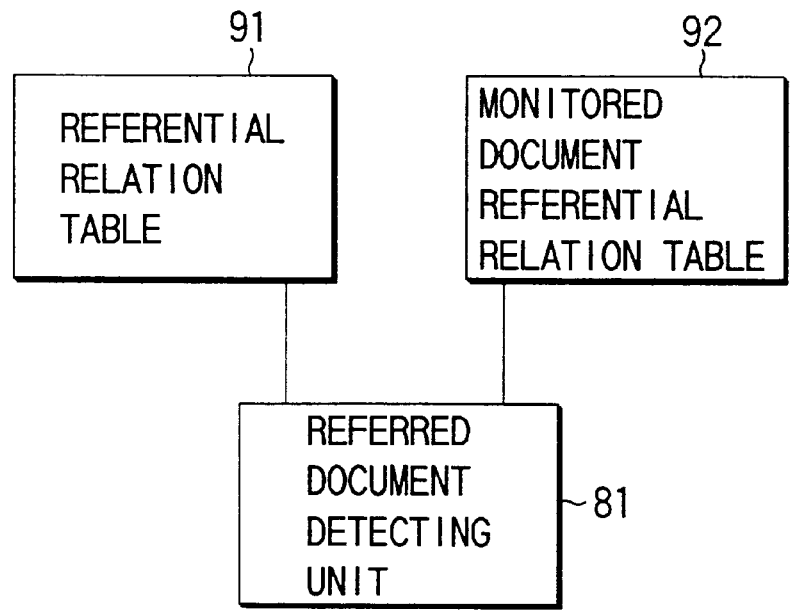
FIG. 57 is a depiction showing a format of a referential relation table of the twelfth embodiment.
FIG. 58 is a depiction a block diagram showing a relation among a reference document detecting unit, a referential relation table and a monitored document referential relation table of the twelfth embodiment.
Figure 59:
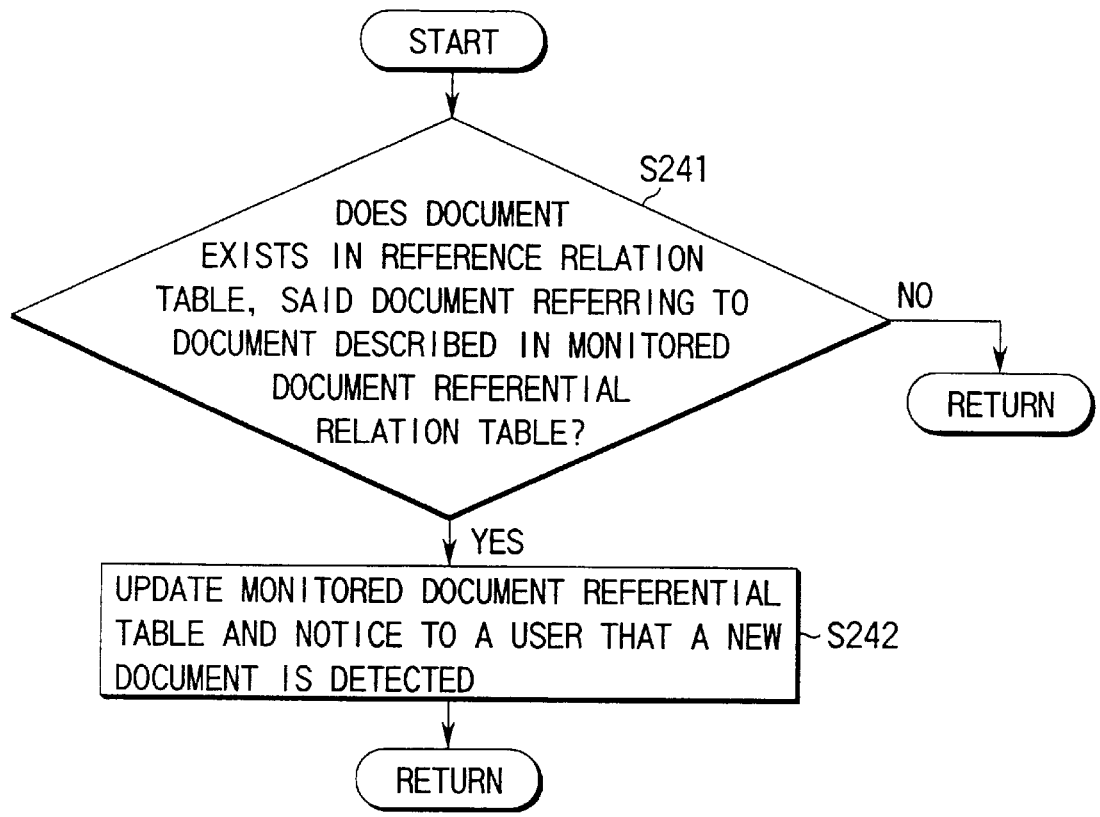
FIG. 59 is a flow chart showing a flow of processing in noticing to a user that a new reference is created in regard to documents monitored by a reference document detecting unit of the twelfth embodiment.

In FIG. 58, relations among the reference document detecting unit 81, the referential relation table 91 and monitored document referential relation table 92 are shown and a flow of processing is shown in which it is notified to a user that a new reference occurs to the monitored document.

Figure 60:
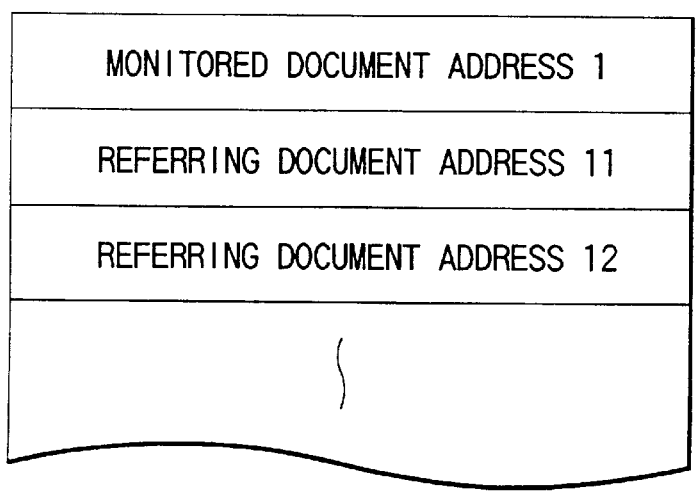
FIG. 60 is a depiction showing a storage format of a monitored document referential relation table of the twelfth embodiment.

In FIG. 60, a storage format of the monitored document referential relation table 92 is shown.

In a processing concerning an monitored document, if a new pair is present in the referential relation table, which new pair is not included in the pairs of the referring document addresses and the monitored document addresses described in the monitored document referential relation table 92 (Y of step S241), the referring document address of the new pair is a new referring document to the monitored document.

Accordingly, the new pair detected is stored in the monitored document referential relation table and at the same time it is notified to a user that the new pair has been detected (step S242).

In the embodiment, an example in which an update time can be obtained is shown, even when documents are not incorporated. Therefore, in regard to a document database from which update times cannot be obtained, it may be decided whether or not a document has been updated by making comparison between the document and a stored document which is one of documents stored at each time when updating is conducted.

As described above in detail, according to the updated document information monitoring unit of the present invention, updating can be effectively monitored without increase in a working volume on the side of a user for documents having a hierarchical structure.

A trend of updating is analyzed and monitoring is carried out according to a result of the analysis without uniformly monitoring all the documents to be monitored.

A user is not required to conduct operations such as a reset to continue the most appropriate update monitoring all the time.

In the updated document information monitoring device of the present invention, as in a Web page, it is possible to specify a plurality of documents without setting all the documents included in the group individually as objects to be monitored, which documents have a structure showing one complete information by mutual relations among them. On the other hand, if an update is detected in any one document of the group, the updated document is notified to a user with information on how the updated document is related with a hierarchical structure of the document group including the updated documents. It is preferred, for example, that the notice is displayed in connection with the hierarchical structure of the documents containing the updated document. Therefore, an operability of an updated document information monitoring device is dramatically improved by decreasing actions of a user in operation by a great margin and at the same time a result of detection can be effectively displayed, so that an overall operation efficiency is improved.

The updated document information monitoring device further comprises, as features, an update time predicting means with which each update time is predicted on specified documents by specified the document specifying means and the update detecting means comprises a means for selecting a document to be monitored among specified documents specified by the document specifying means according to a predicted time predicted by the update time predicting means.

In many cases, updating of information (presentation of new information) has a cycle for each type of information, which cycle time is fixed to some extent, for example like daily, weekly or monthly. Accordingly, if a trend on update time is analyzed on each type of information, a useless processing can be removed that all the document specified by a user, in other words, including a type of documents which have a very small chance to be updated, are inspected in every time, so that a more effective update monitoring can be achieved.

The updated document information monitoring device of the present invention has a feature that the device further comprises: latest update time storing means for storing a latest update time of each of documents specified by the document specifying means; specification deleting means for deleting the address showing a location of a document from the specification by the document specifying means which document's elapsed time from the latest update time stored in the latest update time storing devise exceeds a threshold value set in advance.

In the updated document information monitoring device, a document which has not been referred to in excess of a predetermined time interval is regarded as an already useless information and such information is automatically deleted from objects to be monitored. Thereby, unnecessary inspecting actions can be automatically deleted and on the other hand actions for setting deleting of unnecessary documents on the user side become unnecessary, so that a degree of operability can be increased.

It is preferred that the update document information monitoring device further comprises means for managing the content of a setting showing monitoring objects depending on circumstances such as when a document to be monitored itself is deleted or when the storing location is modified. Thereby, a managing operation by a user of a setting content specifying an object to be monitored can be deleted and a degree of operability can be further improved.

In other words, in the updated document information monitoring device, it is detected and notified to an user that other documents occurred which refer to the document specified based on a result of collection, which has been collected on all the referential relations among documents. Thereby, the user can grasp a situation in which a document publicized by the user itself is referred to with ease.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for filtering information, comprising:

first storing means for storing document data to be filtered;

second storing means for storing fundamental document data for detecting at least one of newly created document and updated document;

detecting means for detecting the at least one of newly created document and updated document among the document data stored in the first storage means based on the document data stored in the first storing means and the fundamental document data stored in the second storing means;

similarity computing means for computing a similarity between the at least one of newly created document and updated document by detected the detecting means and a predetermined retrieval condition; and presenting means for presenting the at least one of newly created document and updated document detected by the detecting means according to the similarity computed by the similarity computing means.

2. A device for filtering information according to claim 1, wherein presentation of documents by the presenting means is conducted according to the descending order of similarities computed by the similarity computing means.

3. A device for filtering information according to claim 1, wherein presentation of documents by the presenting means is conducted on documents of similarities equal to or more than a predetermined value computed by the similarity computing means.

4. A device for filtering information according to claim 1, wherein the device for filtering information further comprises means for compressing the documents detected by the detecting means and storing the compressed documents in the second storage means.

5. A method for filtering information, comprising the steps of:

detecting at least one of newly created document and updated document among document data based on the document data and fundamental document data;

computing a similarity between the at least one of newly created document and updated document and a predetermined retrieval condition; and presenting the at least one of newly created document and updated document according to the similarity.

6. A method for filtering information according to claim 5, wherein presentation of detected documents is conducted in the descending order of the similarities computed.

7. A method for filtering information according to claim 5, wherein presentation of documents is conducted on documents of similarities computed equal to or more than a predetermined value.

8. A method for filtering information according to claim 5, wherein the method for filtering information further comprises the step of compressing detected documents and adding the compressed documents to the fundamental document data after the detecting step.

9. A device for filtering information, comprising:

detecting means for detecting at least one of newly created document and updated document among document data by comparison between document data being an object for filtering and fundamental document data which is used for detecting the at least one of newly created document and updated document;

deciding means for deciding on whether or not the at least one of newly created document and updated document detected by detecting means includes a plurality of information units;

splitting means for splitting the at least one of newly created document and updated document into the information units, when the at least one of newly created document and updated document has been decided to include a plurality of information units by the deciding means;

similarity computing means for computing a similarity between each information unit split by the splitting means and a predetermined retrieval condition; and presenting means for presenting a document of the each information unit split by the splitting means according to the similarities computed by the similarity computing means.

10. A device for filtering information according to claim 9, wherein presentation of the documents by the presenting means is conducted in the descending order of the similarities computed by the similarity computing means.

11. A device for filtering information according to claim 9, wherein presentation by the presenting means is conducted on documents of similarities computed by the similarity computing means equal to or more than a predetermined value.

12. A device for filtering information according to claim 9, wherein the presenting means comprises:

selecting means for selecting the split documents split by the splitting means according to the similarities computed by the similarity computing means;

creating means for creating an abstract of each of the selected documents by the selecting means; and presenting means for presenting abstracts created by the creating means.

13. A device for filtering information, comprising:

detecting means for detecting a hypertext, newly created or updated, among hypertexts from a hypertext with an address specified in advance being an object for filtering up to a hypertext in a position specified in advance in a hierarchy by comparison between the hypertext being an object for filtering and a fundamental hypertext which is used for detecting a hypertext, newly created or updated;

similarity computing means for computing a similarity between a detected hypertext by detecting means and a retrieval condition set in advance; and presenting means for presenting detected hypertexts by the detecting means according to the similarities computed by the similarity computing means.

14. A device for filtering information according to claim 13, wherein detection of a hypertext by the detecting means is terminated when a first hypertext is detected by the detecting means.

15. A device for filtering information according to claim 13, wherein presentation of hypertexts are conducted in the descending order of the similarities computed by the similarity computing means.

16. A device for filtering information according to claim 13, wherein presentation of the hypertexts by the presenting means is conducted on hypertexts of similarities computed by the similarity computing means equal to or more than a predetermined value.

17. A device for filtering information according to claim 13, wherein the presenting means comprises:

compressing means for compressing the detected hypertexts by the detection means; and presenting means for presenting the compressed hypertexts compressed by the compressing means according to the similarities computed by the similarity computing means.

18. A device for filtering information according to claim 13, wherein the similarity computing means comprises:

deciding means for deciding on whether or not a detected hypertext detected by the detection means includes a plurality of information units;

splitting means for splitting the detected hypertext detected by the detecting means into respective information units, when the detected hypertext is decided by the deciding means to include a plurality of information units; and similarity computing means for computing a similarity between each split information unit and a retrieval condition set in advance.

19. A device for filtering information comprising:

incorporating means for incorporating a filtered document output from another device for filtering information; and filtering means for filtering incorporated documents incorporated by the incorporating means together with documents to be filtered while including the former documents in the latter documents.

20. A method for filtering information, comprising the steps of:

detecting documents, newly created or updated, among documents to be filtered by comparison between document data of an object for filtering and fundamental document data, which are used for detecting the documents, newly created or updated;

deciding on whether or not the detected document data include a plurality of information units;

splitting the detected documents into information units, when the detected document data are decided to include a plurality of information units;

computing a similarity between each split information unit and a retrieval condition set in advance; and presenting the split documents according to the similarities computed.

21. A method for filtering information according to claim 20, wherein presentation of the documents is conducted in the descending order of the similarities computed.

22. A method for filtering information according to claim 20, wherein presentation of the documents is conducted on documents of similarities computed equal to or more than a predetermined value.

23. A method for filtering information according to claim 20, wherein the presenting step for the split documents comprises the steps of:

selecting the split documents according to similarities computed;

creating an abstract of a selected document; and presenting abstracts created.

24. A method for filtering information, comprising the steps of:

detecting a hypertext, newly created or updated, among hypertexts from an hypertext with an address specified in advance being an object for filtering up to a hypertext in a position specified in advance in a hierarchy by comparison between the hypertext being an object for filtering and a fundamental hypertext which is used for detecting a hypertext, newly created or updated;

computing a similarity between a detected hypertext by the detecting means and a predetermined retrieval condition; and presenting the detected hypertexts by the detecting means according to the similarities computed by the similarity computing means.

25. A method for filtering information according to claim 24, wherein detection of a hypertext by the detecting means is terminated when a first hypertext is detected by the detecting means.

26. A method for filtering information according to claim 24, wherein the hypertext presenting step is conducted according to the descending order of the similarities computed by the similarity computing means.

27. A method for filtering information according to claim 24, wherein the hypertext presenting step is conducted on hypertext of similarities computed equal to or more than a predetermined value.

28. A method for filtering information according to claim 24, wherein the hypertext presenting step comprises:

compressing the detected hypertexts; and presenting the compressed documents according to similarities computed.

29. A method for filtering information according to claim 24, wherein the similarity computing step comprises:

deciding on whether or not the detected hypertext includes a plurality of information units;

splitting the detected hypertext into information units, when the detected hypertext has been decided to include a plurality of information unites; and computing a similarity between each split information unit and a predetermined retrieval condition.

30. A method for filtering information among a plurality of documents, comprising the steps of:

incorporating a filtering result output from another device for filtering information; and filtering incorporated results together with a plurality of documents while including the former documents in the latter documents.

31. A device for monitoring updated document information, comprising:

document specifying means for specifying an address showing a storage location for a document of a monitoring object and documents in a hierarchical structure with the monitored document being a starting point thereof as a group;

update detecting means for detecting an updated document among the specified documents specified by the document specifying means; and indicating means for indicating the detected documents by the update detecting means with information on their respective positions in the hierarchical structure of the documents including the detected documents therein.

32. A device for monitoring updated document information according to claim 31, wherein the indicating means comprises means for presenting the detected document detected by the update detecting means with information on their respective position in the hierarchical structure including the document therein.

33. A device for monitoring updated document information according to claim 31, wherein the update detecting means comprises:
  update time predicting means for predicting an update time of each document specified by the specifying means;
  selecting means for selecting a document among the specified documents specified by the document specifying means based on an predicted update time predicted by the update time predicting means; and
  detecting means for detecting updated documents among the selected documents by the selecting means.

34. A device for monitoring updated document information according to claim 31, wherein the device for monitoring updated document information further comprises:
  latest-update-time storing means for storing the latest update time of each of the specified documents by the document specifying means; and
  specification deleting means for deleting the addresses showing storage locations of documents from the specifications specified by the document specifying means, elapsed times of which documents exceeds a threshold holding time set in advance, when counting from the latest update time stored in the latest update time storing means.

35. A device for monitoring updated document information according to claim 31, wherein the device for monitoring updated document information further comprises:
  detecting means for detecting the documents, which have been deleted, among the specified documents specified by the document specifying means; and
  specification deleting means for deleting addresses showing the storage locations of deleted documents from the specifications specified by the document specifying means when the deleted documents have been detected by the detecting means.

36. A device for monitoring updated document information according to claim 31, wherein the device for monitoring updated document information further comprises:
  address detecting means for detecting an address of a new location when a stored location of a document specified by the document specifying means has been modified to the new location; and
  address modifying means for modifying the old address of the document whose storage location specified by the document specifying means to the new address detected by the address detecting means when the new address of a document is detected to which address the old address of the document is modified.

37. A device for monitoring updated document information, comprising:
  referential relation collecting means for collecting referential relations between documents;
  document specifying means for specifying an address showing a storage location of a document of an object for monitoring;
  detecting means for detecting a second document, which refers to the specified document specified by the document specifying means, based on a referential relation collected by the referential relation collecting means; and
  indicating means for indicating an user in regard to the second document detected by the detecting means.

38. A method for monitoring updated document information, comprising the steps of:
  specifying an address showing a storage location for a document of a monitoring object and documents having a hierarchical structure with a document as a starting point as a group;
  detecting an updated document among the specified documents by the document specifying means; and
  indicating the detected documents detected by the update detecting means with information on their respective positions in the hierarchical structure of documents including the detected documents therein.

39. A method for monitoring updated document information, comprising the steps of:
  collecting referential relations between documents;
  specifying an address showing a storage location of a document of an object for monitoring;
  detecting that a new document, which refers to the specified document specified by the document specifying means, is created, based on a referential relation collected by the referential relation collecting means; and
  indicating an user in regard to the new document detected by the detecting means.

40. A computer program product for operating a computer, said program product comprising:
  a computer readable medium;
  first program instruction means for instructing a computer processor to detect a document, newly created or updated, among documents to be filtered based on document data for filtering and fundamental document data which is used for detecting the document, newly created or updated;
  second program instruction means for instructing the computer processor to compute a similarity between a detected document and a retrieval condition set in advance; and
  third program instruction means for instructing the computer processor to present detected documents according to similarities computed, wherein each of said program instruction means is recorded on said medium in executable form and is loadable into the computer for execution by the processor.

41. A computer program product for operating a computer, said computer program product comprising:
  a computer readable medium;
  first program instruction means for instructing a computer processor to detect a document, newly created or updated, among documents to be filtered based on document data for filtering and fundamental document data which is used for detecting the document, newly created or updated;
  second program instruction means for instructing the computer processor to compute a similarity between a detected document and a retrieval condition set in advance;
  third program instruction means for instructing the computer processor to present detected documents according to similarities computed, wherein each of said program instruction means is recorded on said medium in executable form and is loadable into the computer for execution by the processor.

42. A computer program product for operating a computer, said computer program product comprising:

a computer readable medium;

first program instruction means for instructing a computer processor to detect a document, newly created or updated, among documents to be filtered by comparison between document data for filtering and fundamental document data which are used for detecting the document, newly created or updated;

second program instruction means for instructing the computer processor to decide on whether or not detected document data include a plurality of information units;

third program instruction means for instructing the computer processor to split the detected document into information units, when the detected document data are decided to include a plurality of information units;

fourth program instruction means for instructing the computer processor to compute a similarity between each split information unit and a retrieval condition set in advance;

fifth program instruction means for instructing the computer processor to present split documents split by splitting means according to the similarities computed, wherein each of said program instruction means is recorded on said medium in executable form and is loadable into the computer for execution by the processor.

43. A computer program product for operating a computer, said computer program product comprising:

a computer readable medium;

detect a hypertext, newly created or updated, among hypertexts from a hypertext with an address specified in advance being an object for filtering up to a hypertext in a position specified in advance in a hierarchy by comparison between the hypertext being an object for filtering and a fundamental hypertext which is used for detecting a hypertext, newly created or updated;

second program instruction means for instructing the computer processor to compute a similarity between a detected hypertext by detecting means and a retrieval condition set in advance;

third program instruction means for instructing the computer processor to present detected hypertexts by the detecting means according to the similarities computed by the similarity computing means, wherein each of said program instruction means is recorded on said medium in executable form and is loadable into the computer for execution by the processor.

44. A computer program product for operating a computer, said computer program product comprising:

a computer readable medium;

first program instruction means for instructing a computer processor to incorporate a filtering result output from another device for filtering information;

second program instruction means for instructing the computer processor to filter incorporated documents together with documents to be filtered while including the former documents in the latter documents, wherein each of said program instruction means is recorded on said medium in executable form and is loadable into the computer for execution by the processor.

45. A computer program product for operating a computer, said computer program product comprising:

a computer readable medium;

first program instruction means for instructing a computer processor to specify an address showing a storage location for a document of a monitoring object and documents in a hierarchical structure with the monitored document being a starting point thereof as a group;

second program instruction means for instructing the computer processor to detect an updated document among the specified documents specified by the document specifying means;

third program instruction means for instructing the computer processor to notice the detected documents detected by the update detecting means with information on their respective positions in the hierarchical structure of the documents including the detected documents therein, wherein each of said program instruction means is recorded on said medium in executable form and is loadable into the computer for execution by the processor.

46. A computer program product for operating a computer, said computer program product comprising:

a computer readable medium;

first program instruction means for instructing a computer processor to collect referential relations between documents;

second program instruction means for instructing the computer processor to specify an address showing a storage location of a document of an object for monitoring;

third program instruction means for instructing the computer processor to detect that a new document, which refers to the specified document specified by the document specifying means, is created, based on a referential relation collected by the referential relation collecting means; and fourth program instruction means for instructing the computer processor to notice an user in regard to the new document detected by the detecting means, wherein each of said program instruction means is recorded on said medium in executable form and is loadable into the computer for execution by the processor.

* * * * *